US011254450B2

(12) United States Patent
Grigg

(10) Patent No.: US 11,254,450 B2
(45) Date of Patent: Feb. 22, 2022

(54) AIR AND SPACE CRAFT WITH ENHANCED LIFT

(71) Applicant: Charles Ronald Grigg, Westport, CA (US)

(72) Inventor: Charles Ronald Grigg, Westport, CA (US)

(*) Notice: Subject to any disclaimer, the term of this patent is extended or adjusted under 35 U.S.C. 154(b) by 0 days.

(21) Appl. No.: 16/830,741

(22) Filed: Mar. 26, 2020

(65) Prior Publication Data

US 2020/0283173 A1 Sep. 10, 2020

Related U.S. Application Data

(63) Continuation-in-part of application No. 15/637,922, filed on Jun. 29, 2017, now Pat. No. 10,633,120.

(60) Provisional application No. 62/499,759, filed on Feb. 6, 2017, provisional application No. 62/601,356, filed on Mar. 20, 2017, provisional application No. 62/601,821, filed on Apr. 3, 2017, provisional application No. 62/602,808, filed on May 8, 2017, provisional application No. 62/922,540, filed on Aug. 15, 2019.

(51) Int. Cl.
  *B64C 39/06* (2006.01)
  *B64G 1/26* (2006.01)
  *B64G 1/40* (2006.01)

(52) U.S. Cl.
  CPC .............. *B64G 1/26* (2013.01); *B64G 1/40* (2013.01)

(58) Field of Classification Search
  CPC ..... B64C 39/001; B64C 39/06; B64C 39/062; B64C 39/064; B64C 29/0066
  See application file for complete search history.

(56) References Cited

U.S. PATENT DOCUMENTS

| 3,199,809 A | 8/1965 | Modesti |
| 3,503,573 A | 3/1970 | Modesti |
| 3,599,902 A * | 8/1971 | Thornley ............... B64C 39/001 244/12.2 |
| 3,752,419 A | 8/1973 | Richter |
| 4,214,720 A | 7/1980 | Desautel |
| 4,461,436 A | 7/1984 | Messina |
| 4,566,699 A | 1/1986 | Cucuzza |

(Continued)

FOREIGN PATENT DOCUMENTS

| DE | 19818945 A1 * | 11/1999 | ........... B64C 39/001 |
| WO | WO2017/105266 A1 | 6/2017 | |

OTHER PUBLICATIONS

Examination Report dated Jan. 27, 2021, GB Patent Application No. GB1912124.3.

(Continued)

*Primary Examiner* — Brian M O'Hara
(74) *Attorney, Agent, or Firm* — Vierra Magen Marcus LLP

(57) ABSTRACT

An aircraft includes a fuselage having an upper surface and a lower surface that define an airfoil shape in cross-section along a vertical plane such that horizontal movement of the fuselage through air produces a lift force in a vertical direction. The aircraft also includes a plurality of modules attached to the fuselage. Each module includes an upper jet engine directed above the upper surface of the fuselage and an opposed lower jet engine directed below the lower surface of the fuselage.

20 Claims, 40 Drawing Sheets

(56) References Cited

U.S. PATENT DOCUMENTS

| | | | | |
|---|---|---|---|---|
| 4,807,830 | A * | 2/1989 | Horton | B64C 39/001 |
| | | | | 244/12.2 |
| 5,170,963 | A | 12/1992 | Beck, Jr. | |
| 5,836,542 | A * | 11/1998 | Burns | B64C 39/001 |
| | | | | 244/12.2 |
| 5,881,970 | A | 3/1999 | Whitesides | |
| 6,398,159 | B1 * | 6/2002 | Di Stefano | B64C 27/22 |
| | | | | 244/12.2 |
| 6,467,724 | B2 * | 10/2002 | Kuenkler | B64C 27/52 |
| | | | | 244/17.25 |
| 9,550,566 | B2 | 1/2017 | Henning, Jr. | |
| 2018/0044005 | A1 * | 2/2018 | Hayden, III | B64C 39/062 |
| 2018/0222603 | A1 | 8/2018 | Grigg | |
| 2020/0331601 | A1 * | 10/2020 | Sabie | B64C 39/024 |

OTHER PUBLICATIONS

International Search Report and Written Opinion, dated May 29, 2018 in PCT Application No. PCT/US18/16004, 13 pages.
International Preliminary Report and Written Opinion, dated Aug. 6, 2019 in PCT Application No. PCT/US18/16004, 8 pages.
Restriction Requirement dated Aug. 1, 2019, U.S. Appl. No. 15/637,922, filed Jun. 29, 2017.
Response to Restriction Requirement dated Sep. 27, 2019, U.S. Appl. No. 15/637,922, filed Jun. 29, 2017.
Notice of Allowance dated Dec. 11, 2019, U.S. Appl. No. 15/637,922, filed Jun. 29, 2017.

* cited by examiner

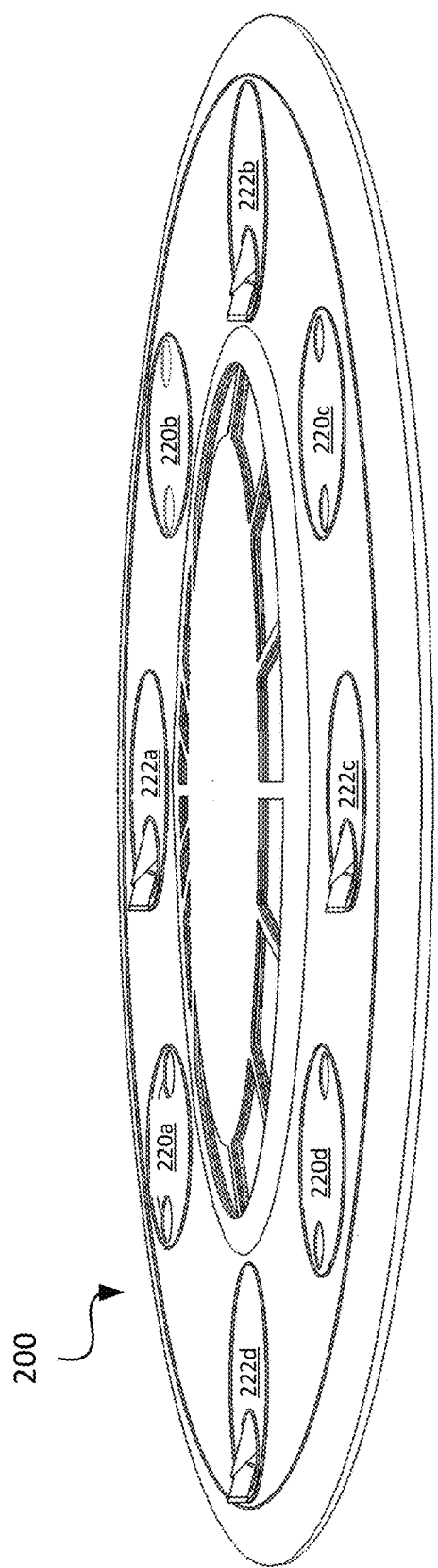
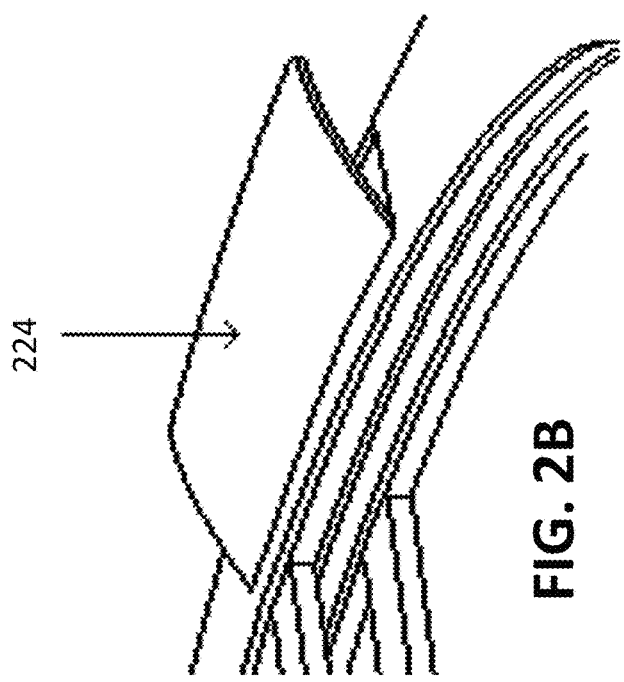
FIG. 2A
FIG. 2B

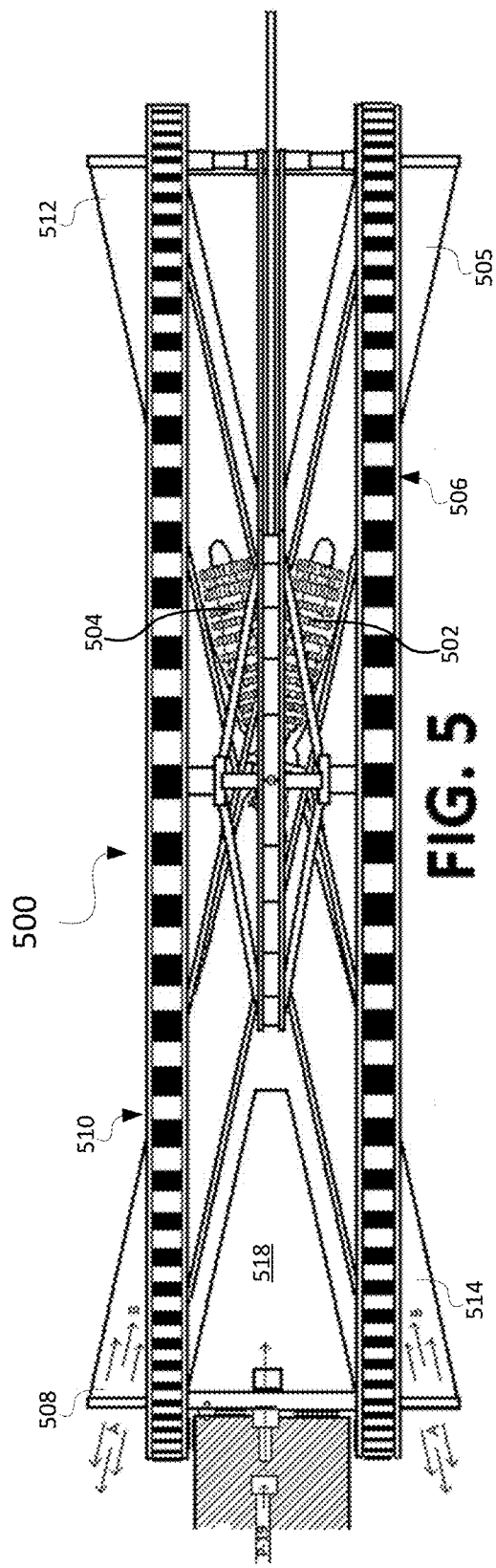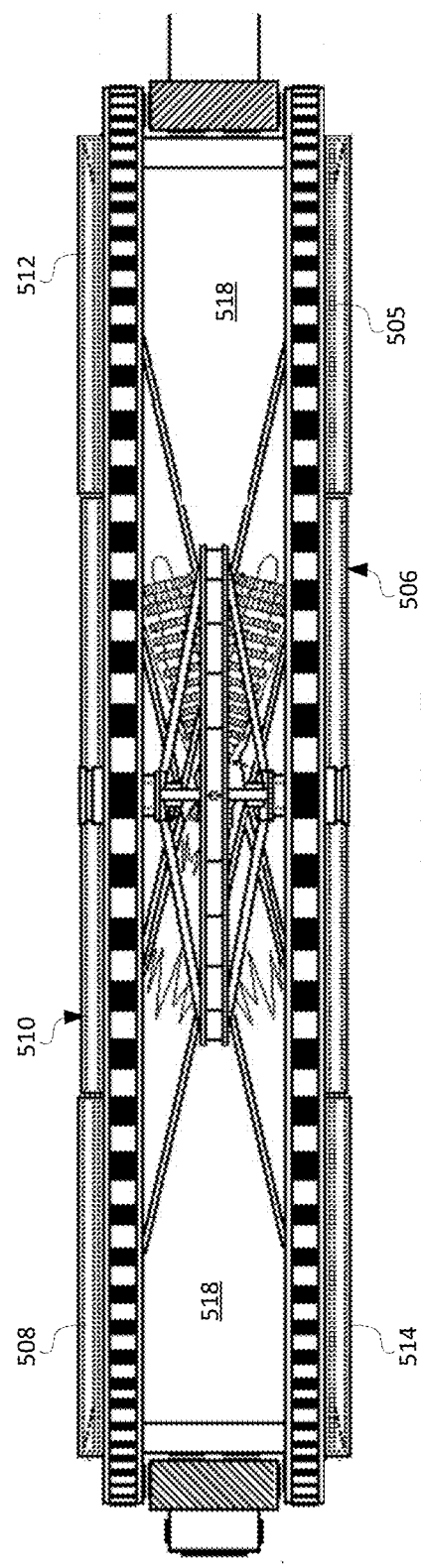

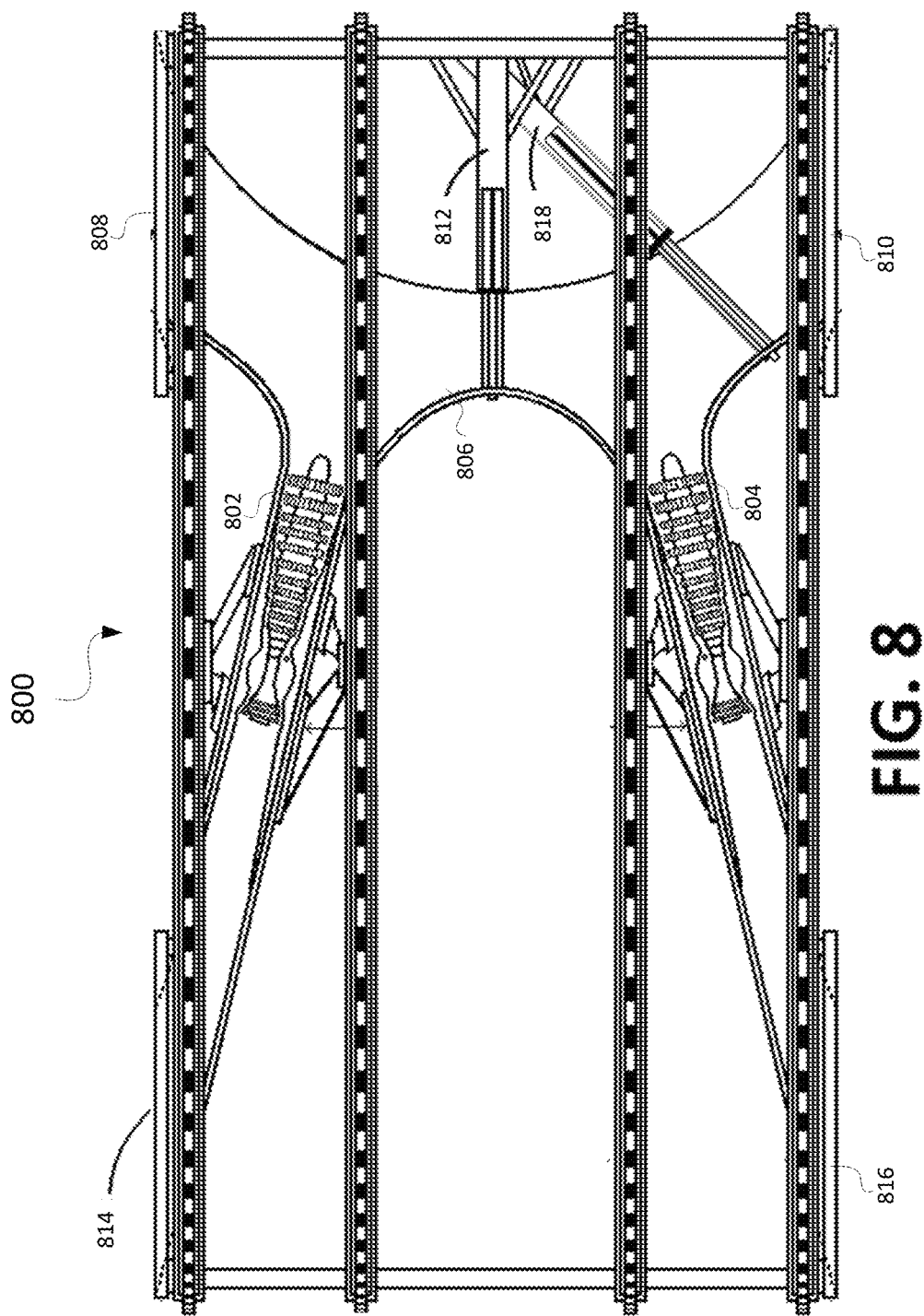

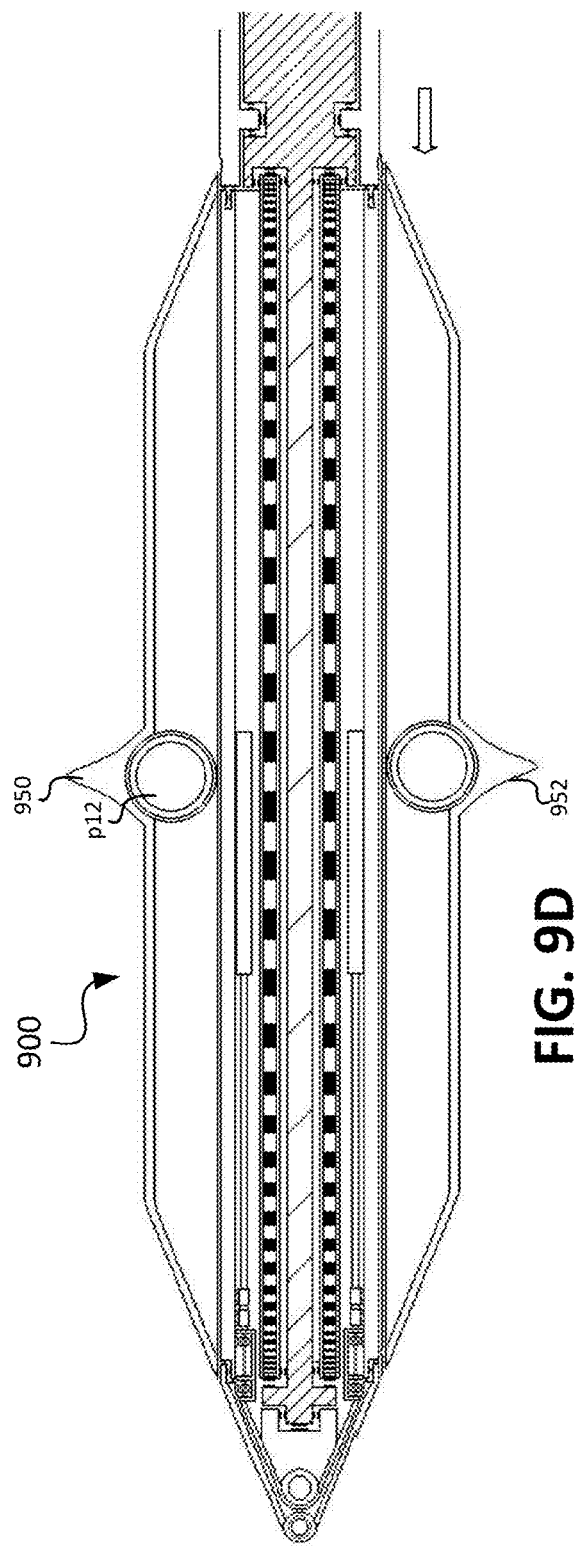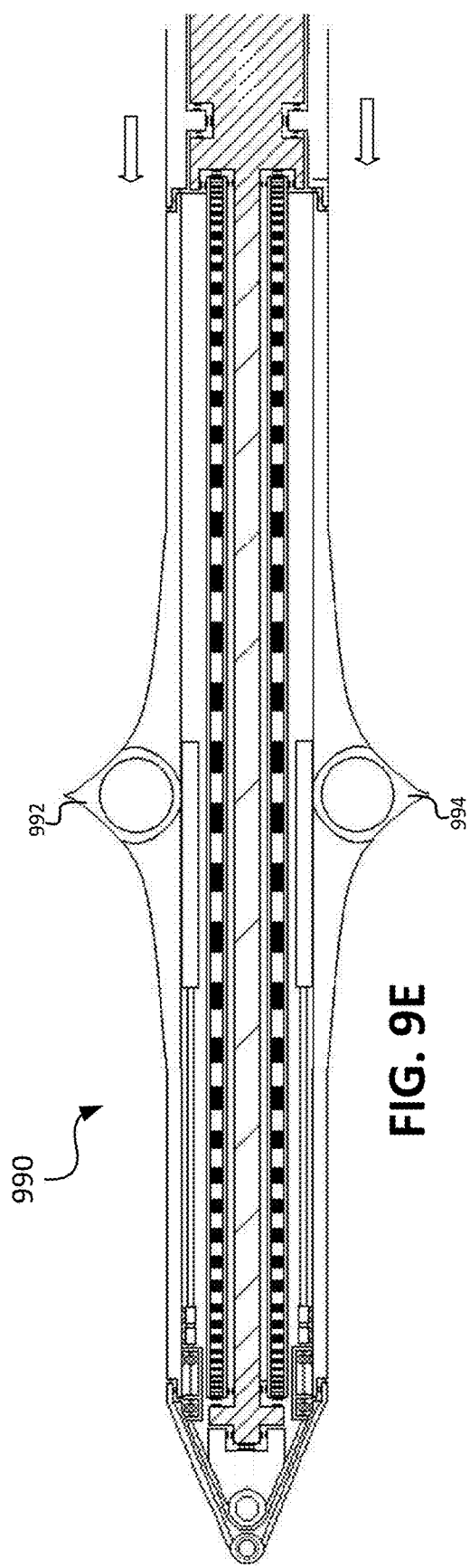
FIG. 9D
FIG. 9E

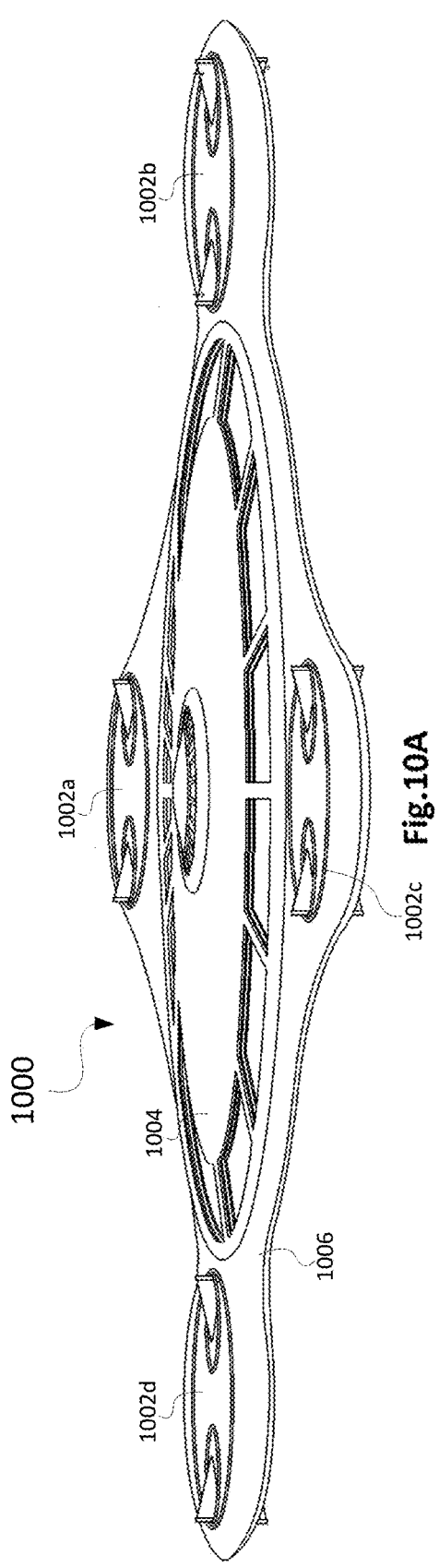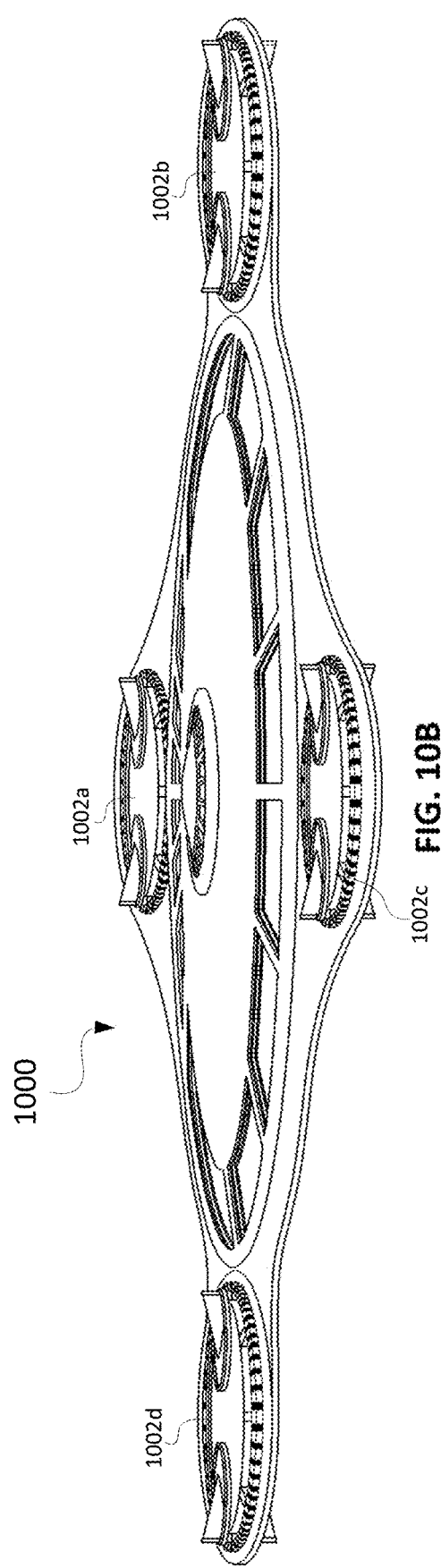

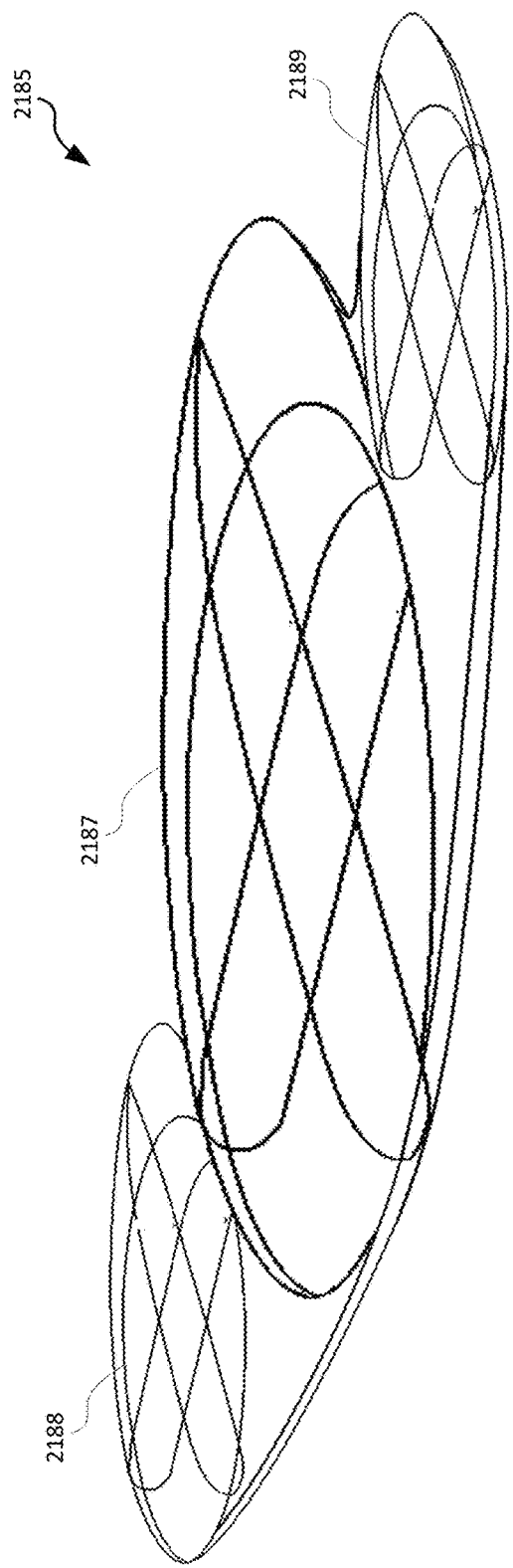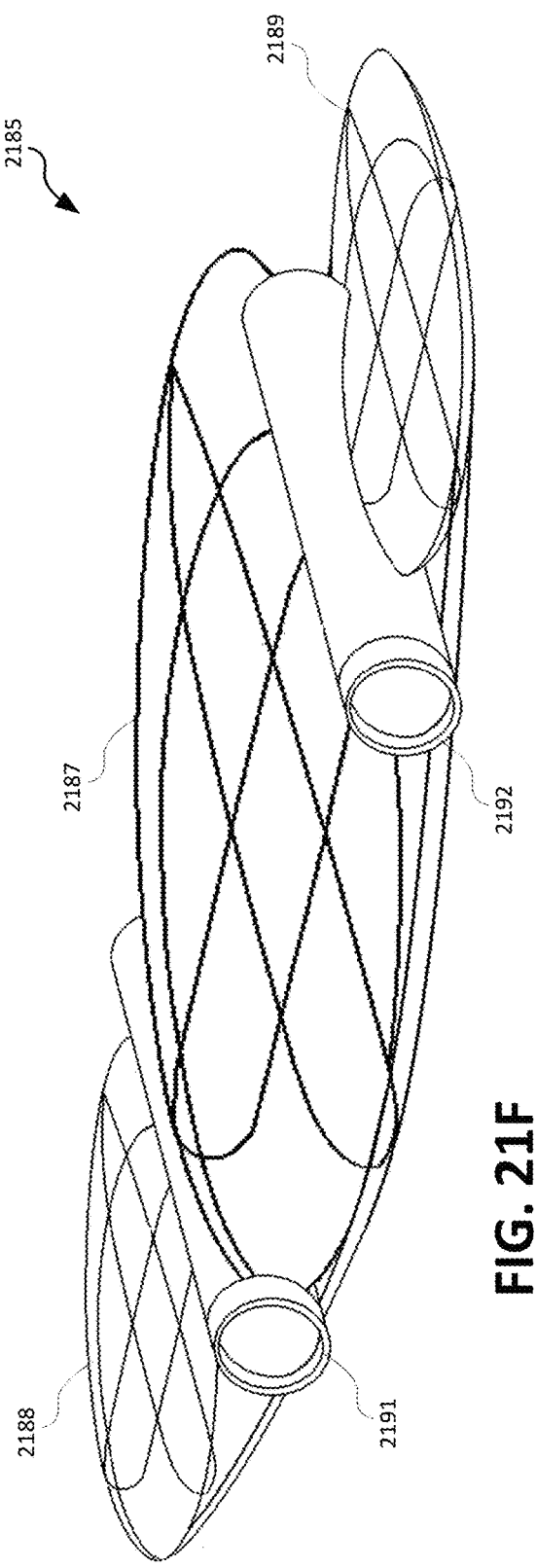
FIG. 21E
FIG. 21F

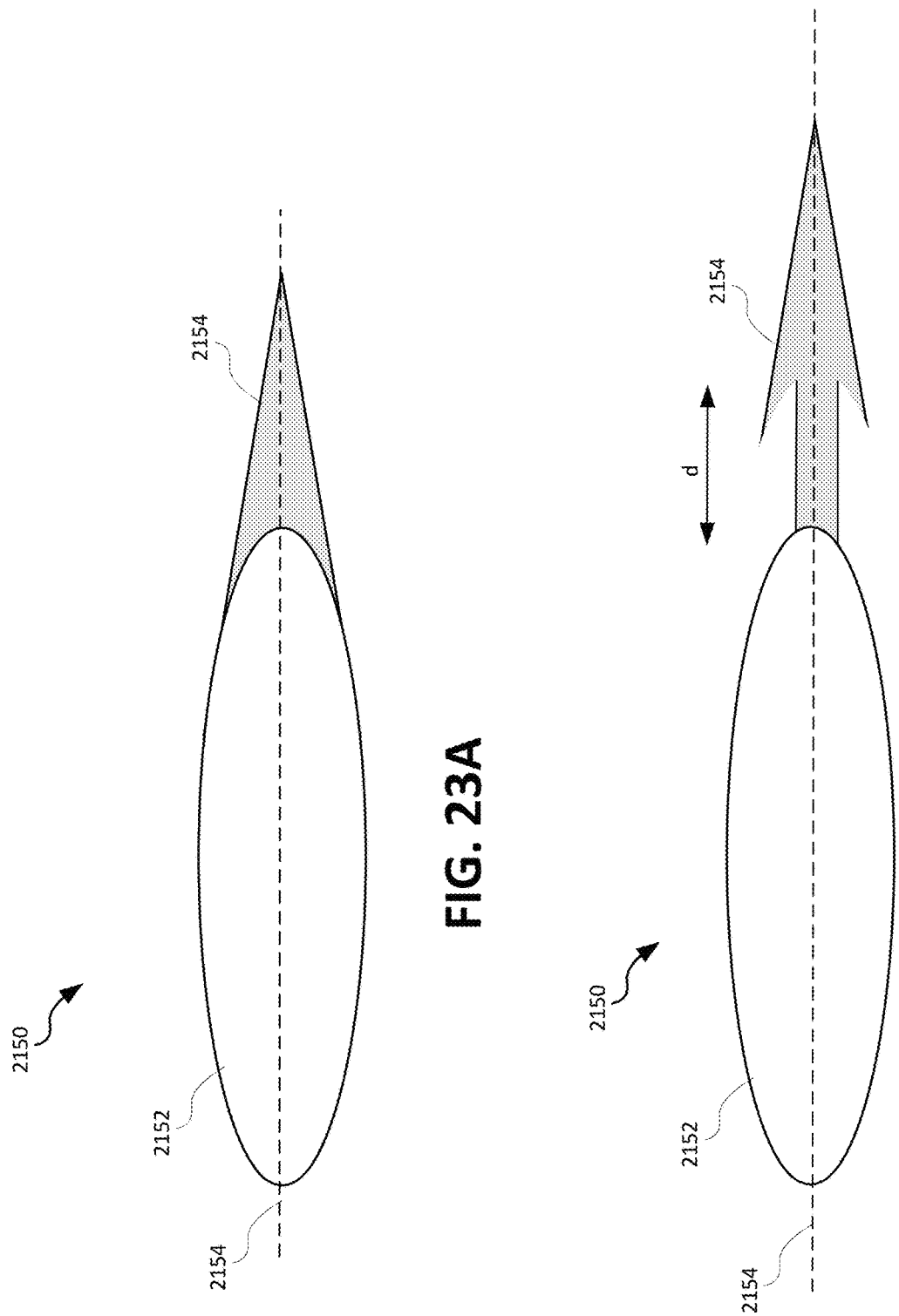

AIR AND SPACE CRAFT WITH ENHANCED LIFT

PRIORITY CLAIM

This application is a Continuation-in-Part of U.S. patent application Ser. No. 15/637,922, filed on Jun. 29, 2017, published as US2018/0222603 on Aug. 9, 2018 and issued as U.S. Pat. No. 10,633,120 on Apr. 28, 2020, which claims priority to U.S. Provisional Patent Application No. 62/499,759, filed on Feb. 6, 2017; U.S. Provisional Patent Application No. 62/601,356, filed on Mar. 20, 2017; U.S. Provisional Patent Application No. 62/601,821, filed on Apr. 3, 2017; and U.S. Provisional Patent Application No. 62/602,808, filed on May 8, 2017, each of which is incorporated by reference herein. This application claims the benefit of U.S. Provisional Patent Application No. 62/922,540, filed on Aug. 15, 2019, which is incorporated by reference herein.

BACKGROUND

The present disclosure relates to technology for air and space travel.

Various kinds of aircraft are known including fixed-wing airplanes, lighter-than-air craft, helicopters. In many forms of aircraft, propulsion is provided by one or more jet engines or by a rotating propeller, or propellers, powered by internal combustion engines. Space craft are generally distinct from aircraft and require different propulsion systems, such as rockets, because jet engines and internal combustion engines generally require air to operate.

SUMMARY

An example of an aircraft includes a fuselage having an upper surface and a lower surface that define an airfoil shape in cross-section along a vertical plane such that horizontal movement of the fuselage through air produces a lift force in a vertical direction. A variety of aircraft having an oblate spheroid as the leading central portion of its compound composition and having an adjacent lift profile assembly (LPA) trailing portion, that completes a 3 D lift geometry that generates lift over the craft's entire upper surface when propelled through air. The embodiment having this gliding lift geometry is referred to herein as (LEOS) Lift Enhanced Oblate Spheroid or (LEOS w PA) w/Perimeter Appendage/s, such as wings tails etc.

An aircraft may include a plurality of modules (e.g. modules that each include a pair of engines attached to the fuselage), each module including an upper jet engine directed above the upper surface of the fuselage and an opposed lower jet engine directed below the lower surface of the fuselage. Each opposed engine of such a pair may be made rotatable and housed in a corresponding module or may have a fixed location and orientation with respect to the fuselage.

The fuselage may be circularly symmetric about a central axis. Each module may be separately rotatable about a vertical axis that extends parallel to the central axis. The fuselage may include an oblate spheroid portion that is symmetric about a central axis and further include a lift profile assembly extending laterally from a section of the oblate spheroid portion along a plane that is perpendicular to the central axis, the combination of the oblate spheroid portion and the lift profile assembly forming the airfoil shape. The lift profile assembly may be rotatable about the central axis. The lift profile assembly may be at least partially separable from the oblate spheroid portion from a lift-generating configuration to a high-drag configuration. The fuselage may include a frame formed by frame members extending radially from the central axis with optional perpendicular cross members. The fuselage may be formed of prefabricated wedge-shaped sections that are joined along the central axis. Upper jet engines and lower jet engines of the plurality of modules may be configured to generate a combined thrust vector and a central controller may be configured to control thrust generated by individual ones of the upper jet engines and lower jet engines to change the combined thrust vector and thereby change orientation of the aircraft. The upper jet engines and lower jet engines may be fixed with respect to the fuselage and the central controller may be configured to change direction and magnitude of the combined thrust vector by changing magnitudes of thrust generated by individual ones of the upper jet engines and lower jet engines. The aircraft of may include a first air-tight door and a first air-lock flange in the upper surface of the fuselage and a second air-tight door a second air-lock flange in the lower surface of the fuselage.

An example of an aircraft includes a fuselage having an oval shape in cross-section along a horizontal plane and having an airfoil shape in cross-section along a vertical plane perpendicular to a primary axis of the oval shape and a plurality of pairs of jet engines, each pair of jet engines including an upper jet engine mounted above an upper surface of the aircraft and a lower jet engine mounted below a lower surface of the aircraft, the upper jet engine and the lower jet engine controlled by a central controller.

The fuselage may include an oblate spheroid portion that is symmetric about a central axis and further include a lift profile assembly extending laterally from a section of the oblate spheroid portion along the horizontal plane. The lift profile assembly may be rotatable about the central axis. The lift profile assembly may be at least partially separable from the oblate spheroid portion from a lift-generating configuration to a high-drag configuration. The fuselage may include a frame formed by frame members extending radially from the central axis. Upper jet engines and lower jet engines of the plurality of modules may be configured to generate a combined thrust vector and a central controller may be configured to control thrust generated by individual ones of the upper jet engines and lower jet engines to change the combined thrust vector to thereby change a flightpath of the aircraft.

An example of a method of operating an aircraft includes generating lift by a fuselage having an upper surface and a lower surface that define an airfoil shape in cross-section along a vertical plane such that horizontal movement of the fuselage through air produced by the thrust generates a lift force in a vertical direction; generating thrust by a plurality of modules attached to the fuselage, each module including an upper jet engine directed above the upper surface of the fuselage and an opposed lower jet engine directed below the lower surface of the fuselage; and controlling a flightpath of the aircraft by a central controller changing thrust of the upper jet engine and the lower jet engine of each of the plurality of modules to thereby change a combined thrust vector of the plurality of modules.

An example of an aircraft includes: a fuselage having an upper surface and a lower surface; and a plurality of planetary modules housed in the fuselage, an individual planetary module having a first jet engine directed outward of the upper surface of the fuselage and a second jet engine directed outward of the lower surface of the fuselage, the individual planetary module rotatable within the fuselage about a vertical axis. In each pair, each upper engine's thrust discharge may be opposed and in a plane parallel and above the upper surface of the aircraft and each lower engine's thrust discharge may be opposed and in a plane parallel and below the lower surface of the aircraft, irrespective of flight path vector orientation. Thus, the engine's collective or aggregate thrust is always in line and opposite the craft's trajectory. The useful work resulting from each pair of opposed engines is a highly enhanced efficiency, performance, and control.

The individual planetary module may include an interior volume that maintains an internal pressure that is a higher pressure than an ambient pressure, the first and second jet engines extending through the sealed interior volume, the first and second jet engines generating thrust within the individual planetary module. The aircraft may include a first rocket engine and a second rocket engine in the individual planetary module. The aircraft may include a first engine swapping mechanism configured to swap the first jet engine and the first rocket engine such that the first rocket engine is directed outward of the upper surface of the fuselage; and a second engine swapping mechanism configured to swap the second jet engine and the second rocket engine such that the second rocket engine is directed outward of the upper surface of the fuselage. The engine swapping mechanism may comprise an axis of rotation, the first rocket engine and the first jet engine being rotatable about the axis of rotation between an active position and an inactive position. The individual planetary module may be mounted within the fuselage by means of a rotational support and placement system that includes an electrodynamic suspension system. The fuselage may be circular in cross-section along a horizontal plane and a habitable space, such as a passenger cabin may extend around a central area in a ring configuration. In other examples, habitable space, including passenger cabins may be located in the central area. The aircraft may include an automated delivery system extending in the passenger cabin to deliver items from a central location to passengers seated or prone in the passenger cabin. The upper surface and the lower surface of the fuselage may define an airfoil shape in cross-section along a vertical plane such that horizontal movement of the fuselage through air produces a lift force in a vertical direction. The fuselage may be substantially circularly symmetric about a central axis such that horizontal movement of the fuselage in any horizontal direction produces a lift force in the vertical direction. The aircraft may include a gyroscopic system that is circularly symmetric about the central axis. The aircraft may also include one or more booster rockets physically attached to the fuselage by detachable couplings.

An example of a method of operating a heavier-than-air craft that is substantially symmetric about a central axis includes orienting the heavier-than-air craft to align a first portion of the heavier-than-air craft with a direction of travel; and subsequently rotating the heavier-than-air craft relative to the direction of travel to align a second portion of the heavier-than-air craft with the direction of travel, the second portion having a substantially similar profile to the first portion.

The method may further include rotating the heavier-than-air craft by generating thrust using a plurality thrust generators that may be rotatable through 360 degrees about axes that are parallel, or substantially parallel to the central axis. The method may include one or more of the plurality of thrust generators generating thrust directed in a direction opposite to the direction of travel. The method may include all of the plurality of thrust generators generating thrust directed in directions other than the direction of travel to change the direction of travel without changing the orientation of the central axis. The method may include, when the first portion is aligned with the direction of travel the first portion increases in temperature and rotating the heavier-than-air craft relative to the direction of travel is triggered by a temperature measured in the first portion exceeding a threshold temperature.

An example of a rotatable planetary module for providing thrust includes an upper cover; a lower cover; a first jet engine having an air intake extending through the upper or lower cover and an exhaust nozzle extending through the upper or lower cover; a second jet engine having an air intake extending through the upper or lower cover and an exhaust nozzle extending through the upper or lower cover; an axis of rotation that extends along a first direction through the upper cover and the lower cover; and a coupling that extends about the planetary module with circular symmetry about the axis of rotation, the coupling providing physical support for the planetary module and providing rotational freedom about the axis of rotation. The coupling may be an electrodynamic suspension system. One or more dampers may be used to selectively close and/or bypass intake or exhaust openings as needed.

An example of an aircraft includes a fuselage having an upper surface and a lower surface; and a plurality of planetary modules housed in the fuselage, an individual planetary module having a first rocket directed outward of the upper surface of the fuselage and a second rocket directed outward of the lower surface of the fuselage, the individual planetary module rotatable within the fuselage about a vertical axis.

BRIEF DESCRIPTION OF THE DRAWINGS

FIGS. 2A-B shows another example of an aircraft with circular symmetry and rotatable planetary modules.

FIG. 5 shows an example of a planetary module with two jet engines in cross section.

FIG. 6 shows another example of a planetary module with two jet engines in cross section.

FIG. 8 an example of a planetary module with two jet engines sharing an intake manifold.

FIGS. 9A-E show an example of a planetary module with engine swapping mechanism.

FIGS. 10A-B show an example of a non-circular aircraft with four planetary modules.

FIGS. 21A-G illustrate examples of aircraft fuselage shapes.

FIGS. 23A-E illustrate examples of an LPA that is separable for high-drag.

DETAILED DESCRIPTION

Certain embodiments of the present technology described herein relate to air and space craft that provide a high degree of maneuverability by generating thrust in planetary modules that are rotatable to allow thrust direction to be modified. Thrust may be generated by jet engines and/or rocket engines located in such planetary modules and thus may be used in air and/or space.

In an embodiment, a combined aircraft/spacecraft is symmetric about a central vertical axis so that it has a disk shape (i.e. shaped like "a flying saucer"). The fuselage of such an aircraft may be shaped so that lift is generated as the craft moves laterally through air. (Because it flies through air, it may be referred to as an "aircraft" although unlike conventional aircraft it may not be limited to air travel and may also operate as a spacecraft. The term "aircraft" is used herein to refer to a craft capable of, but not limited to, flying through air.) Optional wings are not required in such an aircraft because the fuselage has an airfoil shape (i.e. an airfoil shape in cross section). Propulsion may be provided by jet engines in planetary modules that generate thrust when flying in the atmosphere. This allows thrust generated by jet engines to be directed in various directions as desired to control acceleration, deceleration, direction of travel, and orientation when in air.

In an embodiment, propulsion may alternatively be provided by rocket engines in planetary modules that generate thrust when flying in space (e.g. above approximately 70,000 feet). This allows thrust generated by rocket engines to be directed in various directions as desired to control acceleration, deceleration, direction of travel, and orientation when in space. Rocket engines may be located in the same planetary modules as jet engines or may be located in separate planetary modules.

Figure 1A:
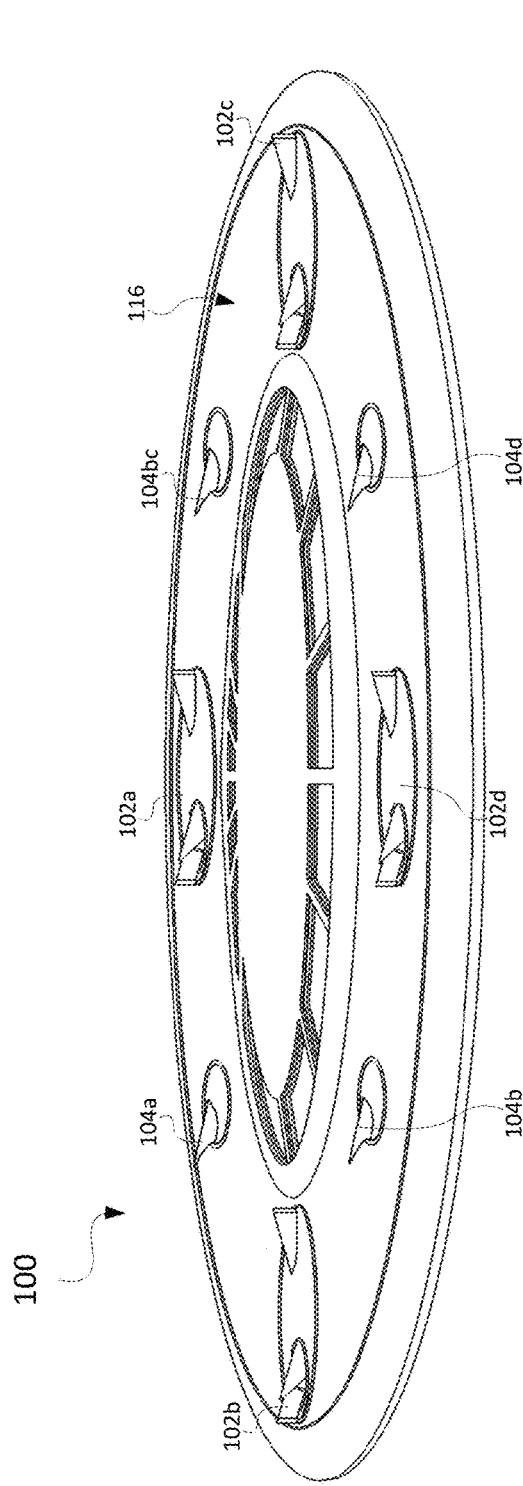
FIGS. 1A-B illustrate an aircraft with circular symmetry and rotatable planetary modules.

FIG. 1A shows an example of an aircraft 100. Aircraft 100 is disk shaped, with an upper surface, and lower surface (not visible in FIG. 1A) that meet along a circular perimeter. Unlike a conventional aircraft that has wings and a fuselage, aircraft 100 has a fuselage that is wing-shaped in cross-section so that lift is produced when aircraft 100 moves horizontally through the air. Aircraft 100 is symmetric about a central axis so that travel in any horizontal direction (a direction perpendicular to the central axis) produces lift. The lift force generated is independent of the orientation of aircraft 100 about the central axis. Thus, aircraft can fly equally well forwards, backwards, or sideways. It will be understood that the terms "forwards," "backwards" and "sideways" are generally used with respect to an aircraft or other object that has a clearly defined nose, tail, and sides, whereas aircraft 100 is circularly symmetric and does not have such easily identified features, and it will be understood that a designated portion of aircraft 100 may be considered the front, while an opposing portion may be considered the back, and portions laterally disposed on either side may be considered "sides" for purposes of discussing orientation, although such designations may be arbitrary for some aircraft that do not have a preferred orientation when flying.

Conventional aircraft have engines (e.g. jet or turboprop engines) mounted to generate thrust along the direction of travel, which generally means that such engines are permanently mounted to generate thrust substantially parallel to an aircraft fuselage. Wings are configured so that they generate lift when the aircraft moves along this direction of travel. Changes in the direction of travel require changing the orientation of such an aircraft, i.e. such aircraft travel nose-first, and the nose of the aircraft must be turned to the new direction of travel. Such a change in direction may require banking and turning through a relatively wide radius to reach the new orientation. Changing direction is generally accomplished using a rudder and/or ailerons rather than by changing the direction of thrust.

In contrast with conventional aircraft, aircraft 100 includes planetary modules 102a-d within the fuselage, mounted so that they are rotatable within the fuselage and can direct thrust in different directions. Each planetary module is rotatable within the fuselage about a vertical axis (i.e. an axis that is parallel to, or substantially parallel to the central axis of the aircraft). Planetary modules may be rotatable through 360 degrees, or some angular range that is less than 360 degrees, e.g. through 270 degrees, 180 degrees or some other range. While aircraft 100 has four planetary modules 102a-d, it will be understood that the number of modules may vary and that the four modules shown are by way of example. Planetary modules that generate thrust may be provided in various ways and may have a variety of configurations depending on the application. Various examples of planetary modules are provided below.

In addition to planetary modules 102a-d, aircraft 100 has fins 104a-d that are rotatably mounted on the upper surface 116 of aircraft 100. Fins may be rotatable through 360 degrees, or some angular range that is less than 360 degrees. Fins 104a-d may be used to maneuver aircraft 100 in flight. Fins 104a-d may be used with planetary modules 102a-d to control the direction of travel of aircraft 100. Fins 104a-d may provide directional control in case of loss of power when planetary modules 102a-d may not generate thrust. In some examples, one or more fins may be fixed e.g. two of four fins may be fixed while two are rotatable, or all four may be fixed. The number of fins may vary. In some examples, no fins may be provided, while in other cases one or more fins (e.g. four fins) may be provided. Fins may also be provided along a lower surface of an aircraft. Fins may protrude a fixed distance from a surface of aircraft 100, or may be retractable, or partially retractable. For example, fins may be used for maneuvering in air and may be retracted when flying through space. Some fins may retract, or partially retract, while others remain fixed. The fin feature may be incorporated with planetary modules 102a-d as an addition above intake and discharge manifolds.

Figure 1B:
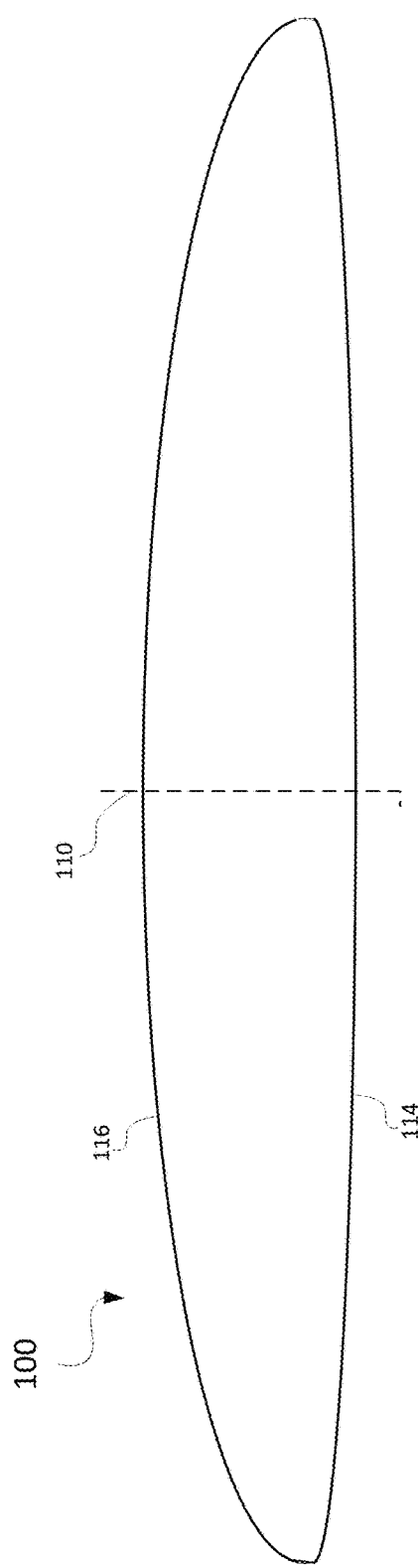

FIG. 1B shows aircraft 100 in cross section along a diameter that intersects central axis 110. FIG. 1B illustrates the airfoil shape of aircraft 100 that generates lift. It can be seen that lower surface 114 is flatter than upper surface 116 so that upper surface 116 forms a "suction surface" while lower surface 114 forms a "pressure surface" when aircraft 100 moves laterally through air, i.e. moves in a direction perpendicular to central axis 110. A variety of different profiles may be used to generate an appropriate lift force according to requirements. For example, high speed aircraft may have a lower profile and may create less lift at a given speed, while slower aircraft (e.g. cargo aircraft) may have a higher profile and create more lift at a given speed to enable them to fly with relatively heavy cargo. The profile of an aircraft 100 may be configured according to its design weight and speed range so that when it operates in its designed speed range, the lift generated is greater than its design weight.

FIG. 2A shows an example of an aircraft 200 that includes multiple planetary modules. In this case, there are two kinds of planetary modules. First planetary modules 220a-d contain jet engines to provide thrust when in air. In this example, each first planetary module includes two jet engines, a first jet engine directed outward of the upper surface of the fuselage and a second jet engine directed outward of the lower surface of the fuselage (not visible in FIG. 2A). Both jet engines of a planetary module may be substantially aligned in their lateral orientation, i.e. if a planetary module is oriented to direct thrust in a northerly direction, then both jet engines of the module are directed towards the south to generate thrust towards the north. Instead of jet engines being arranged in a parallel configuration, jet engines may be arranged in an X configuration so that the first jet engine has an air intake on the lower surface (not shown) and an exhaust on the upper surface, while the second jet engine has an air intake on the upper surface and an exhaust on the lower surface (not shown). Jet engines may have their intake and exhaust manifolds covered by covers that are flush with the surface of the aircraft as shown in FIG. 2A, which shows pressurized covers over jet engines of planetary modules 220a-d.

Second planetary modules 222a-d contain rocket engines to provide thrust when in space. Rocket engines may be mounted in planetary modules similarly to jet engines. A first rocket engine directed outward of the upper surface of the fuselage and a second rocket engine directed outward of the lower surface of the fuselage. Both rocket engines of a planetary module may be substantially aligned in their lateral orientation, i.e. if a planetary module is oriented to direct thrust in a northerly direction, then both rocket engines of the module are pointed towards the south so that their thrust is directed towards the north. Rocket engines are arranged in an X configuration so that the first rocket engine has an exhaust on the upper surface, while the second rocket engine has an exhaust on the lower surface. In addition, while no fins are shown in FIG. 2A, fins may be provided on aircraft surfaces in this and other embodiments. Also, not visible in FIG. 2A are retractable spoilers around the edge of aircraft 200, which may be used to provide increased drag for slowing down or turning aircraft 200. FIG. 2B illustrates a spoiler 224 in an extended position where it produces increased drag in air (spoilers may remain retracted in space). Any suitable number of spoilers may be positioned around the outer edge of aircraft 200 and may be centrally controlled to produce drag as required.

Figure 3A:
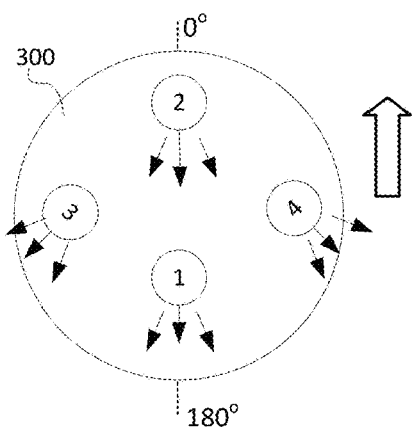
FIGS. 3A-G illustrate examples of using rotatable planetary modules in an aircraft.

FIG. 3A-F illustrate how planetary modules, including planetary modules having rocket and/or jet engines, may be oriented differently in flight. FIG. 3A shows planetary modules 1-4 of aircraft 300 in top-down view including exhaust (indicated by arrows coming from each respective planetary module 1-4. The direction of travel is indicated by the arrow (up the page in this view). In general, the direction in which exhaust is expelled is opposite to the direction in which thrust is generated so that thrust is generally along the direction of travel in FIG. 3A. Planetary modules 3 and 4 are shown with their thrust directed outwards from the centerline of aircraft 300 in a balanced arrangement to create net thrust along the direction of travel. This configuration may be used to maintain stability for example when taking off or landing when there is insufficient speed for fins and/or spoilers to maintain stability. Planetary modules 3 and 4 may provide side forces to stabilize aircraft at low speed.

Figure 3B:
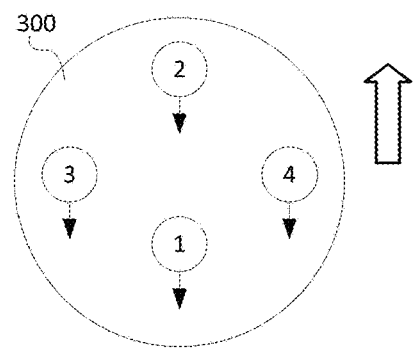

FIG. 3B shows a simplified top-down view that is similar to FIG. 3A. In this case, arrows indicate the direction in which exhaust is expelled (opposite to the direction of thrust). Thus, in FIG. 3B all planetary modules are aligned along the direction of travel (up the page) to generate thrust in the direction of travel, with exhaust being expelled in the opposite direction. This may be considered a linear travel mode of operation in which all planetary modules 1-4 are aligned along the direction of travel to keep aircraft 300 travelling in the same direction.

Figure 3C:
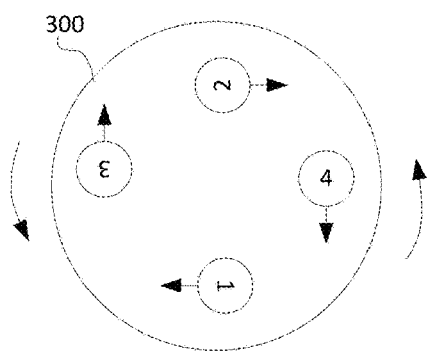

FIG. 3C shows an example of how planetary modules may be used to direct thrust in different directions and thereby rotate the aircraft 300. FIG. 3C is a top-down view. As can be seen, planetary modules 1-4 are oriented in a circumferential arrangement so that their thrust generates a turning force and causes aircraft to rotate counter-clockwise as shown.

Figure 3D:
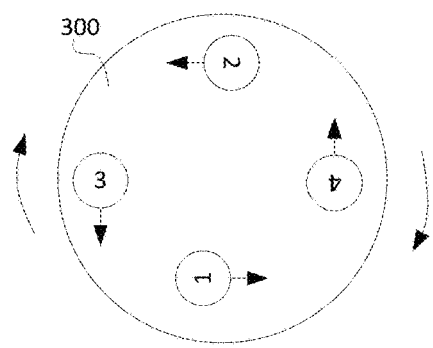

FIG. 3D shows an example in which the orientations of planetary modules 1-4 are opposite of that shown in FIG. 3C so that they generate a turning force in the opposite direction. The result is clockwise rotation of the aircraft as shown. No direction of travel is indicated in FIGS. 3C-D. Rotation may occur independently of the direction of travel, and may occur without travel, i.e. when an aircraft is not moving laterally. It will be understood that rotation may be combined with lateral movement so that an aircraft may rotate as it is flying. This may be achieved with relatively small changes to thrust directions, e.g. by offsetting planetary modules 1-4 a few (<10) degrees from the direction of travel and/or by modifying power generated by different planetary modules (decreasing power on one side while increasing power on an opposing side for example). As an aircraft rotates to a new orientation, planetary modules may realign accordingly so that their thrust is directed as appropriate (e.g. directed along the direction of travel to accelerate, or directed opposite the direction of travel to decelerate). Such rotation may be achieved while flying level to the ground, i.e. while maintaining the orientation of the central axis substantially vertical with respect to the ground, so that no banking is needed.

Figure 3E:
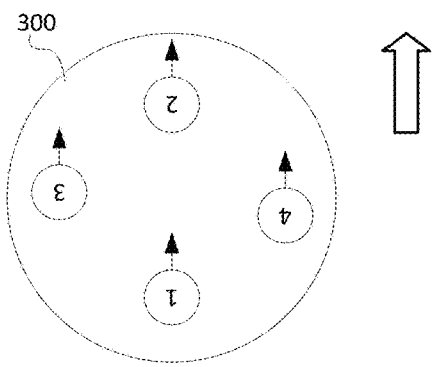

FIG. 3E shows an example in which all planetary modules 1-4 are aligned to generate thrust in a direction that is opposite to the direction of travel. The direction of travel is up the page in FIG. 3E and all planetary modules direct thrust up the page. This may be used to provide deceleration. For example, when preparing to land, an aircraft may reduce speed by reversing thrust of one or more planetary modules. Also, when an aircraft that is configured for space travel reenters the atmosphere, reverse thrust may decelerate the aircraft to keep its reentry speed at a safe level and to control reentry trajectory.

Figure 3F:
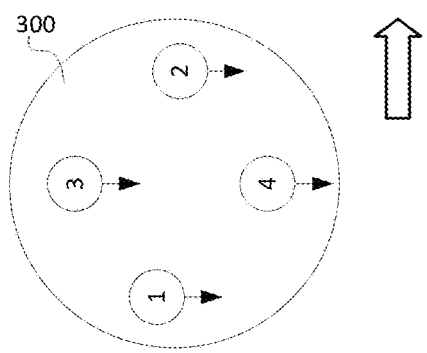

FIG. 3F illustrates an example in which the direction of thrust of all planetary modules 1-4 is perpendicular to the direction of travel (indicated by the large arrow). This configuration allows for a rapid change in direction without the need for banking or otherwise changing the orientation of the aircraft (e.g. lateral travel direction may change while central axis remains vertical). An aircraft may change from travelling North to travelling West without changing its orientation. Thus, in this example all of the thrust generators are generating thrust directed in directions other than the direction of travel to change the direction of travel. This is done without banking, i.e. without changing the orientation of the central axis (which is perpendicular to the top-down view shown). It will be understood that in addition to modifying the direction of thrust, the amount of thrust generated by each planetary module may be controlled to create a turning force (e.g. increasing thrust on one side and/or reducing on an opposing side).

Figure 3G:
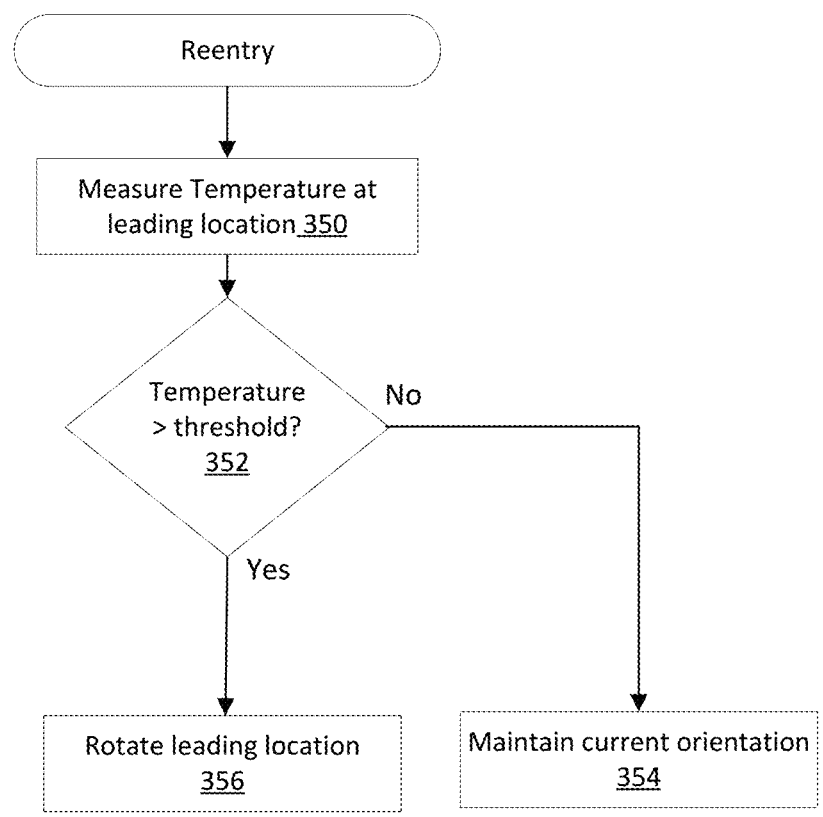

FIG. 3G illustrates how rotating an aircraft to change its orientation while under way may provide significant benefits. Specifically, FIG. 3G shows a method of operating an aircraft that has circular symmetry (substantially symmetric about a central axis) and has a thrust generator, or thrust generators, that can change their direction of thrust to rotate the aircraft, e.g. rotatable planetary modules. This method may be used during reentry into the earth's atmosphere by an aircraft that is configured for air and space travel. During reentry, the temperature is measured 350 at a leading location of the aircraft. Multiple temperature transducers may be located on or near the surfaces of the aircraft, particularly along portions of the aircraft that tend to become hot during reentry. Generally, heat generated by friction during reentry is concentrated at the leading portion of a spacecraft. Temperature transducers may be located along, or close to, the edge of a circularly symmetric aircraft (i.e. close to where the upper surface and lower surface meet). Some location along the edge may be considered a leading location at any given time (i.e. some portion of the aircraft is a lead portion at a given time). The temperature of the leading location is measured and is compared with a threshold temperature to determine if the temperature of the leading location is greater than the threshold temperature 352. If the temperature at the leading location is not greater than the threshold temperature, then the aircraft may maintain the current orientation 354. If the temperature at the leading location is greater than the threshold then the aircraft may be rotated 356 (e.g. using planetary modules to offset thrust from the direction of travel) thereby rotating the leading location. The former lead portion can then cool down while a new portion is rotated to the front to become the lead location. In this way, heat generated by friction during reentry may be distributed among various portions of the aircraft instead of concentrating the heat in a particular portion (e.g. a nose section). When a given portion becomes hot, it is rotated out of the lead position so that heat can dissipate. Since both portions have substantially the same profile there is little or no change in drag or friction from such a change in orientation. In some cases, rotation may be continuous, and an aircraft may rotate with an angular velocity that is controlled to ensure that heat is distributed adequately and no portion exceeds a threshold temperature.

Figure 4A:
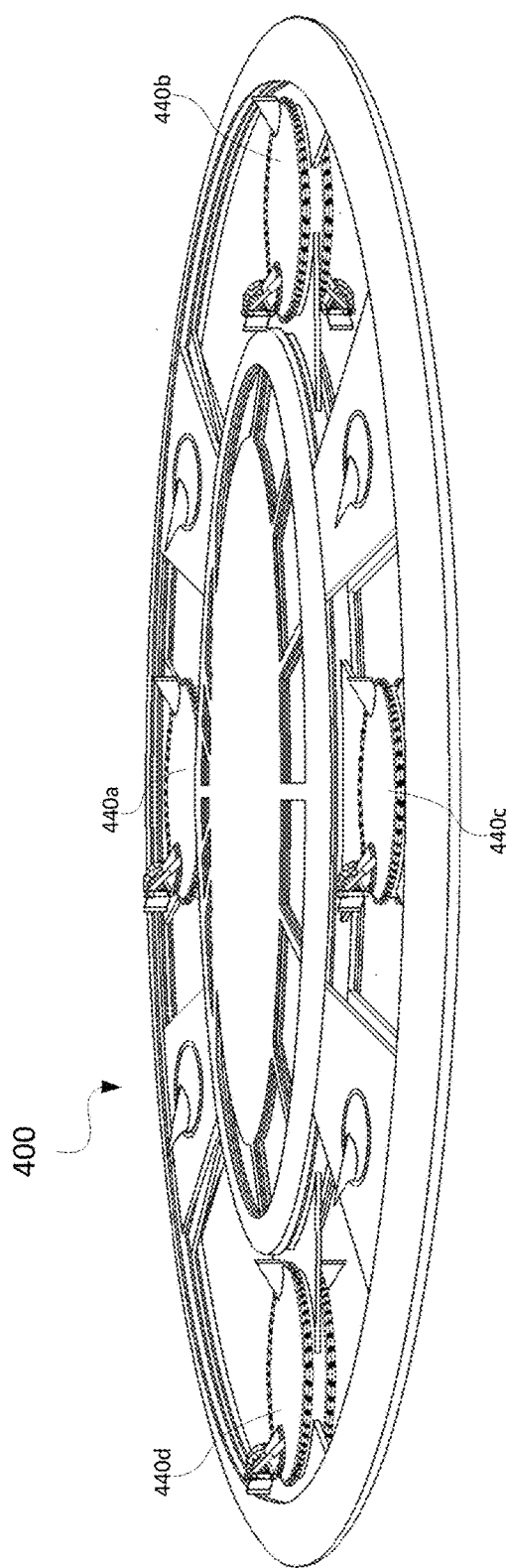
FIGS. 4A-B show rotatable planetary modules in an aircraft.

Planetary modules may be mounted within a fuselage in various ways. FIG. 4A shows an example of an aircraft 400 in which planetary modules 440*a-d* are rotatably mounted using an electrodynamic suspension system. Electrodynamic suspension is a form of magnetic levitation in which conductors are exposed to time-varying magnetic fields. This induces eddy currents in the conductors that create a repulsive magnetic field. The repulsive magnetic field holds the two objects apart or, at least, reduces contact. Time varying magnetic fields can be caused by relative motion between two objects such as between an electrodynamic ring around a planetary module and a corresponding electrodynamic ring in a planetary module receptacle in an aircraft. Magnetic fields may be controlled to maintain a fixed distance between an outer surface of a planetary module and an inner surface of the aircraft (e.g. using electromagnets arranged around an opening in the aircraft that encircles the planetary module).

Planetary modules 440*a-d* may lock into position and electrodynamic suspension may be switched off when they are expected to maintain the same orientation for an extended period. When planetary modules are to be rotated, the electrodynamic suspension may be activated so that planetary modules may be easily be rotated within the aircraft. In some cases, stepper motors, servo motors, or other electrical motors are used to mechanically turn planetary modules within an aircraft.

FIG. 4A shows a cut-away view of planetary modules 440*a-d* in their operating position within aircraft 400. It can be seen that planetary modules 440*a-d* are substantially flush with surfaces of aircraft 400 so that aircraft 400 is aerodynamic. A planetary module has an upper cover that is substantially flush with the upper surface of the aircraft and a lower cover that is substantially flush with the lower surface of the aircraft. Openings for intake and/or exhaust may be designed to be aerodynamic and may include retractable covers to reduce drag when not in use e.g. rocket exhaust may be covered when rocket is not in use and the intake and/or exhaust of a jet engine may be covered when the jet is not in use. In some cases, a scoop may project outward of a surface of an aircraft to facilitate air intake for a jet engine. Such a scoop may be retractable to reduce drag when the jet engine is not in use. In some cases, a retractable scoop may cover the air intake when it is in the retracted position. In some cases, a nozzle may project outward of a surface of an aircraft to direct the exhaust of a jet or rocket. Such a nozzle may be retractable to cover the exhaust when not in use.

Figure 4B:
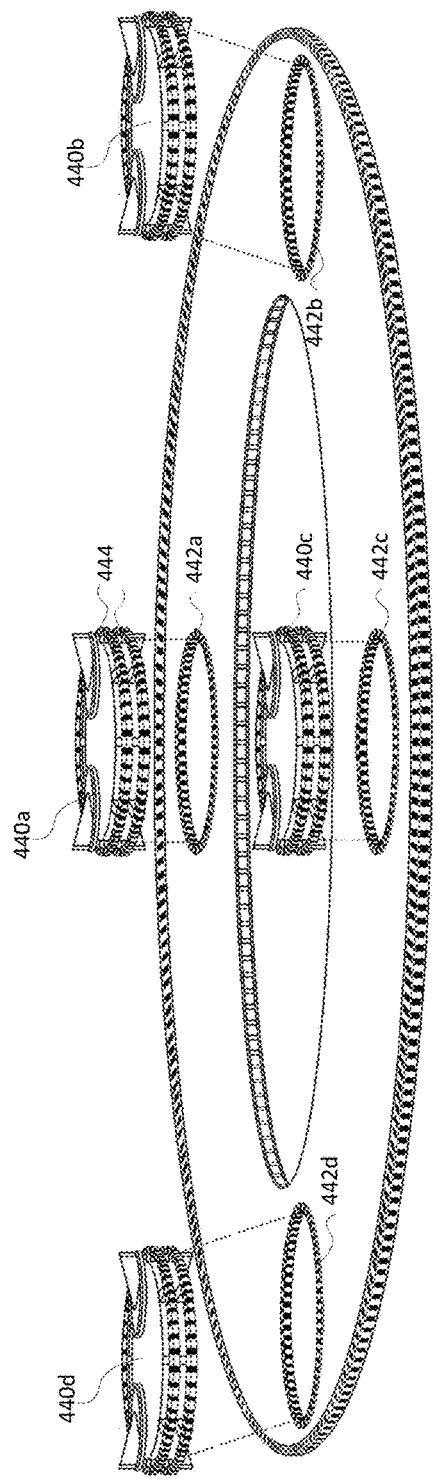

FIG. 4B shows an exploded view of some components of aircraft 400. Planetary modules 440*a-d* are shown separately from respective receptacles 442*a-d* in aircraft 400. An individual planetary module 440*a* is designed to fit in corresponding receptacle 442*a* so that an upper cover of planetary module 440*a* is flush with an upper surface of aircraft 400 and a lower cover of planetary module 440*a* is flush with a lower surface of aircraft 400 (some elements may extend beyond the surfaces such as fins, nozzles, cowlings, or other projecting components). Rings of electromagnetic elements extend about planetary modules and receptacles as components of the electromagnetic suspension system that allows planetary modules to be rotated. For example, planetary module 440*a* has rings 444 of magnetic elements (two rings in this example) that are coupled with rings of corresponding electromagnetic elements around an inner surface of receptacle 442*a*. Rings of electromagnetic elements around inner surface of receptacle 442*a* may be controlled to position planetary module 440*a* and to rotate it as desired.

FIG. 5 illustrates an example of a planetary module 500 in cross section, showing two jet engines 502, 504 arranged in an X configuration. A first jet engine 502 extends from bottom right to top left, having an air intake 505 extending through a lower surface 506 and having an exhaust nozzle 508 extending through an upper surface 510. Thus, first jet engine 502 is directed outward of upper surface 510 and toward the left side of FIG. 5 to generate thrust to the right side. A second jet engine 504 extends from the top right to the bottom left, having an air intake 512 extending through upper surface 510 and having an exhaust nozzle 514 extending through the lower surface 506. Thus, the second jet engine is directed outward of the lower surface and toward the left side of FIG. 5 to generate thrust to the right side. First and second jet engines 502, 504 may be offset from a central axis of the planetary module 500 so that they do not intersect. FIG. 5 also shows a fuel tank 518 located within planetary module 500. In some cases, a fuel tank within a planetary module may provide fuel to jet engines when a planetary module is unable to obtain fuel from a main fuel source that is external to the planetary module. Such a local source of fuel may have advantages at times, for example, when pumping fuel from other areas of the aircraft may be difficult or impossible (e.g. in emergency situations, loss of power, during high-speed maneuvers when g-forces are high).

FIG. 6 shows another example of a planetary module including two jet engines in an X configuration with air intakes and exhaust nozzles retracted. In this configuration, air intake 512 is retracted so that it is flush with upper surface 510 and exhaust nozzle 508 is also retracted and is flush with upper surface 510. Similarly, air intake 505 and exhaust nozzle 514 are retracted and are flush with lower surface 506. This configuration may seal jet engines when in space and may provide less drag when in air and the jet engines are not in operation.

Figure 7A:
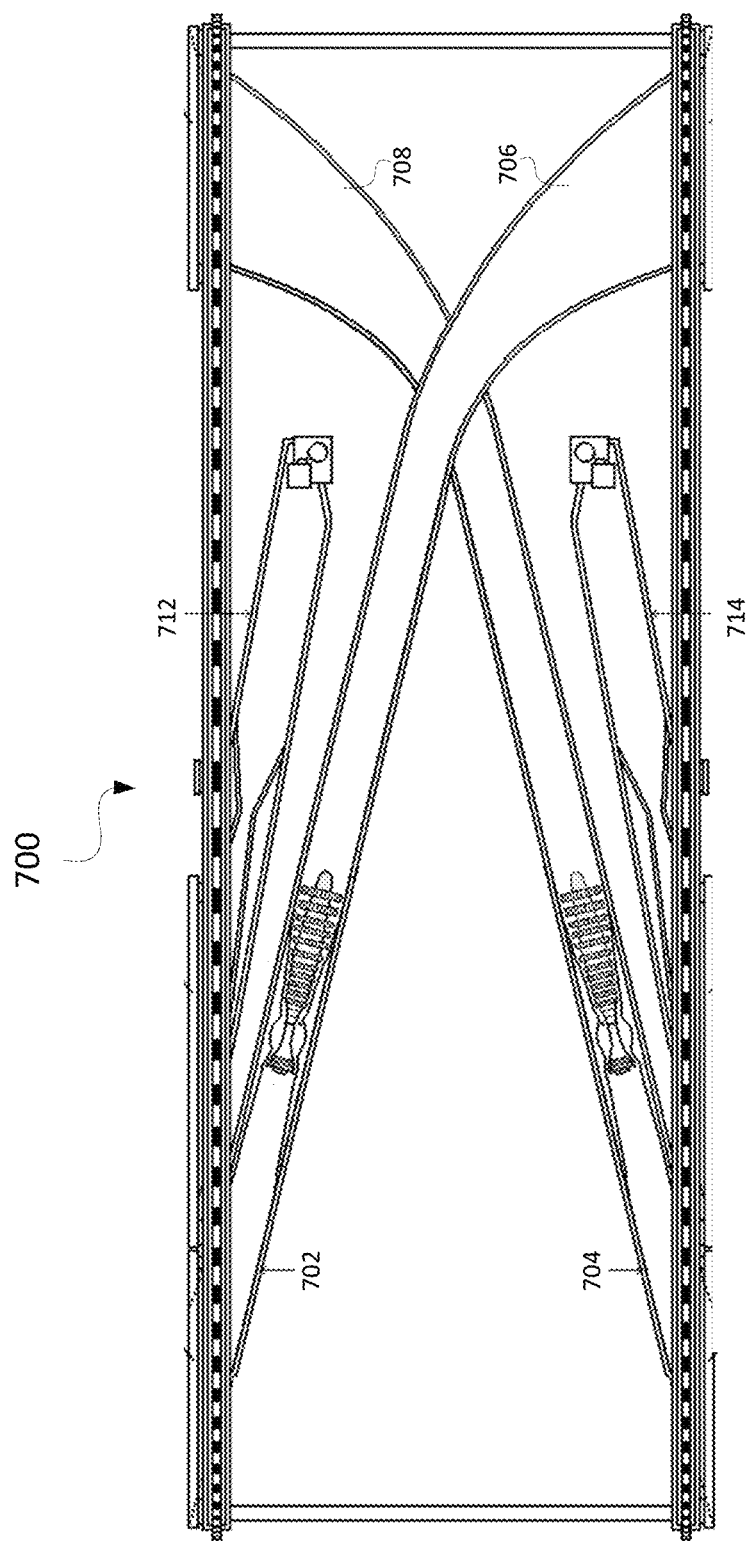
FIGS. 7A-G show examples of planetary modules with jet and rocket engines.

FIG. 7A shows another example of a planetary module 700 including two jet engines 702, 704. In this example, jet engines 702, 704 are configured with separate air intake ducts 706, 708 that substantially redirect air provided to the jets so that jets may be oriented in a near-horizontal configuration and thus generate thrust that has a large lateral component. Jet engine 702 is coupled to air intake duct 706 and jet engine 704 is coupled to air intake duct 708. In other examples exhaust ducts may redirect exhaust gasses. For example, exhaust gas from an upper jet may be redirected from its initial direction (along the axis of rotation of the jet turbines) to a more vertical direction so that exhaust gas is directed downwards in a near-vertical direction. This may produce thrust that has a larger vertical component than if the exhaust was not redirected. Vertical thrust provided by this configuration may be useful during takeoff and landing when lift provided by lateral movement is not sufficient. In some cases, redirecting may be configurable as needed using a movable duct or nozzle so that thrust may be directed vertically for takeoff and landing and may be more lateral during flight. Both air intake and exhaust ducts may redirect air and exhaust gas respectively so that redirecting may be performed at the intake side, the exhaust side, or both intake and exhaust sides.

While planetary module 700 of FIG. 7A has two jet engines that are mounted in similar configurations, oriented in mirror-image orientations, in other examples, two jet engines in a planetary module may have different configurations.

In addition to jet engines 702, 704, planetary module 700 includes rocket engines 712, 714, which are paired with corresponding jet engines 702, 704. Rocket engine 712 is paired with jet engine 702, having a parallel orientation. Rocket engine 714 is paired with jet engine 704, having a parallel orientation. In some examples, a planetary module may switch between jet engines and rocket engines according to conditions while maintaining thrust in the same direction. For example, rocket engines may be used in space while jet engines are used in air.

Figure 7B:
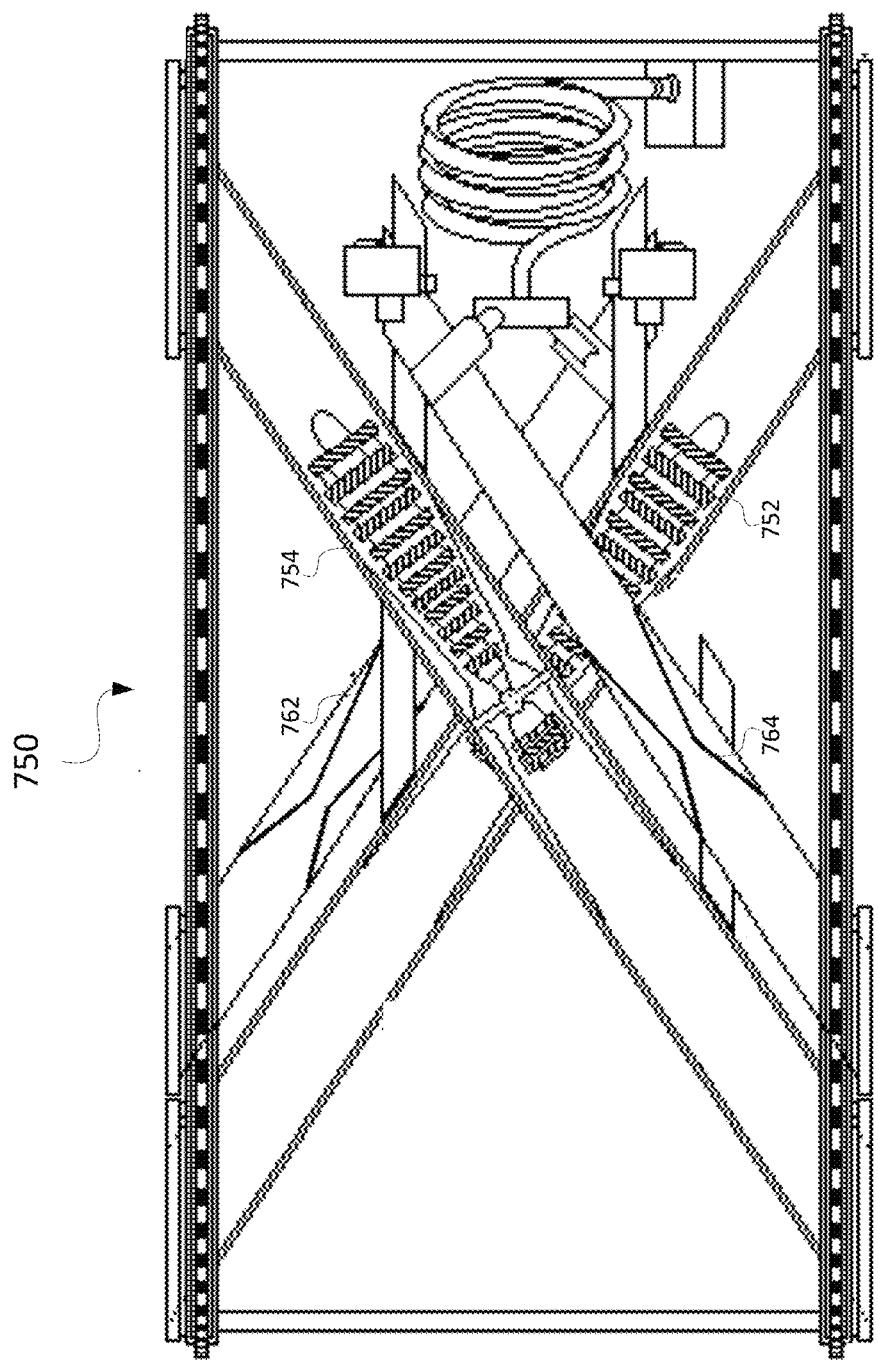

FIG. 7B shows another example of a planetary module 750 that includes both jet engines 752, 754, and also rocket engines 762, 764. Jet engine 752 is paired with rocket engine 762 so that they are parallel and have exhaust outlets close together on the top of planetary module 750. Jet engine 754 and rocket engine 764 are paired so that they are parallel and have exhaust outlets close together on the bottom of planetary module 750. In this example, jet engines 752, 754 are arranged in an X configuration as are rocket engines 762, 764.

Some planetary modules may be configured with jet engines, while other planetary modules are configured with rockets. A single module may also be configured with both jet engines and rocket engines as previously shown. Jet engines and rocket engines may be mounted so that their positions within a planetary module are fixed (i.e. they rotate as parts of the planetary module but retain their respective positions within the planetary module). Alternatively, jet engines and rocket engines may be mounted so that they can move within a planetary module thereby allowing reconfiguration of the planetary module. For example, a jet engine may be paired with a rocket engine so that they can be swapped as required. When flying through air, the jet engine may be in an active position and the rocket engine may be in an inactive position. When flying through space, the rocket engine may be in the active position and the jet engine may be in the inactive position. A suitable engine swapping mechanism may be configured to swap engines as needed so that the appropriate engine is active at any time.

Figure 7C:
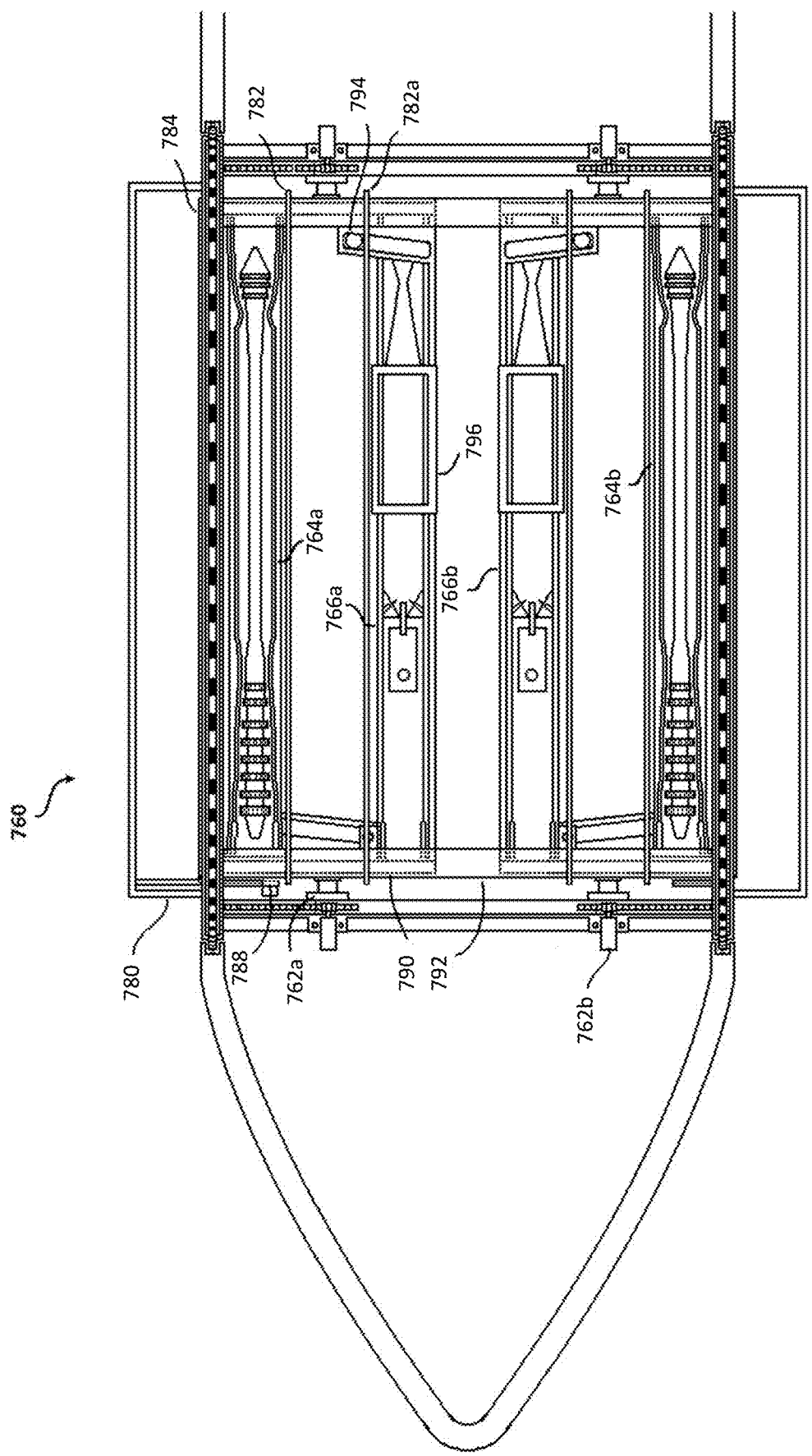

FIG. 7C shows a cross section of another planetary module 760 that includes rocket and jet engines with engine swapping mechanisms. In this example, an upper engine swapping mechanism 762a is configured to move upper jet engine 764a and upper rocket engine 766a, while a lower engine swapping mechanism 762b is configured to move lower jet engine 764b and lower rocket engine 766b. Engines are shown in retracted positions where they are inactive. An engine cover-rudder 780 is provided along the upper surface of planetary module 770 where an engine is located in the active position. Upper jet engine 764a is mounted with a seal 782 that seals against an opposing seal 784 when upper jet engine 764a is in the active position so that the interior of planetary module 760 may be pressurized. Upper rocket engine 766a is mounted with a seal 786 that similarly seals against opposing seal 784 when upper rocket engine 766a is in the active position. An air intake gate seal 788 is provided to seal the air intake in engine cover-rudder 780 as needed (e.g. when there is no engine in the active position as shown). An engine spindle jig 790 and spindle slide structure 792 are components of engine swapping mechanism 762a that facilitate rotational and vertical movement of the upper rocket engine 766a and upper jet engine 764a. A variable pitch mechanism 794 is coupled to upper rocket engine 766a to facilitate angling of upper rocket engine 766a when in the active position (shown in FIG. 7G). A rocket nozzle extension 796 is provided to extend the rocket nozzle as desired when in the active position (e.g. to expel hot exhaust gasses away from the fuselage of the aircraft to avoid heat-related damage).

Figure 7D:
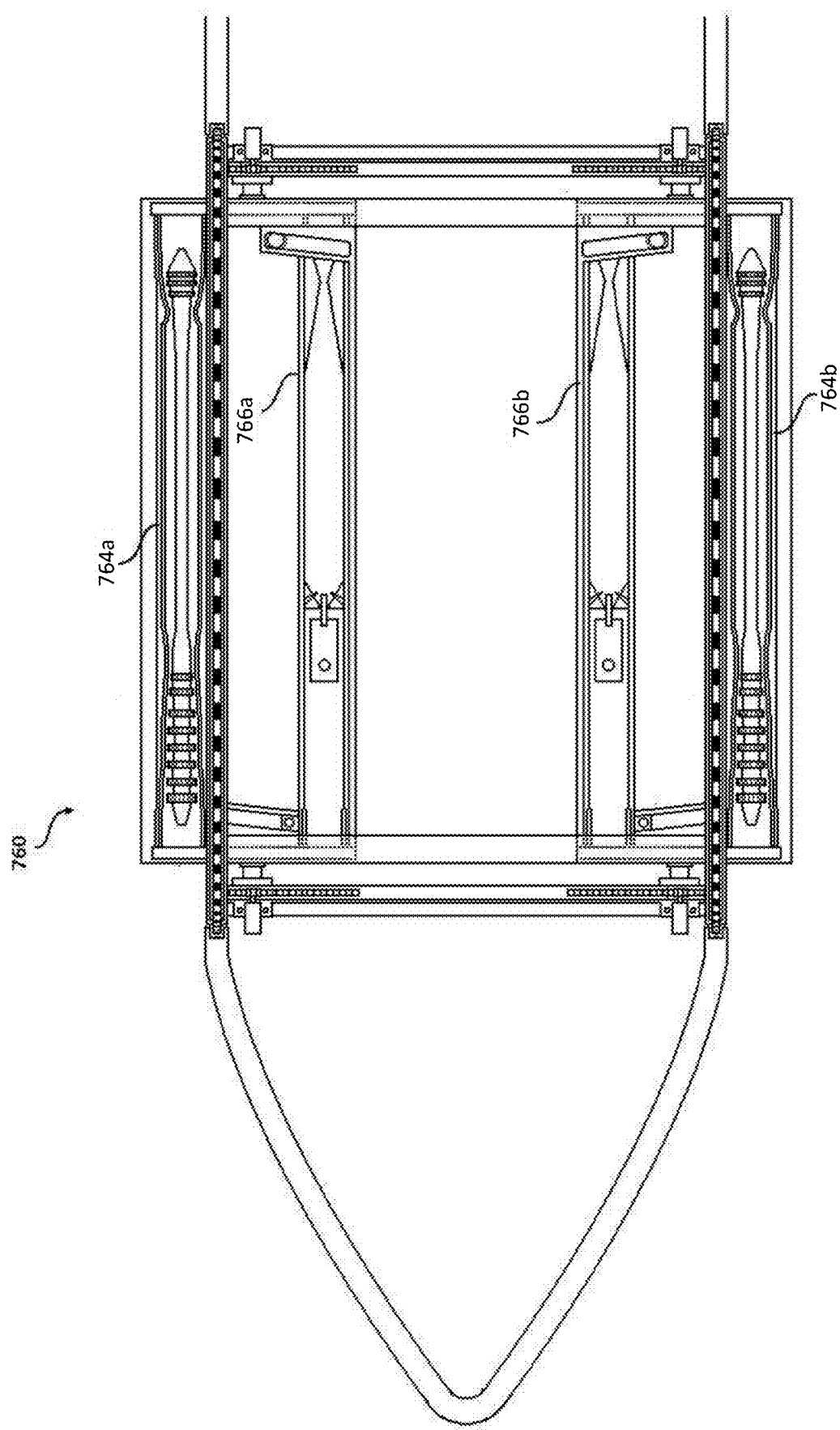

FIG. 7D shows planetary module 760 with upper jet engine 764a moved up to an active position and lower jet engine 764b moved down to an active position. In the active positions, upper jet engine 764a and lower jet engine 764b align with air intake openings and exhaust openings so that they can operate in air. Upper rocket engine 766a and lower rocket engine 766b remain in their inactive positions within planetary module 770.

Figure 7E:
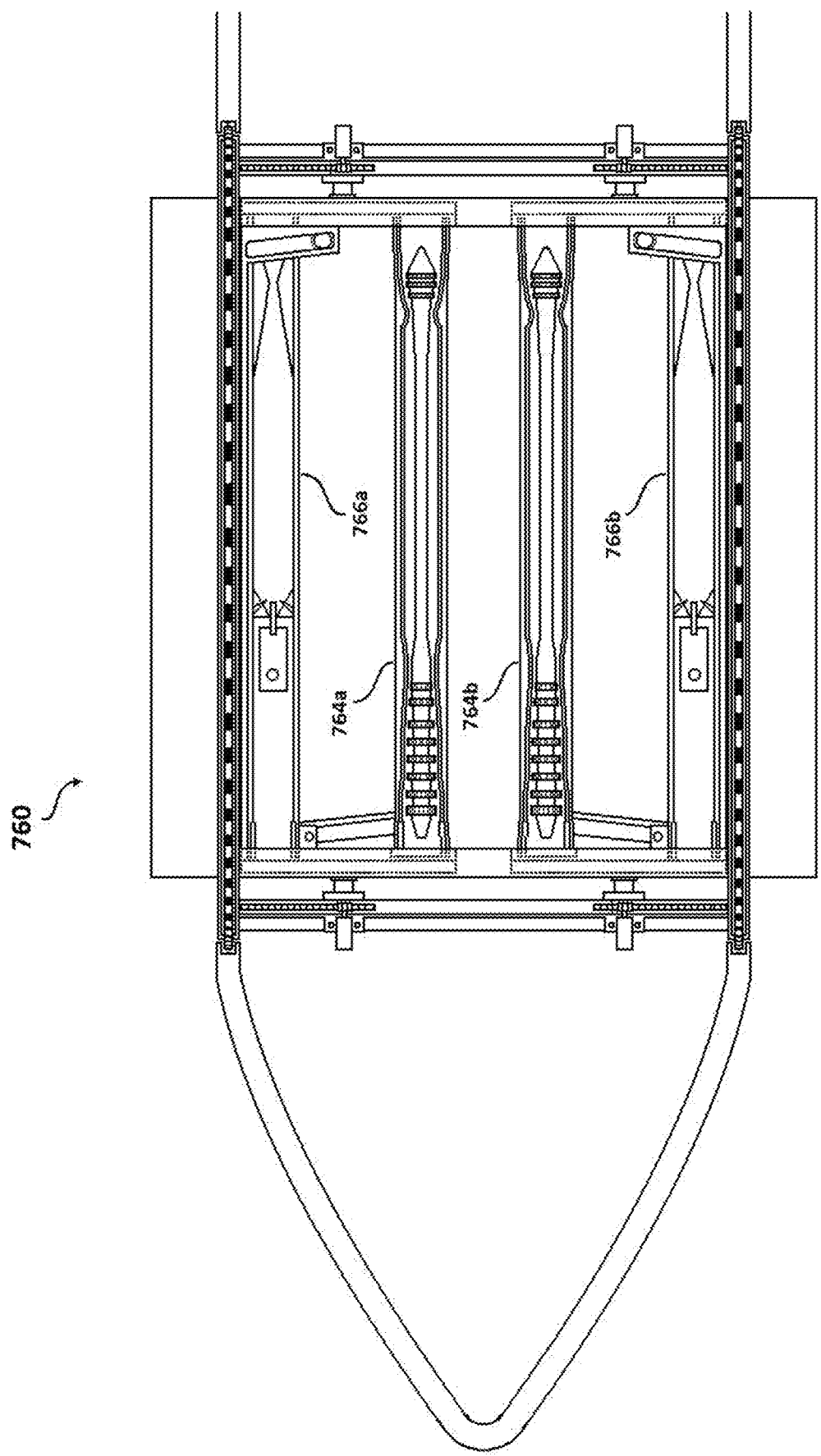
Figure 7:
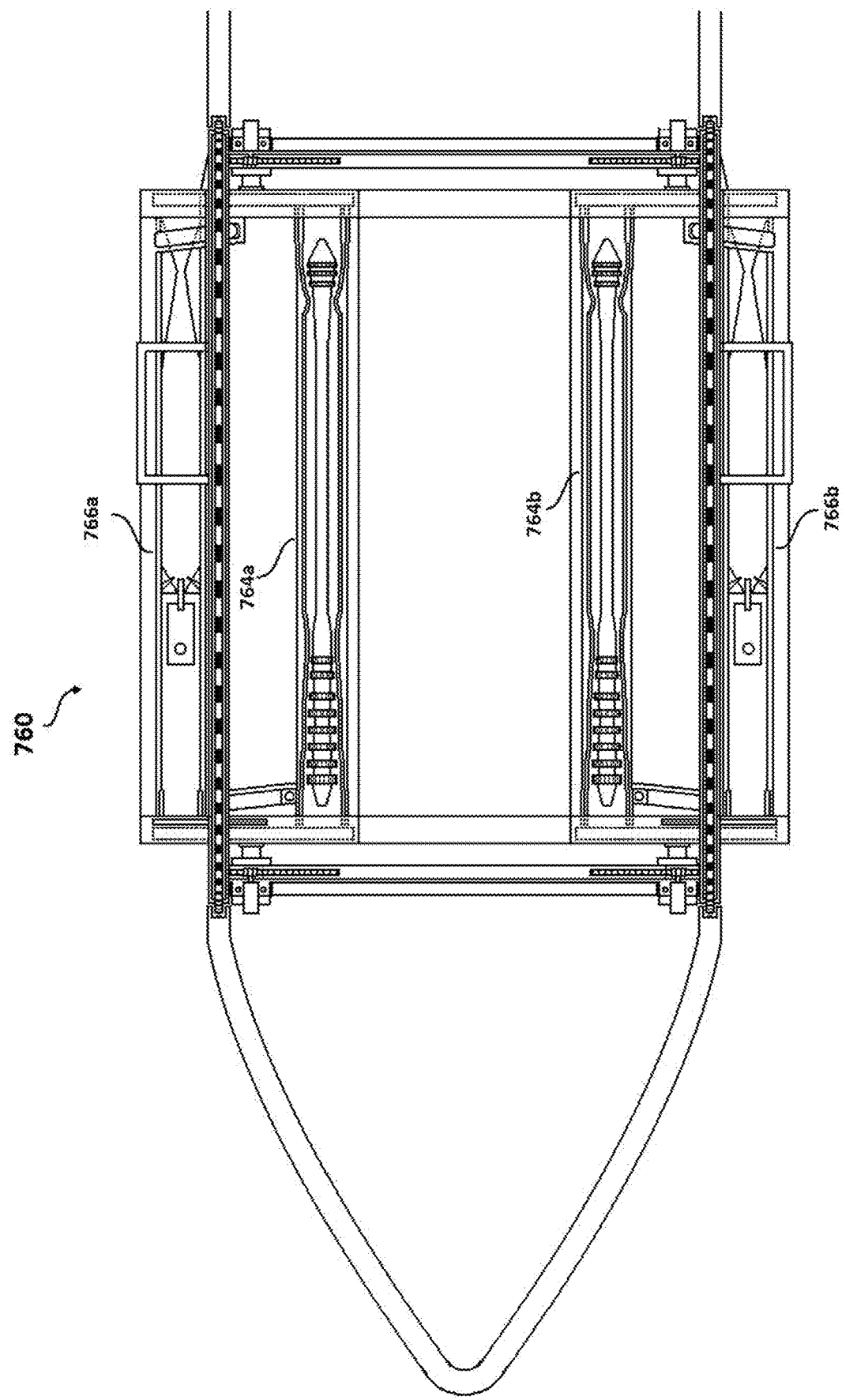
Figure 7:
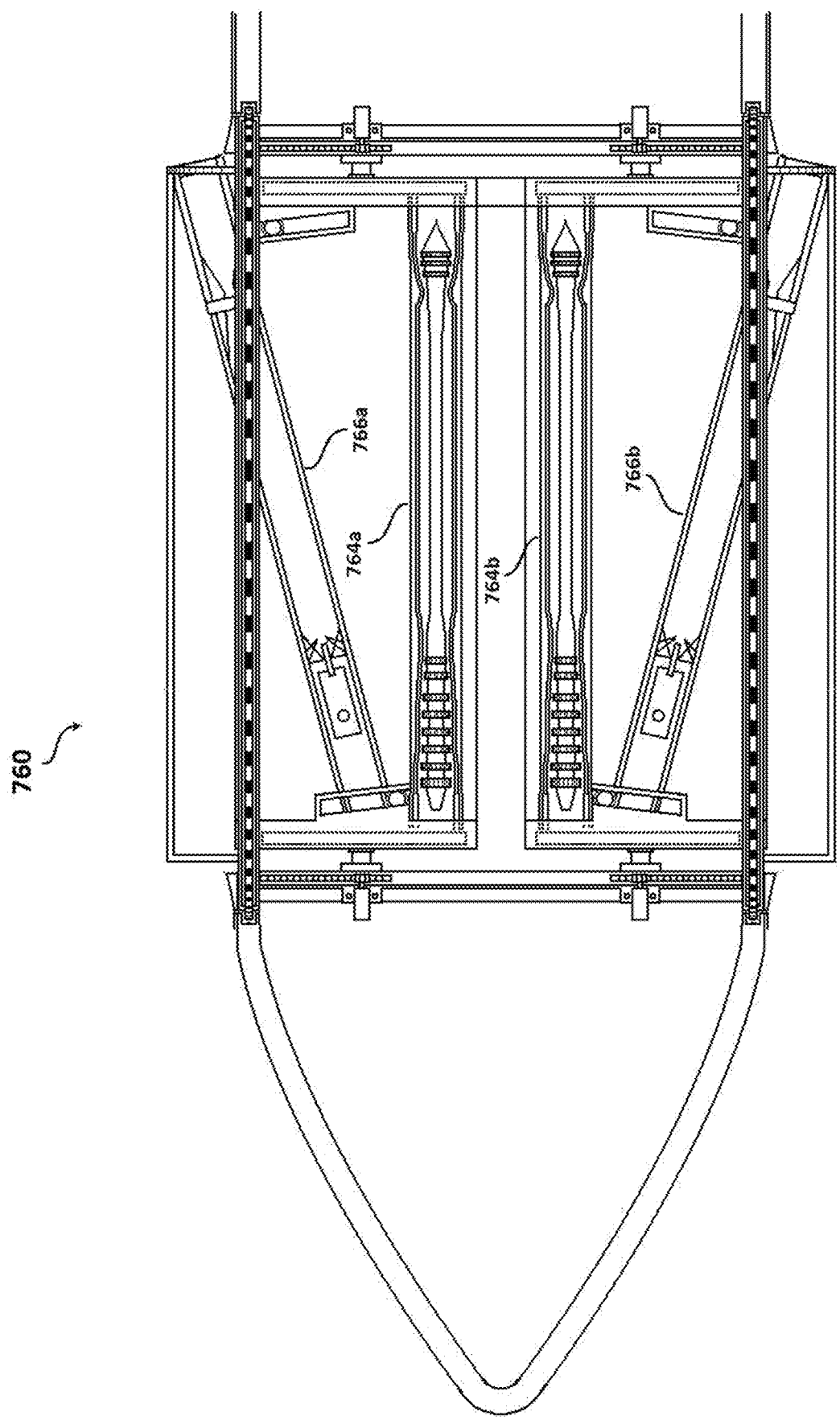

FIG. 7E shows planetary module 760 with both jet engines 764a-b and rocket engines 766a-b in inactive positions. The locations are swapped compared with FIG. 7C, with upper rocket engine 766a in the upper inactive position closer to the active position and lower rocket engine 766b closer to the active position.

FIG. 7F shows planetary module 760 with upper rocket engine 766a and lower rocket engine 766b in active positions where their exhaust nozzles direct exhaust gas out of planetary module 760 to propel the aircraft.

FIG. 7G shows an alternative arrangement for rocket engines 766a-b (which do not require an air intake) in planetary module 760. In this view rocket engines 766a-b tilt outwards so that their exhaust gasses are directed out of planetary module 760 while nose sections remain inside planetary module 760. Opposed screw mechanisms for raising and/or lowering either the feed end or discharge ends of the rocks are provided so that the rocket engine can be inclined at a variety of angles, including parallel. Angling of rocket engines in this manner may facilitate stability of an aircraft, e.g. upper rocket engine 766a and lower rocket engine 766b may be controlled to maintain a stable orientation, for example during re-entry.

FIG. 8 shows another example of a planetary module 800 including two jet engines 802, 804. In this example, jet engines 802, 804 share an air intake manifold 806, which has two air intakes, an upper air intake 808 and a lower air intake 810 (both of which are flush in this arrangement). Shared air intake manifold 806 is configurable so that air can be drawn from above, below, or both above and below. A gate valve 812 is provided that can divide the air intake manifold 806 in two. In this situation, the upper jet engine 802 draws air from an upper intake 808 and the lower jet engine 804 draws air from lower intake opening 810. The upper jet engine 802 expels exhaust gasses outward through upper exhaust opening 814 and the lower jet engine 804 expels exhaust gasses outward through lower exhaust opening 816. In some cases, both upper jet engine 802 and lower jet engine 804 may draw air through the same opening. A gate valve 818 is provided to close off lower air intake 810 so that both upper jet engine 802 and lower jet engine 804 draw air through the shared air intake manifold 806 from the upper air intake 808. For example, when an aircraft containing planetary module 800 is on, or close to the ground (e.g. during take-off and/or landing) gate valve 818 may be closed in order to avoid sucking in debris from the ground and to avoid creating a safety hazard if there are people nearby. This intake bypass method can be used in modules where the engines instead of being in the X configuration are both parallel with the craft's upper and lower exterior surfaces.

Figure 9A:
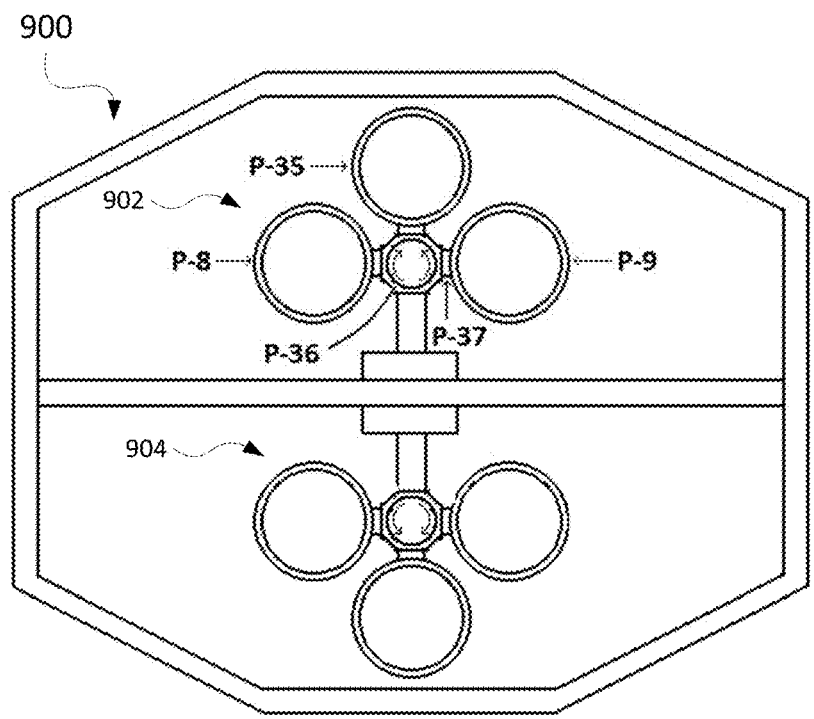

FIG. 9A shows a side-view cross sectional view of a planetary module 900 with an engine swapping mechanism 902 that is configured to swap a jet engine p-8 and a rocket engine p-9 between an active position and one or more inactive positions. An axis of rotation p-36 extends parallel to the jet engine p-8 and the rocket engine p-9 (i.e. perpendicular to the cross section shown) and allows engines to rotate using arms p-37 so that one of the engines is aligned with the exhaust duct p-35 and may be considered in an active position. The active position may also align with an air intake so that a jet engine is aligned with both air intake and exhaust outlets (while the rocket engine may not require an air intake, the active position may align the rocket engine similarly to the jet engine so that a rocket engine lies between air intake and exhaust openings in the active position.) When in an inactive position, an engine is not aligned with an exhaust opening (or air intake opening) and is not functional. This position may be sufficiently removed from the active position to allow maintenance while the engine in the active position is in operation. For example, both jet engine p-8 and rocket engine p-9 are in inactive positions in FIG. 9A. A second engine swapping mechanism 904 is shown in the lower half of planetary module 900. Engine swapping mechanism 904 may be a mirror image of engine swapping mechanism 902, and is configured to couple engines between intake and outlet openings on a lower surface of planetary module 900.

Figure 9B:
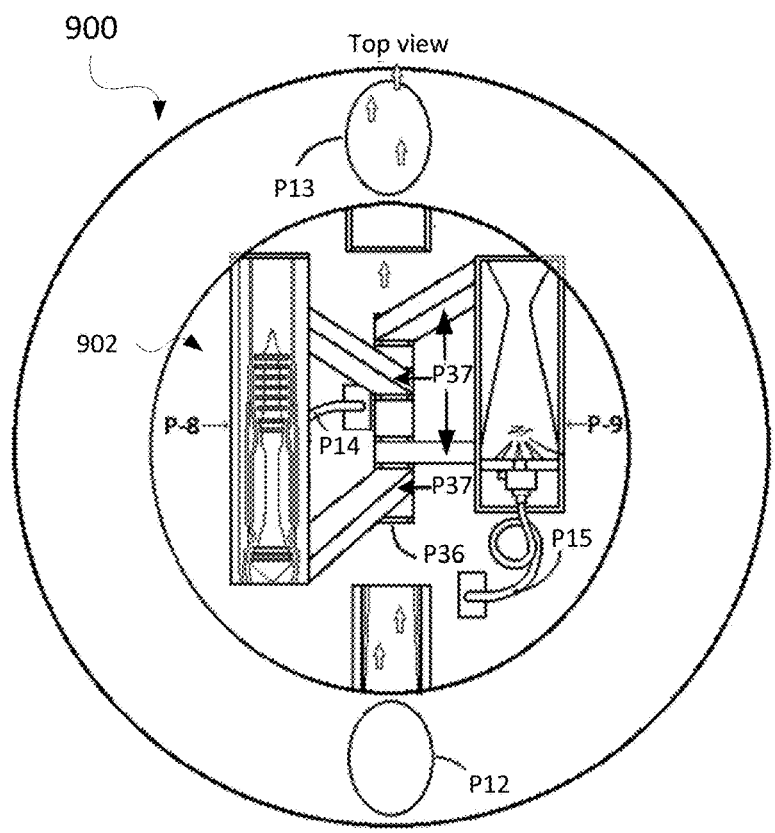

FIG. 9B shows a top view of planetary module 900 and engine swapping mechanism 902. Jet engine p-8 and rocket engine p-9 are mounted on arms p37 so that they are rotatable about central axis p36. Either one may be put in an active position where it is aligned with exhaust p-35. Flexible fuel lines p14 and p15 are provided to supply fuel to jet engine p-8 and rocket engine p-9 respectively. Air intake opening p12 and exhaust opening p13 extend through an upper surface of planetary module 900 (it will be understood that FIG. 9B shows a cut-away view and that a top surface generally extends over engine swapping mechanism 902 leaving only openings p12 and p13 extending into the interior of planetary module 900). Using the same module and swapping and support mechanism may save space and lessen weight.

Figure 9C:
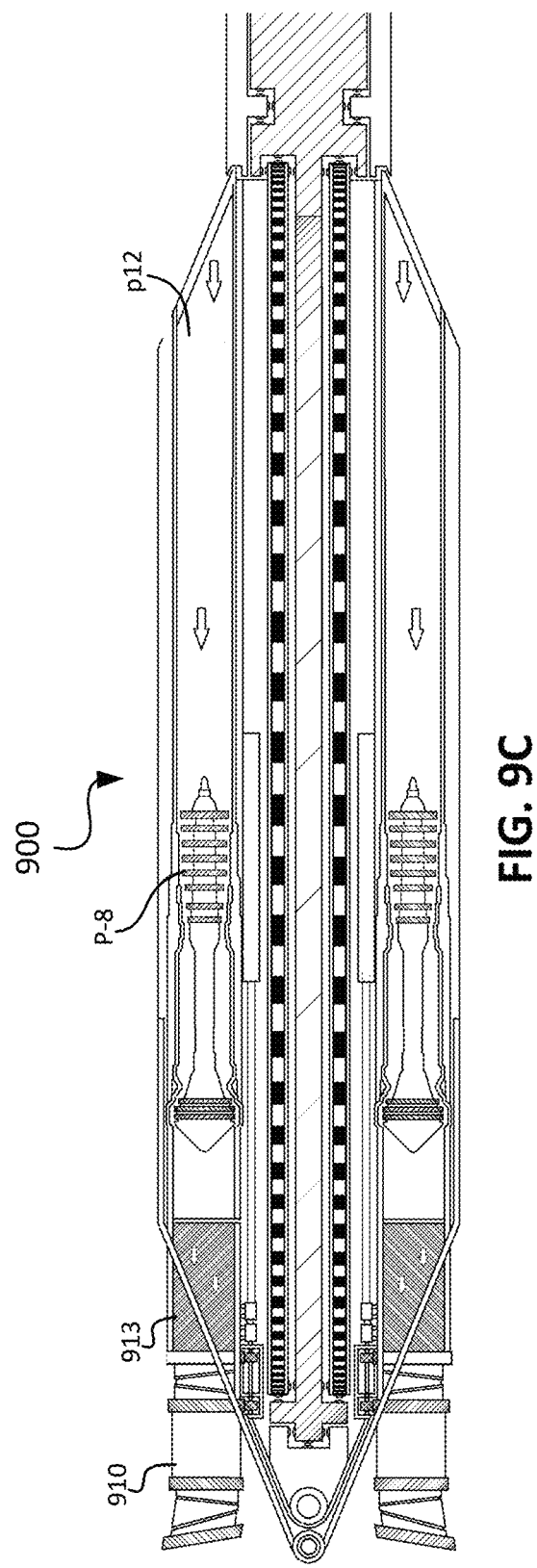

FIG. 9C shows a vertical cross section of planetary module 900 with jet engines in active positions. For example, upper jet engine p-8 is in the active position so that it can receive air from air intake opening p12 and expel exhaust gas through exhaust opening p13. It can be seen that planetary module 900 is contoured to allow thrust to be generated in a substantially horizontal direction. For example, air flows from air intake p12 through jet engine p-8 and out exhaust opening p-13 in a straight line (arrows indicate air flow through jet engines). An exhaust nozzle 910 is provided at exhaust opening p13 to direct exhaust gasses and provide further control of thrust.

FIG. 9D shows another cross section of planetary module 900 along a plane that is at 90 degrees to the plane of FIG. 9C. This view looks directly into intake opening p12 and shows a fin 950 that runs along the direction of the jet from intake opening p12 to exhaust nozzle 910 and that covers an engine in the active position (fin 950 may be considered an engine cover-rudder because it combines the function of covering the engine and acting as a rudder). Fin 950 may be used instead of fins on a fuselage (e.g. instead of fins 104a-d of FIG. 1A). A similar fin 952 extends along the underside of planetary module 900.

FIG. 9E shows an alternative embodiment with a low-profile planetary module 990 that also includes top and bottom fins 992, 994 respectively, which extend along upper and lower surfaces of planetary module 990. Fins 992, 994 cover engines and act as rudders and may be considered engine cover-rudders. Fins 992, 994 may be used instead of fins on a fuselage (e.g. instead of fins 104a-d of FIG. 1A).

While various examples of aircraft with circular symmetry are illustrated here, it will be understood that planetary modules may be used in a range of aircraft that includes aircraft that may not be circularly symmetric. FIG. 10A shows an example of an aircraft 1000 that has a circular central portion 1004 and has planetary modules 1002a-d mounted outside the central portion in an outer portion 1006 that is not circularly symmetric. Aircraft 1000 may produce lift when it moves laterally in any direction so that the advantages of rotatable planetary modules are substantially as discussed above even though aircraft 1000 is not substantially symmetric. For example, circular central portion 1004 may have a profile that creates lift when it travels laterally through the air and/or outer portion 1006 may have a profile that creates lift when it travels laterally through the air.

FIG. 10B shows a view of aircraft 1000 without the outer surface of aircraft 1000 to show the planetary modules 1002*a-d* mounted with rings of electromagnetic elements as parts of an electromagnetic suspension system that allow planetary modules 1002*a-d* to be rotated as needed.

Figure 11:
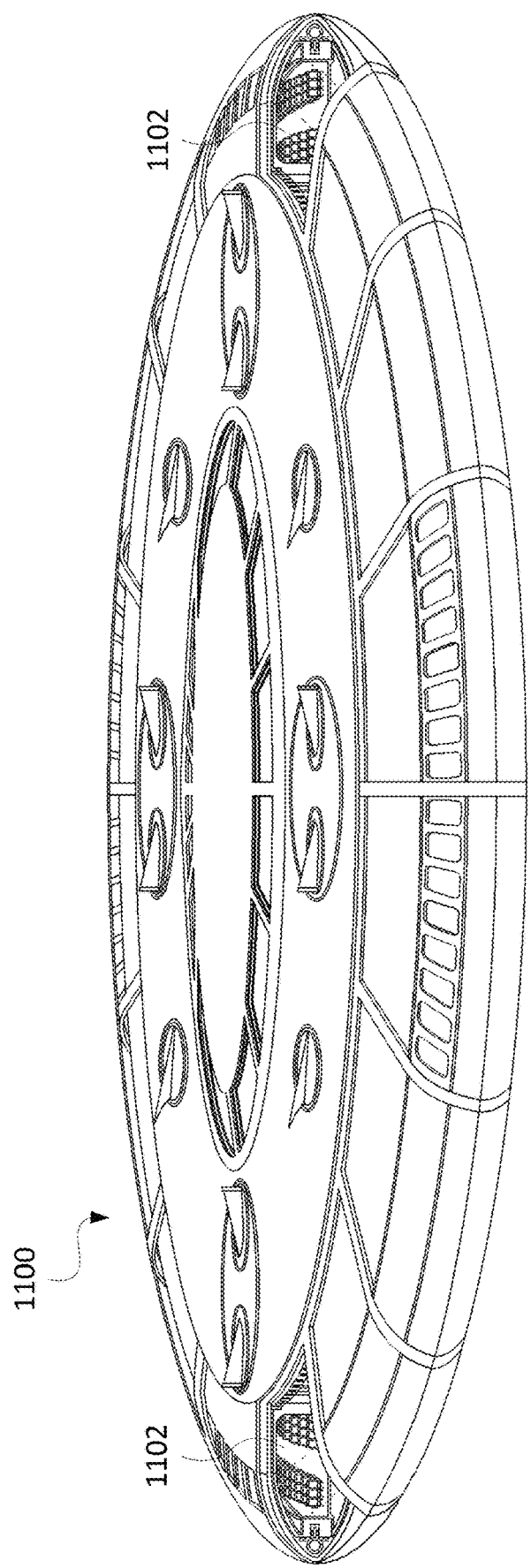
FIG. 11 shows an example of an aircraft with a passenger cabin.

FIG. 11 shows an example of an aircraft 1100 with circular symmetry that is configured for carrying passengers. FIG. 11 includes cutaway sections that show a passenger cabin 1102 that extends in a ring-shaped outer portion of aircraft 1100, with planetary modules and other aircraft systems in an inner portion of the aircraft. In this ring configuration, the passenger cabin 1102 has views out of the aircraft that are unobstructed by wings or engines and the engines are all within a relatively compact portion of the aircraft so that fuel lines, electrical lines, and other conduits are short, and thus infrastructure may be efficiently provided. A ring configuration allows passengers to get up and walk around easily and facilitates delivery of food and beverages to passengers. An automated delivery system may be provided to deliver items from a central location to passengers seated in such a passenger cabin.

Figure 12:
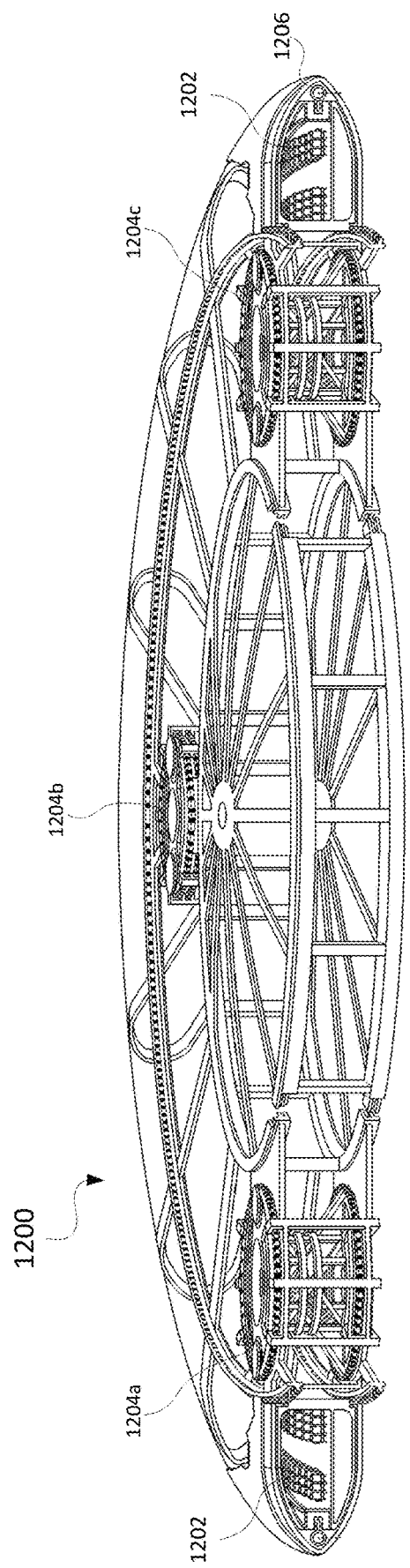
FIG. 12 shows an example of an aircraft with a passenger cabin in cross section.

FIG. 12 shows a passenger aircraft 1200 in cross section including the passenger cabin 1202 extending around a central portion of the aircraft that contains the planetary modules 1204*a-c*, which are illustrated in cutaway view to clearly show how planetary modules 1204*a-c* are mounted. In some embodiments, a central portion and an outer ring containing a passenger cabin may rotate relative to each other and may be coupled by an electromagnetic suspension system. FIG. 12 also shows a gyroscopic system 1206, in this example, extending around passenger cabin 1202 to provide stability. For example, a spinning magnetic ring may be spun at high speed in gyroscopic system 1206 to stabilize aircraft 1200.

Figure 13:
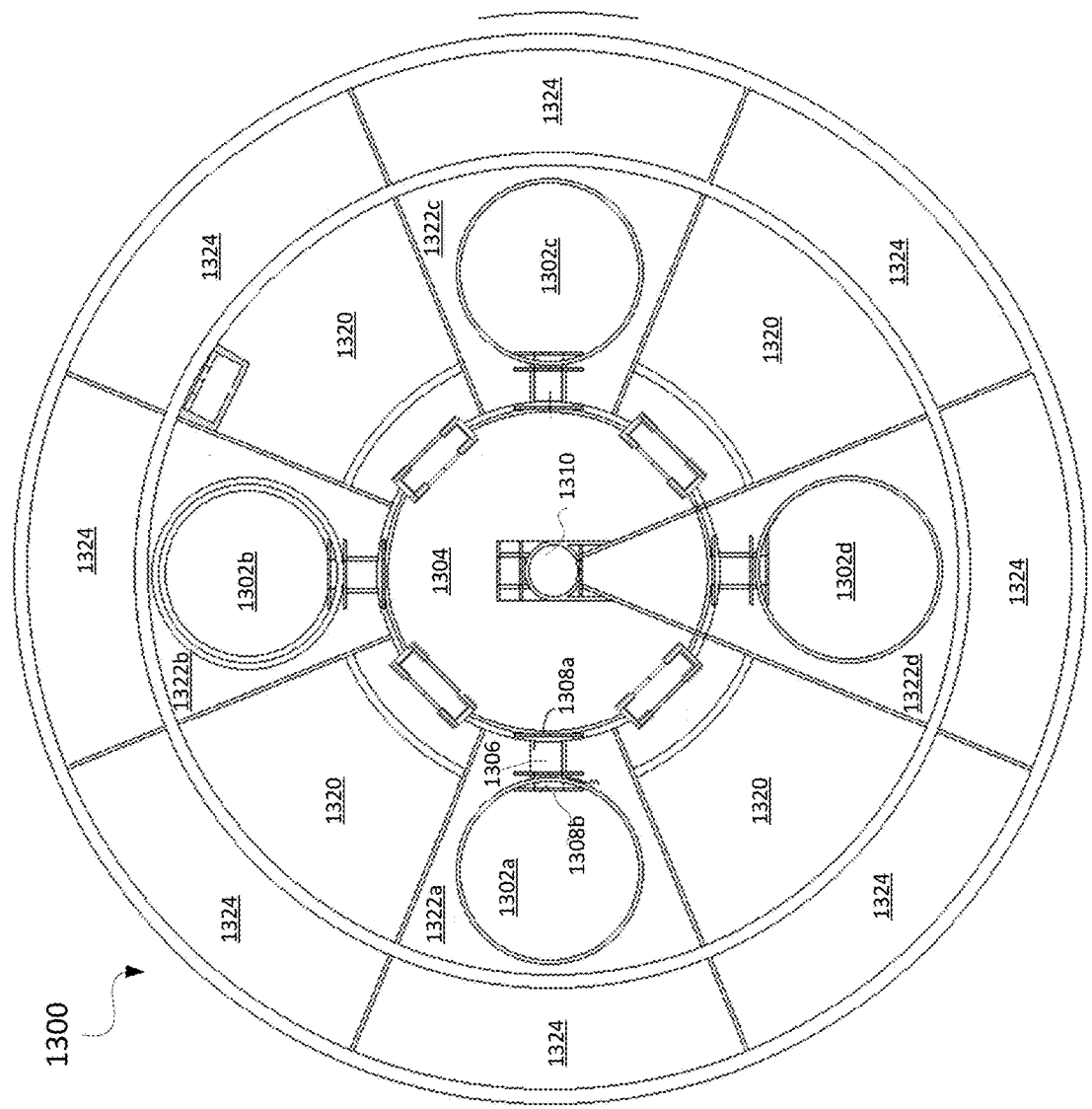
FIG. 13 shows an example of an aircraft with access to planetary modules.

FIG. 13 shows a cutaway view of a circularly symmetric aircraft 1300 that includes planetary modules 1302*a-d* and a central maintenance area 1304. Central maintenance area 1304 provides access to planetary modules 1302*a-d* through corresponding airlocks formed by pairs of doors. For example, planetary module 1302*a* is connected to central maintenance area 1304 through an airlock 1306 that is formed by doors 1308*a-b*. A central elevator 1310 is provided to access different levels within central maintenance area 1304 and may lead to a bridge deck located at the highest level of central elevator 1310. Central maintenance area 1304 may be maintained at atmospheric pressure so that crew can work there even when aircraft 1300 is at high altitude, or is in space. Other portions of aircraft 1300 may not be at atmospheric pressure. In some cases, planetary modules may be pressurized during operation. In other cases, planetary modules are not pressurized during operation but may be pressurized to allow maintenance. Airlocks may allow crew members to access planetary modules regardless of conditions (e.g. crew members may put on space suits and enter planetary modules that are not pressurized via airlocks). Passenger cabins 1320 are located in areas of aircraft 1300 between planetary modules as shown and are isolated from planetary modules 1302*a-d*. Planetary modules 13002*a-d* are located in secure, insulated, and pressurized rooms 1322*a-d* respectively. Rooms 1322*a-d* may provide security by preventing passenger access to planetary modules 1302*a-d* and may enhance safety of passenger cabins 1320 by reducing risk of injury in case of fire or mechanical failure in a planetary module. Pressurized corridor cabins 1324 extend around cabins 1320 and rooms 1322*a-d* to allow passengers and crew to move around between cabins 1320.

Figure 14:
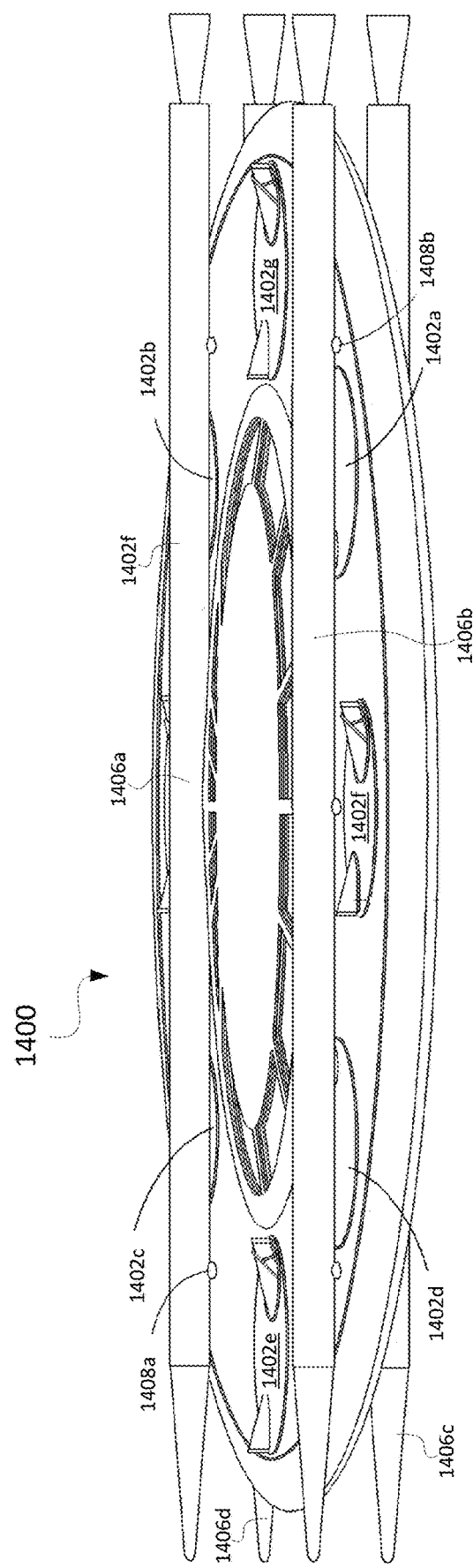
FIG. 14 shows an example of an aircraft with booster rockets.

FIG. 14 illustrates an example of an aircraft 1400 that includes planetary modules 1402*a-g* as in previous examples (e.g. containing jet engines and/or rocket engines). In addition, aircraft 1400 includes booster rockets 1406*a-d* to provide additional thrust to get off the ground and get into space, or near space. Booster rockets 1406*a-d* may be solid-fuel rockets or other one-time use rockets. Alternatively, booster rockets 1406*a-d* may be reusable. Booster rockets are detachable from aircraft 1400 so that they may be detached when they are depleted. Attachments 1408*a-b* may be latches that can unlatch to allow booster rockets 1406*a-b* respectively to fall away from aircraft 1400 (booster rockets 1406*c-d* are only partially visible in FIG. 14 so that corresponding attachments are not visible).

Figure 15:
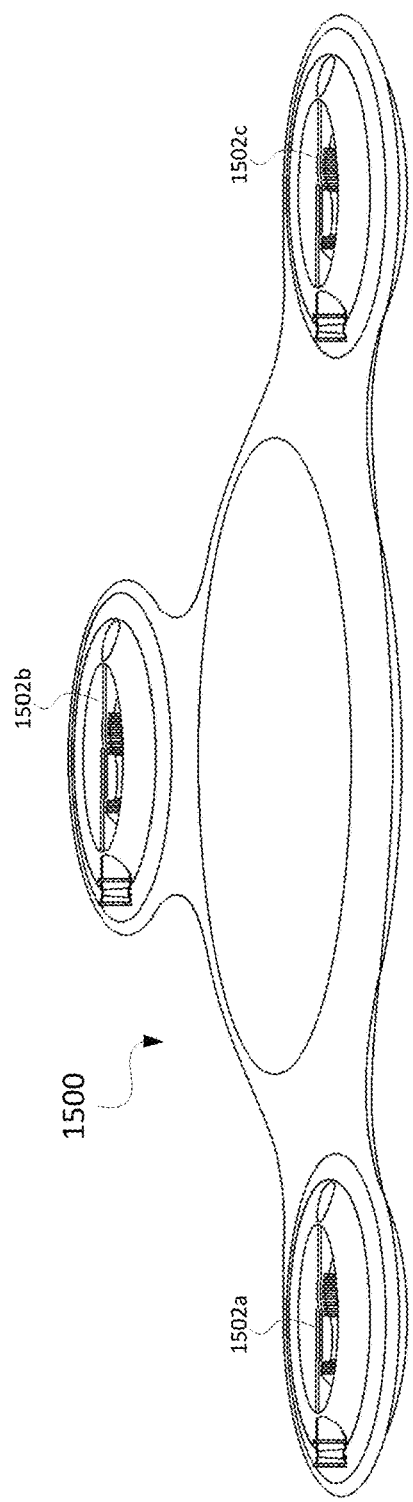
FIG. 15 shows an example of an aircraft with three planetary modules.

FIG. 15 shows an example of an aircraft 1500 that includes three planetary modules 1502*a-c* instead of four, or eight planetary modules as shown in prior examples. It will be understood that the number of planetary modules is not limited to any particular example shown here and that aspects of the present technology may be implemented with any suitable number of planetary modules. Other aspects shown in drawings here are also non-limiting and are provided for illustration.

Figure 16:
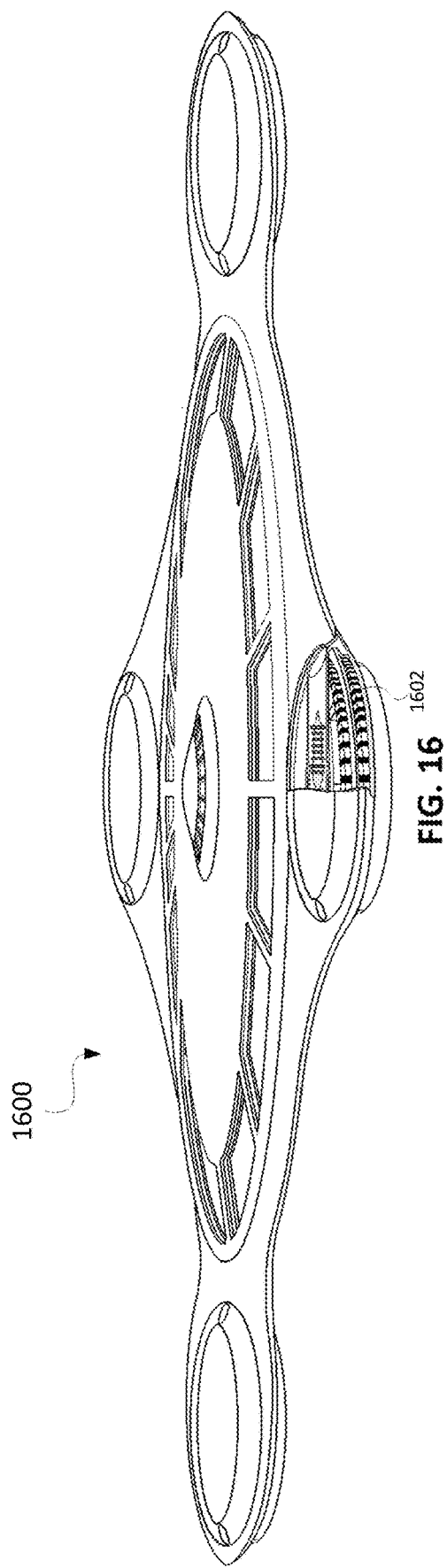
FIG. 16 shows an example of an aircraft with four planetary modules.

FIG. 16 shows an example of an aircraft 1600 that includes four planetary modules in a fuselage that is not circular in cross section along a horizontal plane and includes a cutaway portion 1602 showing how a jet engine is mounted horizontally without redirection of intake or output.

In some cases, it may be preferable for an aircraft to have a cross sectional shape that is not symmetric, e.g. that has a leading edge with a different shape to its trailing edge. A non-symmetric shape may be achieved in various ways. Lift may be modified by appropriately modifying the cross-sectional profile of an airfoil. In the case of an aircraft that does not have separate wings, the shape of the body of the aircraft may be modified by adding one or more components that are non-symmetric, while one or more central portions (e.g. aircraft fuselage) are symmetric (e.g. circularly symmetric so that there is no fixed "leading edge" or "trailing edge").

Figure 17:
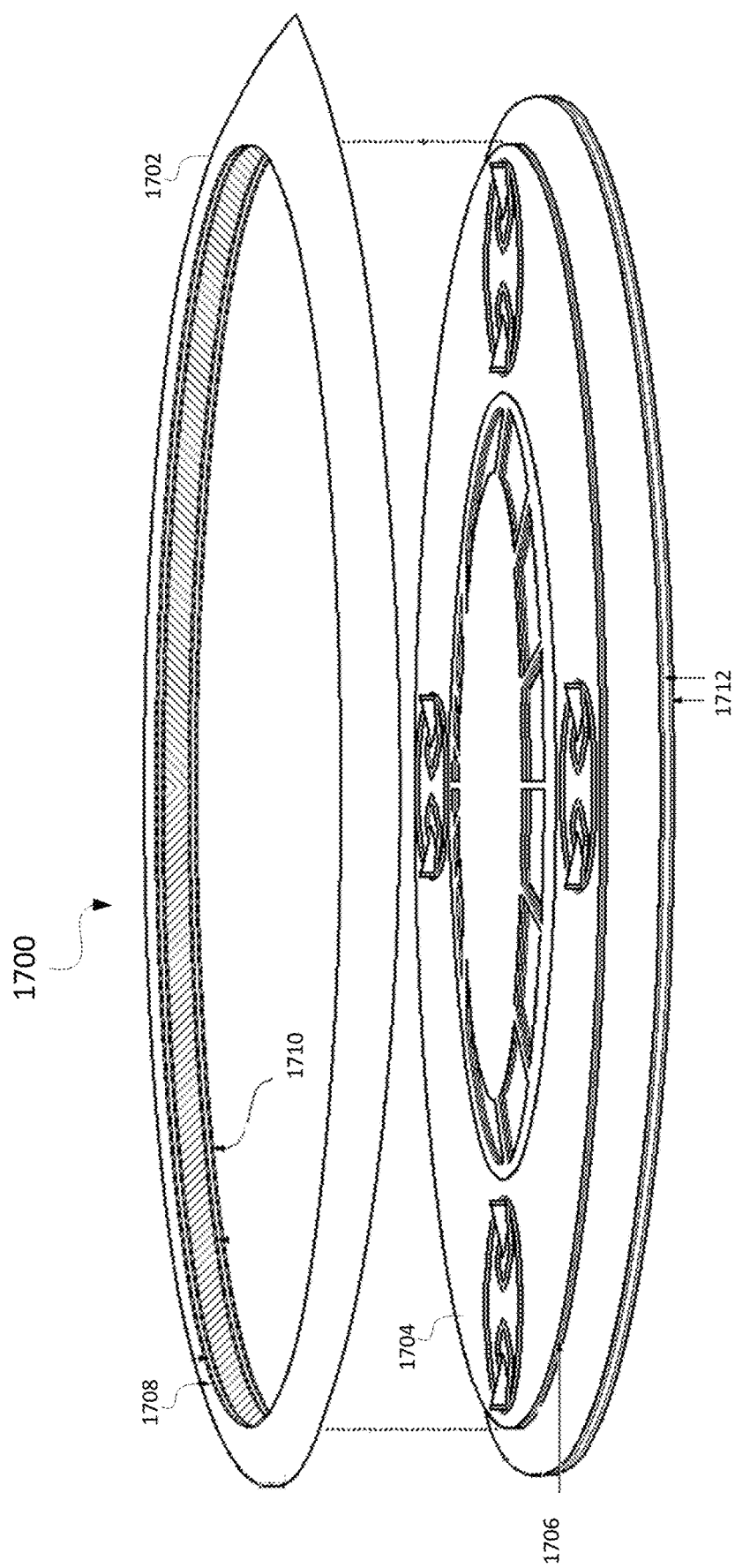
FIG. 17 shows an example of an aircraft with a Lift Profile Assembly (LPA) in expanded view.

FIG. 17 shows an example of an aircraft 1700 with a lift profile assembly, or LPA 1702, which is shown in a pull up portion of the drawing for illustration of features that would be hidden from view when LPA 1702 is coupled to fuselage 1704. LPA 1702 forms an outer ring of aircraft 1700, which modifies the profile of aircraft 1700 so that it is not symmetric and has a blunt rounded leading section with the trailing section being more pointed (this may be similar to an aircraft wing or other airfoil shape). In this example, LPA 1702 modifies the cross-sectional shape of aircraft 1700 (e.g. as compared with cross sectional shape of aircraft 100 shown in FIG. 1B) so that lift is increased. It will be understood that cross sectional shape may be modified in various ways and such changes are not limited to increasing lift.

Fuselage 1704 has an upper rim 1706 on its upper surface and a similar lower rim on the lower surface (only the upper surface is visible in FIG. 17). Upper rim 1706 and corresponding lower rim (not shown) are recessed ring-shaped assemblies that are configured to accommodate corresponding ring-shaped rims 1708, 1710, that are located along the inner surface of LPA 1702. Thus, upper rim 1706 engages rim 1708 and the lower rim (not shown) engages rim 1710 to maintain LPA 1702 in place with respect to fuselage 1704 while controlling rotation of LPA 1702 about fuselage 1704. Rims 1708, 1710 mirror corresponding rims and allow for some rotational clearance between components. Additional views of examples of this engagement are shown below.

An LPA such as LPA 1702 may be coupled to a fuselage such as fuselage 1704 in various ways including using techniques described above for coupling planetary modules to a fuselage, e.g. electrodynamic suspension using time-varying magnetic fields to induce eddy currents that create repulsive magnetic fields. The repulsive magnetic field holds the two objects apart or, at least, reduces contact. Time varying magnetic fields can be caused by relative motion between two objects such as between an electrodynamic ring around a fuselage and a corresponding electrodynamic ring in an LPA. Magnetic fields may be controlled to maintain a fixed distance between an outer surface of a fuselage and an inner surface of the LPA. Electromagnetic components may lock into position and electrodynamic suspension may be switched off when they are expected to maintain the same orientation for an extended period. When an LPA is to be rotated, the electrodynamic suspension may be activated so that the LPA is rotated with respect to the fuselage. In some cases, stepper motors, servo motors, or other electrical motors are used to mechanically turn planetary modules within an aircraft. Rotational support components (RSC) and Rotational Position Components (RPC) may be provided along engaged rims that oppose each other to facilitate rotation of LPA 1702 about fuselage 1704. RSC may refer to systems that include such components as bearings, housings, electromagnetic and/or electrodynamic suspension, etc. RPC may refer to systems that use servo, fly-by-wire, electromagnetic position regulator, actuators, or other components. Such systems may be combined and may be used to provide accurate support and placement of LPA 1702 about fuselage 1704. Rims, such as rims 1706, 1708, 1710, may include one or more RSC and/or RPC components.

A second pair of rims (not visible in FIG. 17) are provided along the inner surface of LPA 1702 to engage outer rims 1712 of fuselage 1704. In some cases, more than two such pairs of rims may be provided. Any opposing rims may be provided with RSC and/or RPC components to ensure structural integrity of aircraft 1700 when subject to high loads, e.g. during maneuvers that subject aircraft 1700 to high g-forces and to allow rotational adjustment of LPA 1702 with respect to fuselage 1704 as desired.

Figure 18:
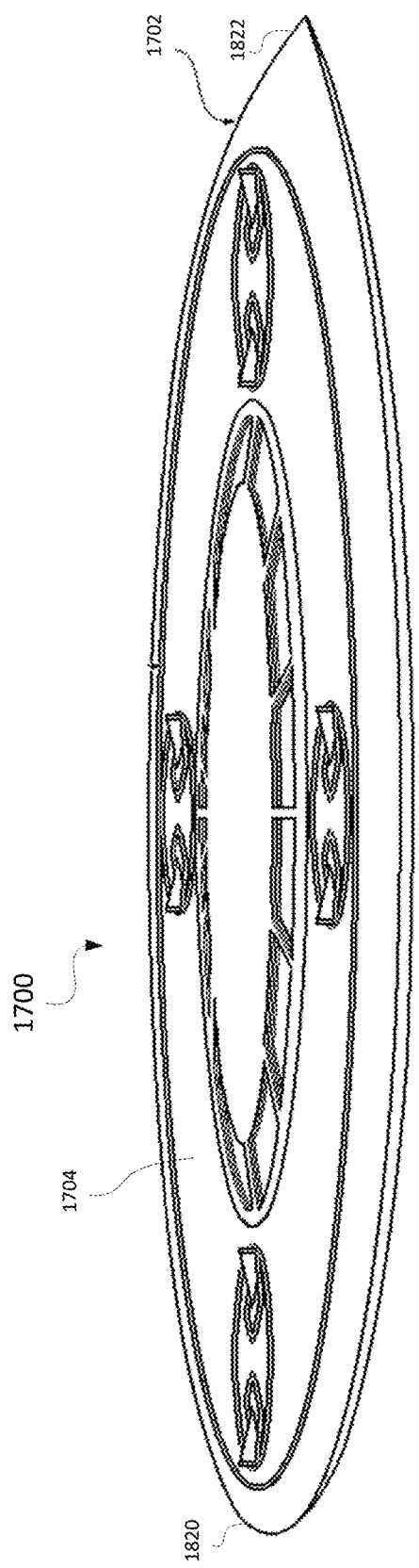
FIG. 18 shows an example of an aircraft with LPA in place.

FIG. 18 shows another view of aircraft 1700, in this case, with LPA 1702 and fuselage 1704 in operational position so that they are coupled to each other, with some clearance between them to allow rotational movement. The interlocking features of the outer surface of fuselage 1704 and inner surface of LPA 1702 ensure close alignment of these components so that the profile of aircraft 1700 remains the same, while the orientation may change. The interlocking features such as rims, recesses, bearings, RPC and RSC components, etc. are not visible in FIG. 18.

The leading edge 1820 of LPA 1702 of aircraft 1700 presents a rounded, blunt exterior surface, while the trailing edge 1822 forms a tapered, pointed edge (examples of cross-sectional views are provided below). While fuselage 1704 may be circularly symmetric about a central axis so that it has the same profile along any vertical plane through its center, LPA 1702 is non-symmetric as shown, having a leading edge and trailing edge that enhance aerodynamic performance of aircraft 1700. In particular, a non-symmetric profile may provide greater lift than a corresponding symmetric profile would. By rotating LPA 1702 about fuselage 1704, the orientation of optimum lift may be changed according to the direction of travel. This may be achieved without rotating fuselage 1704. As discussed above, changes in direction of travel may be achieved by changing orientation and/or power of one or more thrust generators (e.g. jet engines) mounted in planetary modules and/or use of rudders, fins, or other elements to affect airflow.

Orientation of LPA 1704 with respect to fuselage 1702 may be active (e.g. using servo motors, or other RPC components to rotate LPA 1704 about fuselage 1702) or may be passive (e.g. using forces generated by changes in orientation to rotate LPA 1704 about fuselage 1702) or may use a combination of active and passive techniques. For example, the center of mass of LPA 1704 may be towards trailing edge 1822 so that when aircraft 1700 turns to the right, centrifugal forces tend to turn trailing edge 1822 outwards from the turn direction and this reorients LPA 1704 with trailing edge 1822 away from the direction of travel and leading edge 1820 facing the direction of travel. Regulation of rotation of LPA 1704 may be achieved using RPC and RSC components, for example, applying dampening and breaking forces to avoid sudden changes in orientation of LPA 1704.

Figure 19:
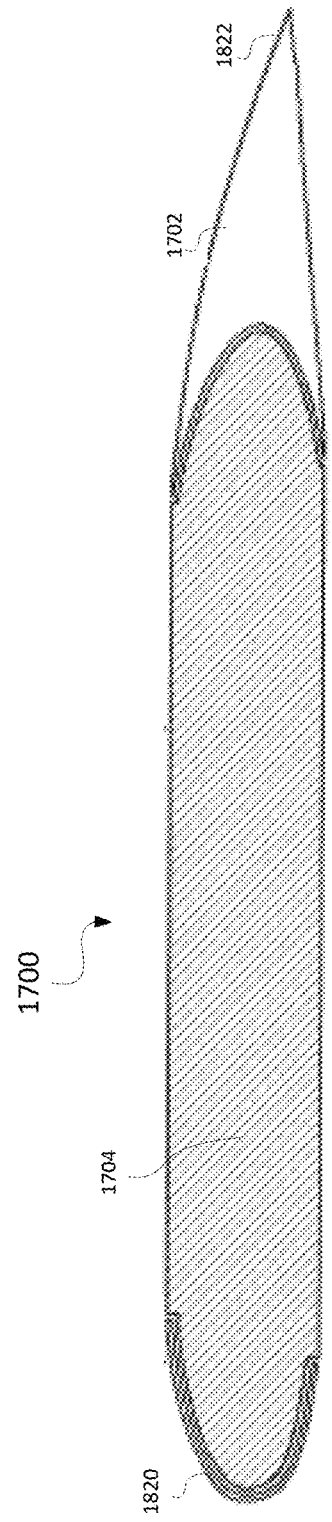
FIG. 19 shows an example of a cross sectional view of an aircraft with LPA.

FIG. 19 shows aircraft 1700 in cross-section along a vertical plane that intersects the central axis of fuselage 1704. The interlocking features such as rims, recesses, bearings, RPC and RSC components, etc. are omitted from FIG. 19 for simplicity of illustration. It can be seen that LPA 1702 represents a significant volume near trailing edge 1822, while it represents a small volume along leading edge 1820. Thus, centrifugal and aerodynamic forces tend to turn LPA so that leading edge 1820 rotates in the direction of a turn and trailing edge 1822 rotates away from the direction of the turn so that leading edge 1820 continues to lead during and after a turn. One or more fins, rudders, or other aerodynamic components may be provided to enhance this tendency and to provide additional stability. An LPA such as LPA 1702 may be assembled from two or more components and may be built around a fuselage, such as fuselage 1704 so that a fuselage and LPA may be inseparable without some disassembly of one or both components.

Figure 20:
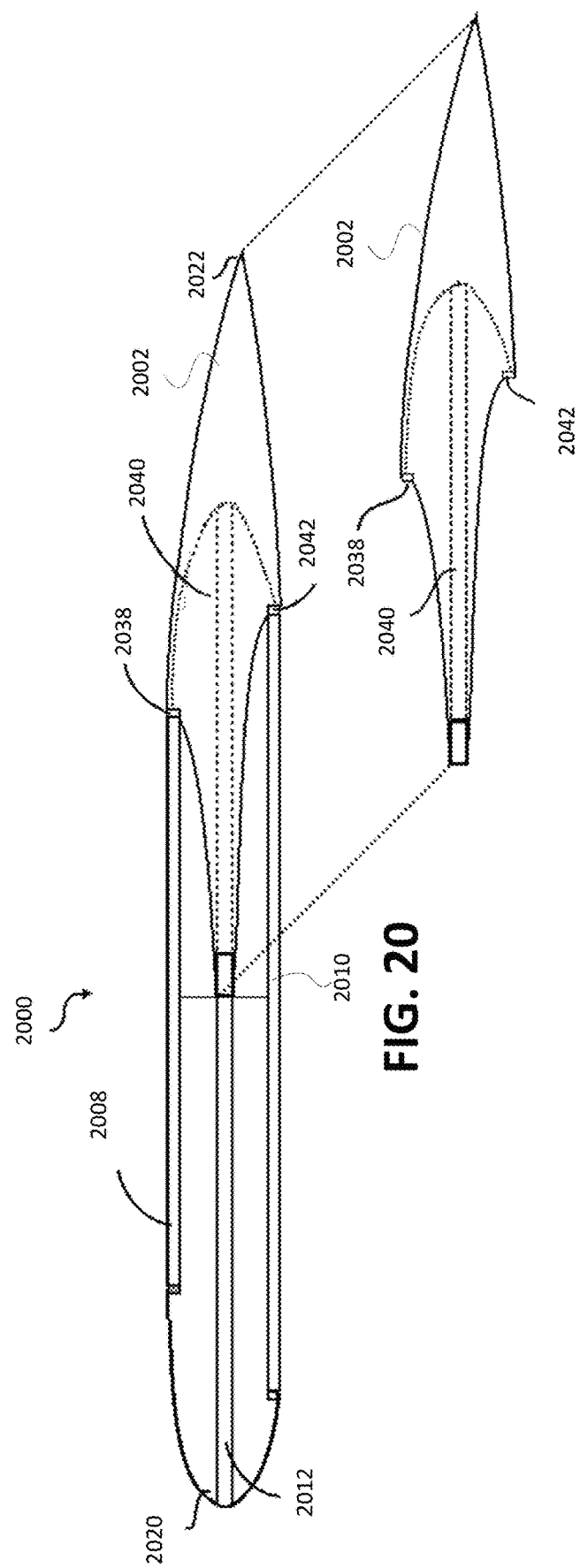
FIG. 20 illustrates an example of an LPA.

FIG. 20 illustrates the aerodynamic shape of an aircraft 2000 that provides an example of how such an aircraft may be formed to have an airfoil cross section along different vertical planes extending parallel to the direction of travel. FIG. 20 shows a cross section along a plane that bisects aircraft 2000. This illustrates the blunt leading 2020 edge that extends around the front of aircraft 2000 and the more pointed trailing edge 2022 that extends around the rear of aircraft 2000. FIG. 20 shows LPA 2002 separately to illustrate its shape and some of the attachment features of LPA 2002. Rims 2008, 2010, 2012 (which may have RSC and/or RPC components) are shown engaged with corresponding connecting components 2038, 2040, 2042 of LPA 2002. Connecting components 2038, 2040, 2042 may include support blocks having matching convex surfaces corresponding to rims 2008, 2010, 2012 and may be capable of locking in a fixed manner, or in a rotationally free manner, and may, in some configurations allow detachment of LPA 2002 from aircraft 2000 so that LPA may be released and separated. For example, since an LPA is only needed for lift when flying in air and is not needed in space, an LPA may be jettisoned when moving from atmosphere to space. In some examples, an LPA may include some fuel storage capacity that is used during takeoff and is partially or completely empty when an aircraft reaches space. Such an LPA may be jettisoned as an empty fuel tank and may be recovered (e.g. from the sea) for subsequent use.

According to aspects of the present technology, an aircraft/spacecraft may take advantage of favorable properties of certain shapes for use in an aircraft fuselage. For example, a fuselage may include a portion that has an oblate spheroid shape (also referred to as an "elliptical sphere" or squashed sphere). A structure having an oblate spheroid shape may be strong for its weight (i.e. high strength to weight ratio). Because such a shape has radial symmetry, it may be formed of prefabricated portions (e.g. wedge-shaped portions) that can be combined together by methods know in the art to form a unified structure. This may allow easy transportation (e.g. transported by other aircraft/spacecraft).

Figure 21A:
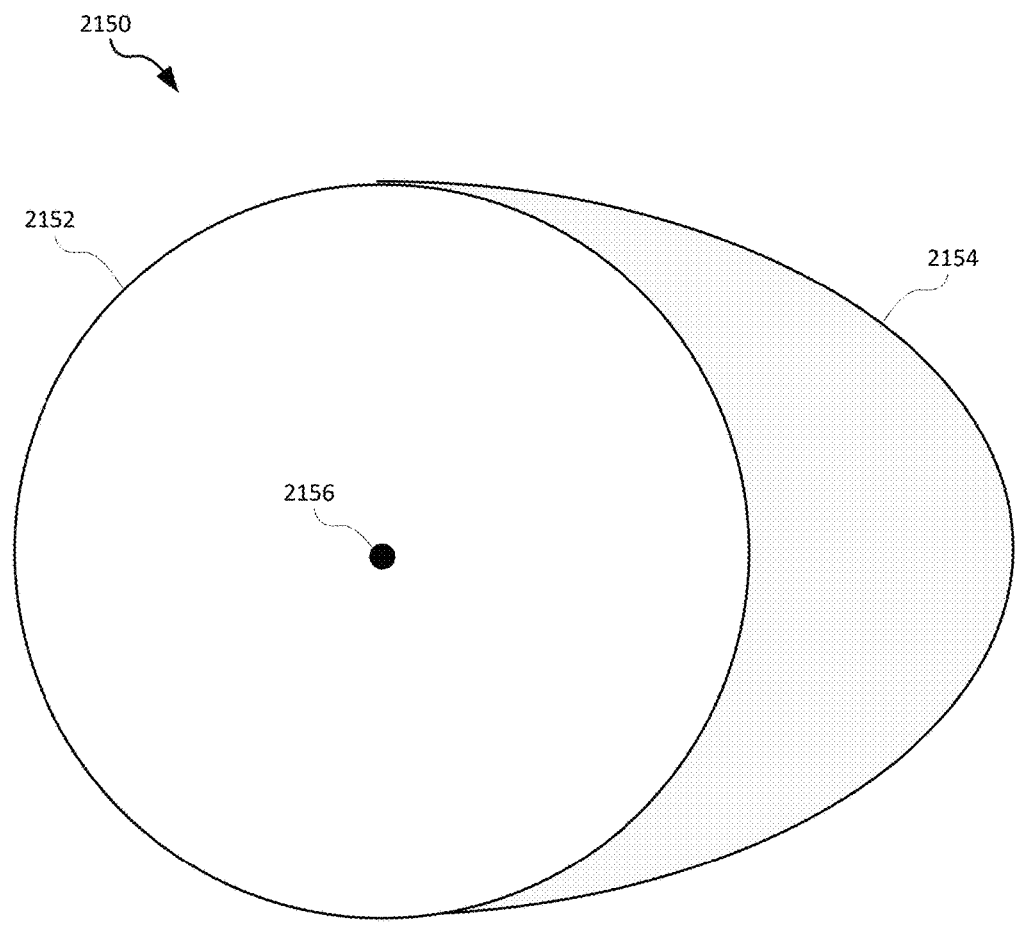

FIG. 21A shows an example of an aircraft fuselage 2150 showing oblate spheroid portion 2152 and an LPA (lift profile assembly) portion 2154 (shaded). Oblate spheroid portion 2152 is symmetric about a central axis 2156. FIG. 21A is a cross-sectional view along a horizontal plane perpendicular to central axis 2156.

Figure 21B:
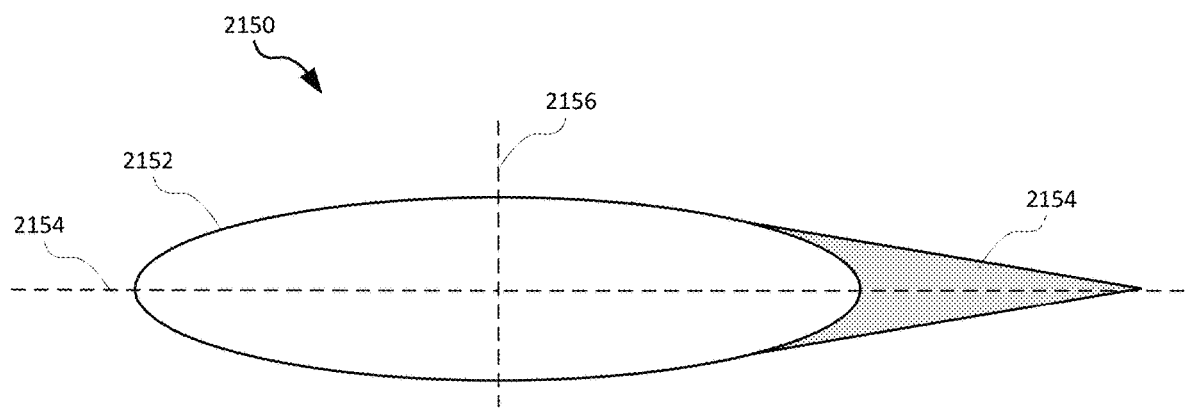

FIG. 21B shows aircraft fuselage 2150 in cross-section along a vertical plane that includes central axis 2156. It can be seen that LPA portion 2154 extends laterally from the right of oblate sphere portion 2154 along horizontal plane 2154 (horizontal plane of FIG. 21A), which is perpendicular to central axis 2156. The combination of oblate spheroid portion 2152 and LPA 2154 form an airfoil shape (e.g. when aircraft 2150 travels in air from right to left in the views shown). The oblate spheroid portion 2152 may have a high strength to weight ratio and may (in combination with LPA portion 2154) generate significant lift so that it provides multiple advantages in an aircraft fuselage. Note that while FIG. 21B shows a cross-section through the middle of aircraft fuselage 2150 (through central axis 2156), the combination of oblate spheroid portion 2152 and LPA portion 2154 provides a similar cross-section at other locations across aircraft fuselage 2150 so that aircraft fuselage 2150 generates lift at all or substantially all locations laterally displaced from central axis 2156.

As in some previous examples, an LPA may be rotatable during flight (e.g. rotatable about central axis 2156). In other examples, an LPA may not be rotatable. In some cases, an LPA and an oblate spheroid may be formed as an integrated unit (e.g. with a common frame and outer layer), which may provide smooth outer surfaces with low drag.

Figure 21C:
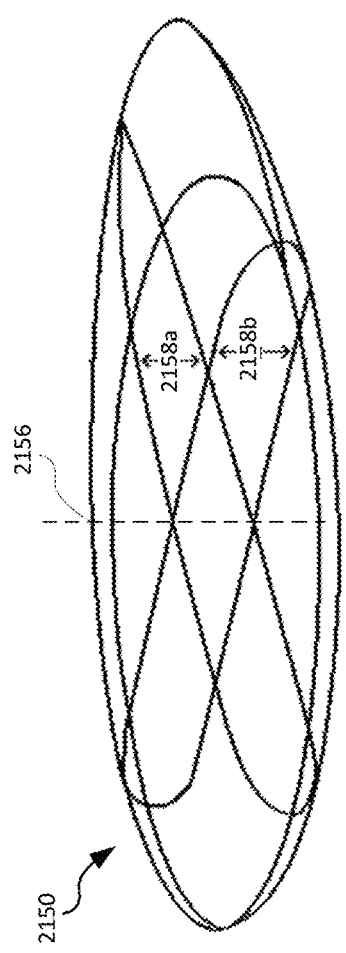

FIG. 21C shows a perspective view illustrating the shape of aircraft fuselage 2150 and illustrating the locations of frame members 2158a-b. Frame member 2158a runs from nose to tail while frame member 2158b runs laterally. Frame members 2158a-b intersect at central axis 2156. Additional frame members may be provided (e.g. radiating out from a central axis and/or running nose to tail and/or laterally), often as cross braced ribs and spars.

Figure 21D:
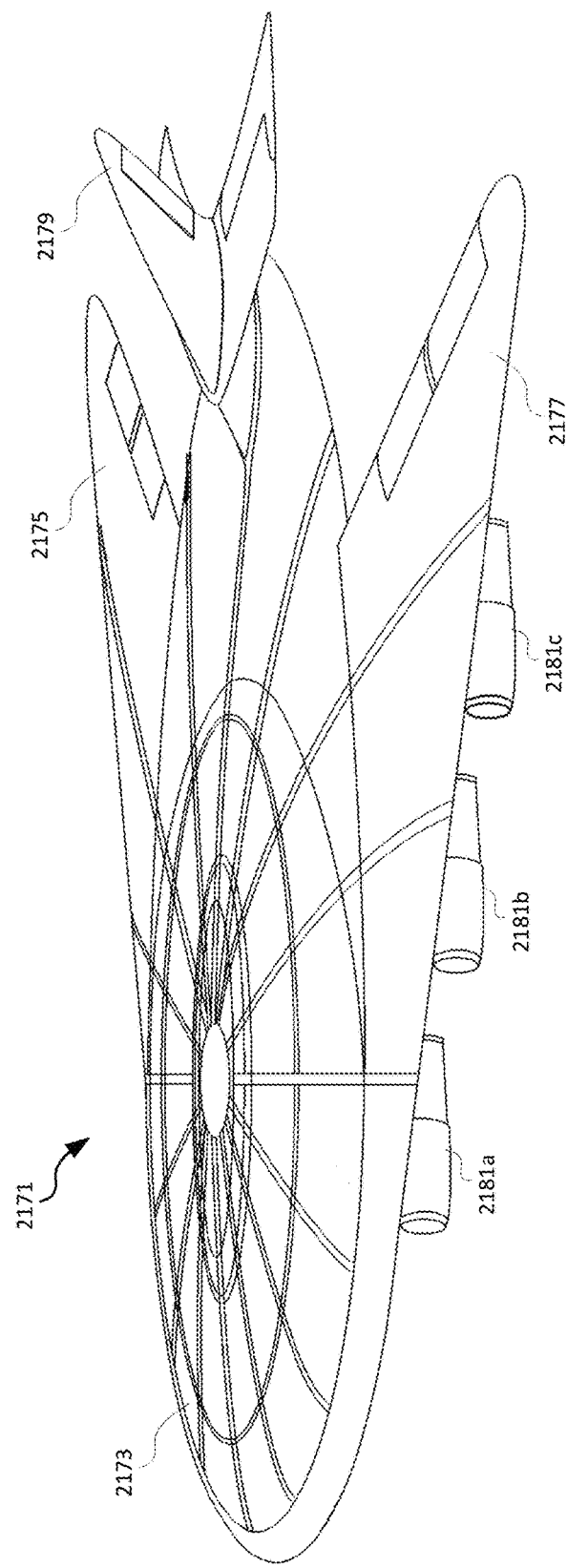

While an aircraft fuselage may be based on an lift enhanced oblate spheroid shape (e.g. LEOS shape), additional portions may extend beyond the oblate spheroid portion, such as an LPA. In some cases, wings and/or a tail portion may also extend from an oblate spheroid portion creating an asymmetric perimeter profile (APP.) FIG. 21D shows an example of an aircraft 2171 that includes an oblate spheroid portion 2173, wings 2175, 2177, and a tail 2179 extending from oblate spheroid portion 2173. In this example, jet engines 2181a-c are mounted on the underside of aircraft 2171.

FIGS. 21E-F illustrate an additional example of an aircraft fuselage 2185 that is based on an oblate spheroid shape and the advantages provided by such a shape. Instead of a single oblate spheroid, aircraft fuselage 2185 includes three oblate spheroids 2187-2189 joined together in such a way that each generates lift. Each oblate spheroid 2187-2189 may be formed as previously described so that it has an airfoil shape in cross section along a plane running nose-to-tail at any lateral location (e.g. similar to the cross-sectional profile of FIG. 21B). Central oblate spheroid 2187 is larger than right oblate spheroid 2188 and left oblate spheroid 2189.

An aircraft based on fuselage 2185 may be powered in any suitable manner. For example, FIG. 21F shows right jet engine 2191 and left jet engine 2182 that provide thrust on either side to propel aircraft fuselage 2185 forward.

Figure 21G:
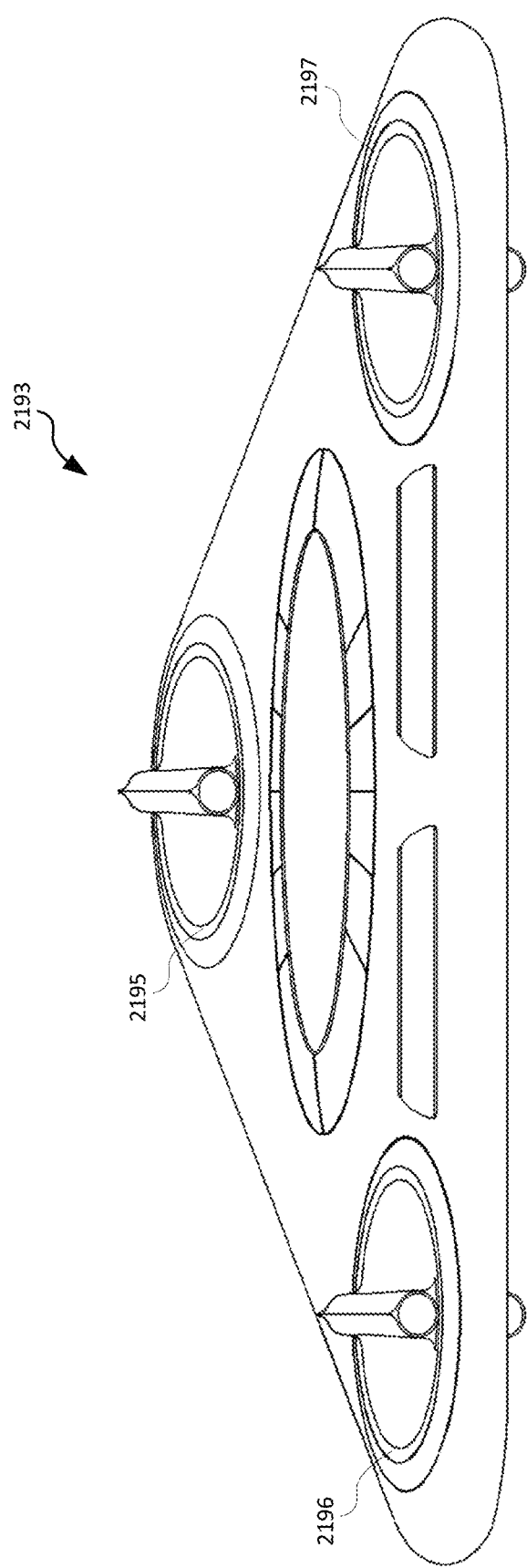

FIG. 21G shows another example of an aircraft fuselage 2193 that is triangular in shape along a horizontal plane (FIG. 21G shows a perspective view). Three modules 2195-2197 each include an upper jet engine and a lower jet engine (not visible) to provide thrust along a horizontal plane. Modules 2195-2197 may be rotatable or may be fixed in position. Aircraft fuselage 2193 may generate lift across its entire lateral extent by having a lift-producing cross-sectional shape throughout (e.g. a cross-sectional shape similar to the example of FIG. 21B).

Thrust to drive an aircraft with an oblate spheroid structure may be generated by multiple modules (e.g. planetary modules with one or more jet and/or rocket). In some cases, such modules may be rotatable with respect to a fuselage. In some cases, modules or engine housings may have a fixed orientation with respect to the fuselage.

Figure 22A:
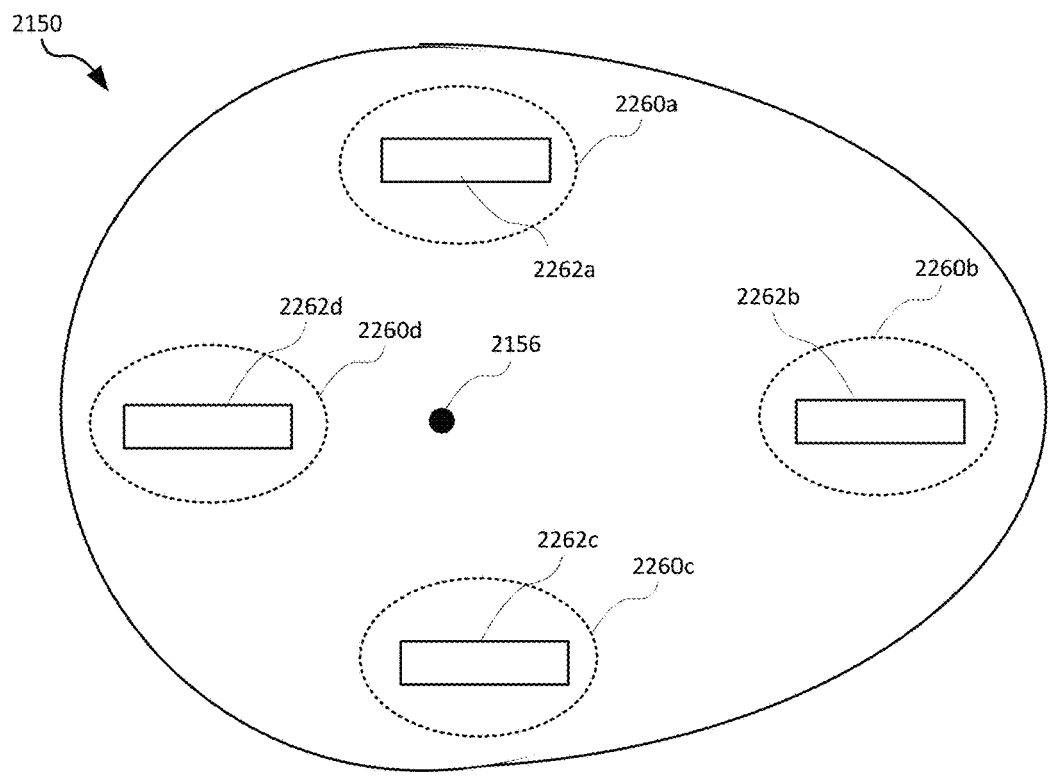
FIGS. 22A-C illustrate examples of an aircraft with jet engines controlled by a central controller.
Figure 22B:
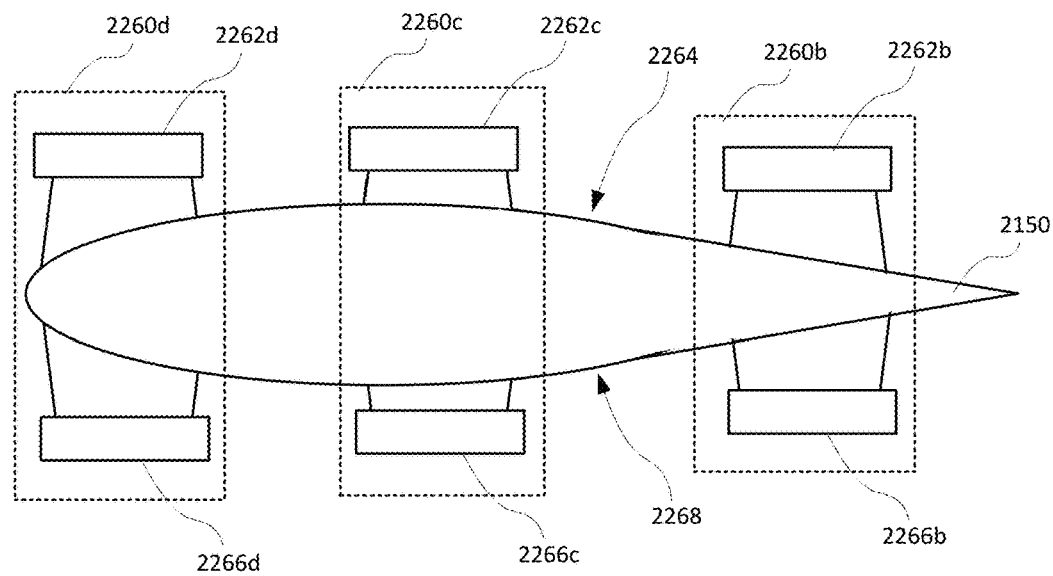

FIGS. 22A-B show an example of aircraft fuselage 2150 that includes a plurality of modules 2260a-d that generate thrust. Each module includes an upper jet engine directed above the upper surface of aircraft fuselage 2150 and an opposed lower jet engine directed below the lower surface of aircraft fuselage 2150 (only upper jet engines may be seen in the top-down view of FIG. 22A). For example, module 2260b includes upper jet engine 2262b directed above upper surface 2264 of aircraft fuselage 2150 and lower jet engine 2266b directed below lower surface 2268 of aircraft fuselage 2150. Module 2260c includes upper jet engine 2262c directed above upper surface 2264 of aircraft fuselage 2150 and lower jet engine 2266c directed below lower surface 2268 of aircraft fuselage 2150. Module 2260d includes upper jet engine 2262d directed above upper surface 2264 of aircraft fuselage 2150 and lower jet engine 2266d directed below lower surface 2268 of aircraft fuselage 2150. Module 2260a includes upper jet engine 2262a directed above upper surface 2264 of aircraft fuselage 2150 and a lower jet engine (not visible in FIGS. 22A-B) directed below lower surface 2268 of aircraft fuselage 2150. In general, upper jet engines 2266a-d and lower jet engines 2266a-d generate thrust to propel the aircraft through the air (or, with jets replaced by rockets, may propel the aircraft through space). The upper jet engines and lower jet engines of the plurality of modules may be controlled (e.g. by a central controller) to control thrust generated by each individual jet engine, which collectively generate a combined thrust in a particular direction (combined thrust vector). Orientation of the aircraft may be controlled by controlling such a thrust vector. For example, in order to turn about central axis 2154 (i.e. to control yaw), the thrust vector may be changed by increasing thrust generated by jet engines of module 2260a compared with thrust generated by jet engines of module 2260c or by increasing thrust generated by jet engines of module 2260c compared with thrust generated by jet engines of module 2260a. In order to point upwards or downwards (control pitch) thrust of lower jet engines 2266a-d may be increased or decreased compared with thrust of upper jet engines 2260*a-d*. Upper jet engines 2260*a-d* and lower jet engines 2266*a-d* are fixed with respect to fuselage 2150 in this example (e.g. oriented along corresponding planes that are parallel to the plane of aircraft fuselage 2150) and the central controller is configured to change direction and magnitude of the combined thrust vector by changing magnitudes of thrust generated by individual ones of the upper jet engines 2262*a-d* and lower jet engines 2266*a-d* (i.e. there is no change in the direction of thrust of any individual jet engine where engines are fixed in position).

Figure 22C:
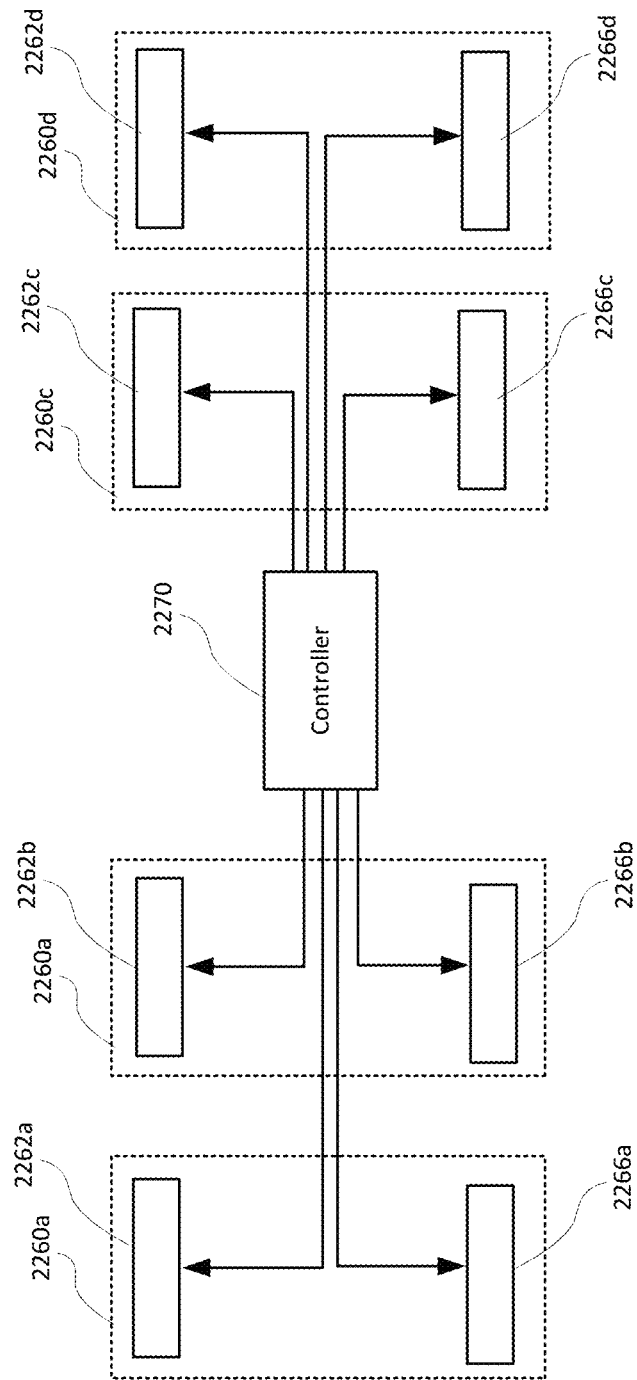

FIG. 22C shows an example of a central controller 2270 configured to provide control signals to upper jet engines 2262*a-d* and lower jet engines 2266*a-d* of modules 2260*a-d* respectively. Each control signal may provide individual control the respective jet engine (e.g. to control thrust of each jet engine individually). Upper and lower jet engines may be rotatable or may have fixed orientations (e.g. may be permanently mounted with a particular orientation). Upper and lower jet engines may be oriented in parallel or may be oriented differently (e.g. at different angles relative to horizontal plane 2154 and/or with respect to a center line). Combined thrust of the upper and lower jet engines may be controlled in both magnitude and direction by controlling thrust generated by individual ones of the upper jet engines and the lower jet engines.

While an LPA may be formed as an integral component of an aircraft fuselage in some examples, in other examples, an LPA may be at least partially separable from another portion of an aircraft fuselage (e.g. from an oblate spheroid portion). This may allow an aircraft fuselage to have two or more physical configurations.

FIGS. 23A-B illustrate an example of aircraft fuselage 2150 with LPA 2154 configurable so that it allows multiple configurations of aircraft fuselage 2150. For example, FIG. 23A shows aircraft fuselage 2150 in a first configuration, with LPA portion 2154 flush with oblate spheroid portion 2152 to provide an aerodynamic high-lift profile as previously shown (jet engines and other components are omitted for simplicity in this view).

FIG. 23B shows aircraft fuselage 2150 with LPA 2154 in an extended configuration in which it is displaced a distance d from oblate spheroid portion 2152 along horizontal plane 2154. The separation (a distance d) means that the concave inner surface of LPA 2154 is exposed and creates significant drag as aircraft fuselage 2150 moves (e.g. moving from right to left in this view). This drag may be used to slow down aircraft fuselage 2150 when reentering the earth's atmosphere from space, descending at a steep angle, or otherwise. In order to change from the flush lift-generating configuration of FIG. 23A to the extended high-drag configuration of FIG. 23B. LPA 2154 may be mounted on a sliding mechanism, on struts, or otherwise attached to oblate spheroid portion 2152 in a movable arrangement. Movement of LPA 2154 may be achieved using one or more actuators (e.g. one or more electric, hydraulic, pneumatic or other actuators).

Figure 23C:
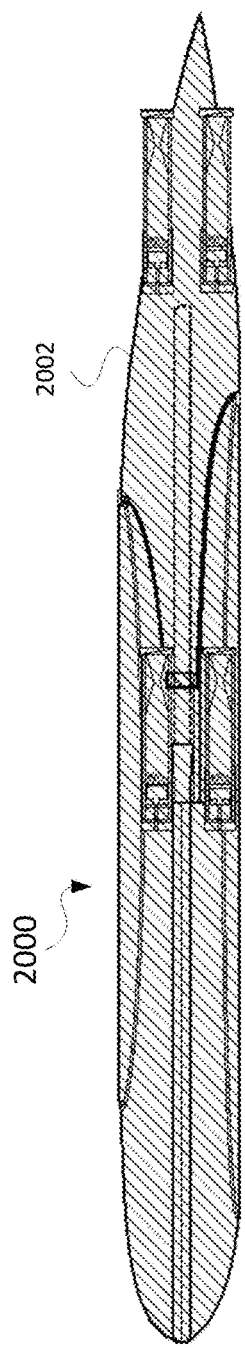
Figure 23D:
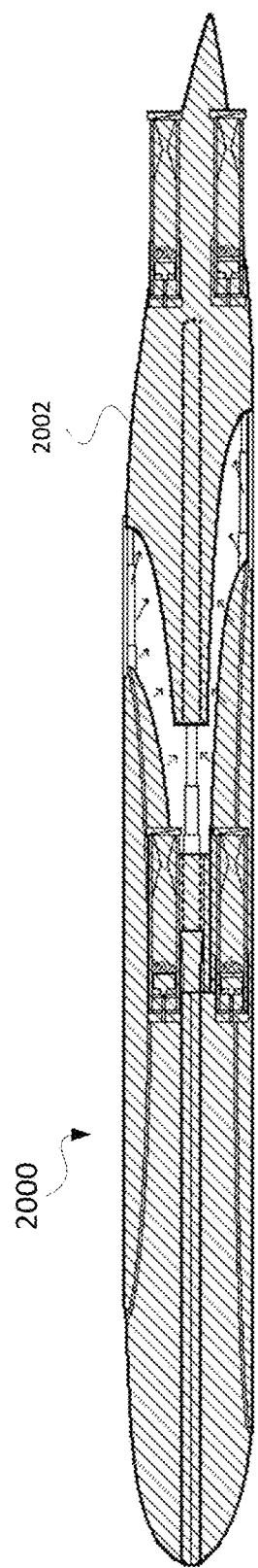
Figure 23E:
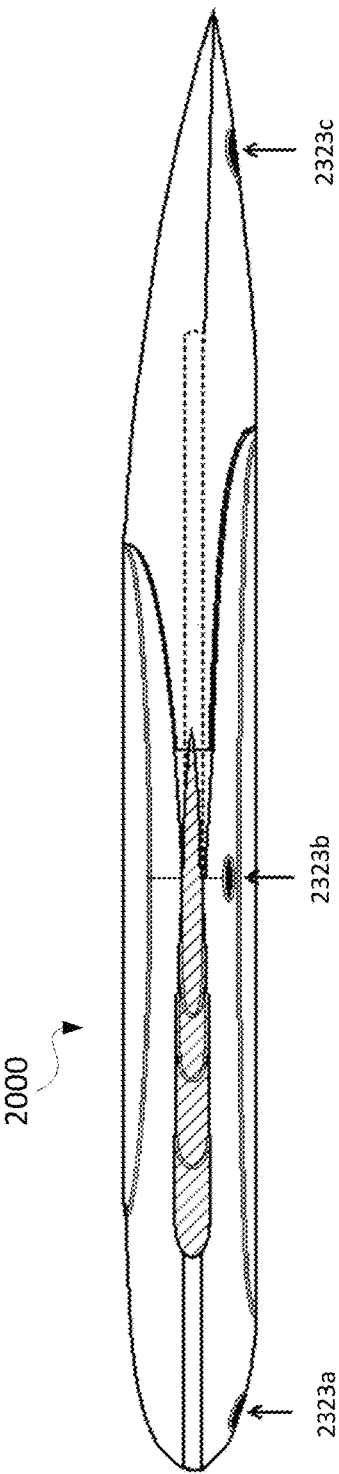

FIGS. 23C-D show another example of aircraft 2000 (previously shown in FIG. 20) that includes LPA 2002, which is separable from the rest of aircraft 2000. FIG. 23C shows aircraft 2000 in a high lift configuration with low drag (streamlined configuration for flight). FIG. 23D shows aircraft 2000 in a high-drag configuration with LPA 2002 separated from the rest of aircraft 2002 as shown by arrows. FIG. 23E shows an example of aircraft 2000 including locations of mini-thrusters 2323*a-c* arranged along a lower surface to generate thrust in a downward direction. During re-entry from space (in a shockwave re-entry position), aircraft 2000 may be oriented so that instead of travelling nose-first, its lower surface leads and it presents a large profile thus causing drag to slow its descent. Mini-thrusters 2323*a-c* may provide thrust to further slow descent in this position. Mini-thrusters 2323*a-c* may be controlled by a central controller such as central controller 2270 to achieve and maintain a desired orientation (e.g. transverse to the direction of travel for maximum drag). Subsequently, (e.g. at a lower altitude where there is more air and therefore more friction), mini-thrusters 2323*a-c* may be turned off, the orientation of aircraft 2000 may be modified to a nose-first orientation and LPA 2002 may be moved to the high-drag configuration of FIG. 23D.

Advantages of an aircraft with a central axis such as central axis 2156 is that it can have a high strength to weight ratio and it can be assembled from prefabricated portions.

Figure 24A:
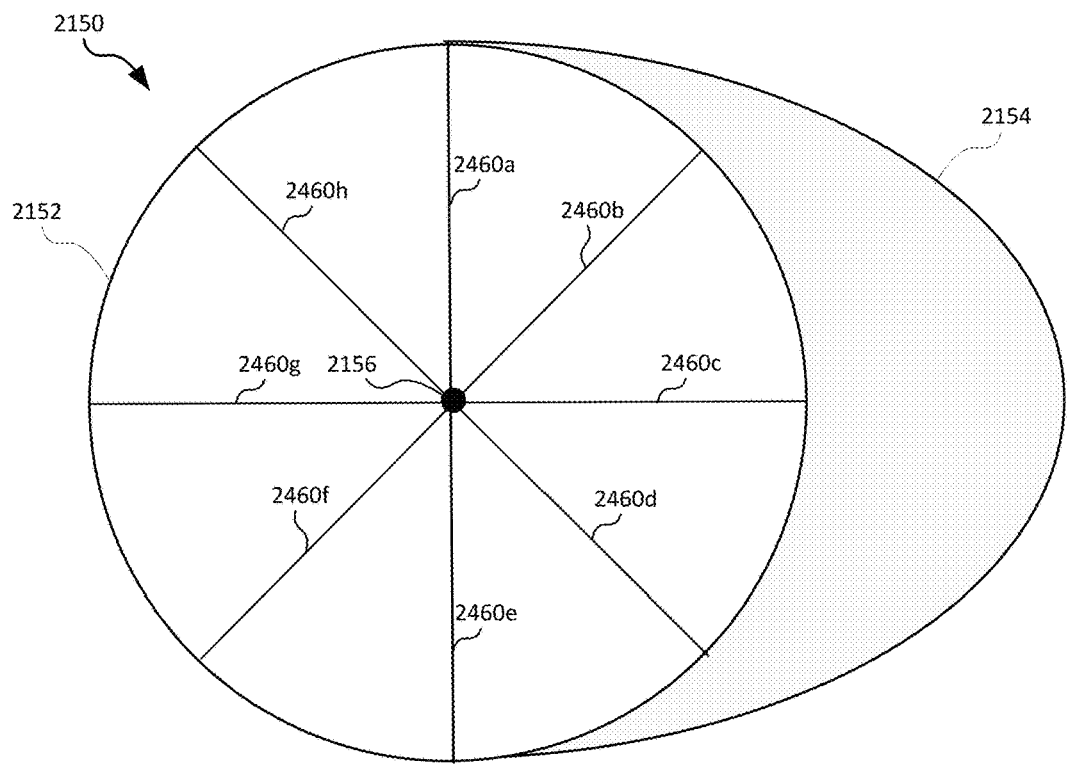
FIGS. 24A-D illustrate examples of aircraft with a central axis.
Figure 24B:
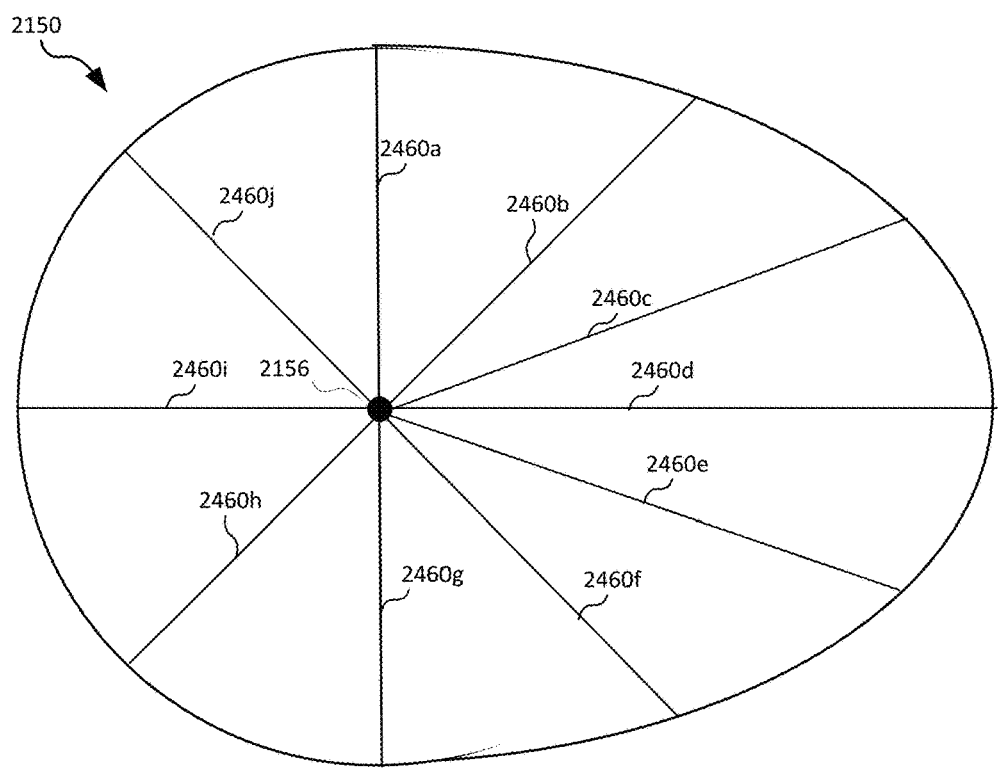

FIGS. 24A-B show examples of how aircraft fuselage 2150 may be formed using frame members 2460*a-h* (rib-like frame members) that extend out from central axis 2154 (e.g. as previously shown in FIG. 21C). Frame members may be formed of metal or other high-strength material and may be joined together at central axis 2156. An outer layer of fuselage 2150 may overlie frame members 2460*a-h*. In FIG. 24A, frame members 2460*a-h* are limited to oblate spheroid portion 2152 and do not extend into LPA 2154, which may be a separate component that can be separated and/or rotated. Frame members 2460*a-h* may be identical in this example (e.g. because oblate spheroid portion 2152 is symmetric about central axis 2156), which may facilitate large scale production.

FIG. 24B shows an example in which frame members 2460*a-j* extend through the entire fuselage 2150 (e.g. where LPA portion 2154 is integrated with oblate spheroid portion 2152). Frame members 2460*a-j* are not identical in this example as some frame members (e.g. frame members 2460*c-e*) are longer than others (e.g. frame members 2406*h-j*).

In some examples, an aircraft fuselage may be assembled from prefabricated portions that are bolted, welded, or otherwise attached together when needed. An aircraft fuselage with a radial configuration (e.g. as shown in FIGS. 24A-B with frame members 2460 extending out from central axis 2154) may be assembled from wedge-shaped portions that may be compact enough to transport easily.

Figure 24C:
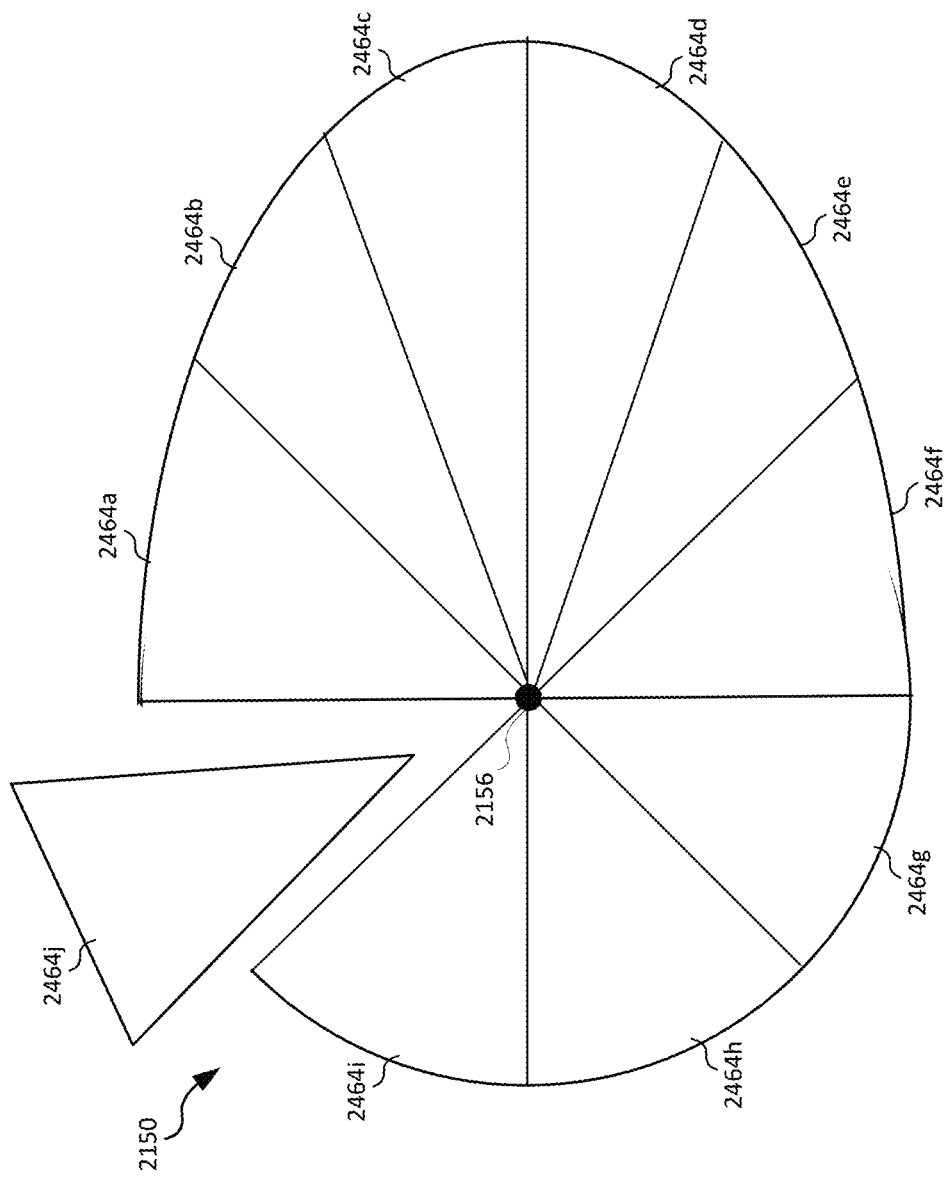

FIG. 24C shows an example of fuselage 2150 during assembly with portions 2464*a-i* in place (meeting at central axis 2156) and with portion 2464 being moved into place to be coupled with neighboring portion 2464*i* and portion 2464*a*.

Figure 24D:
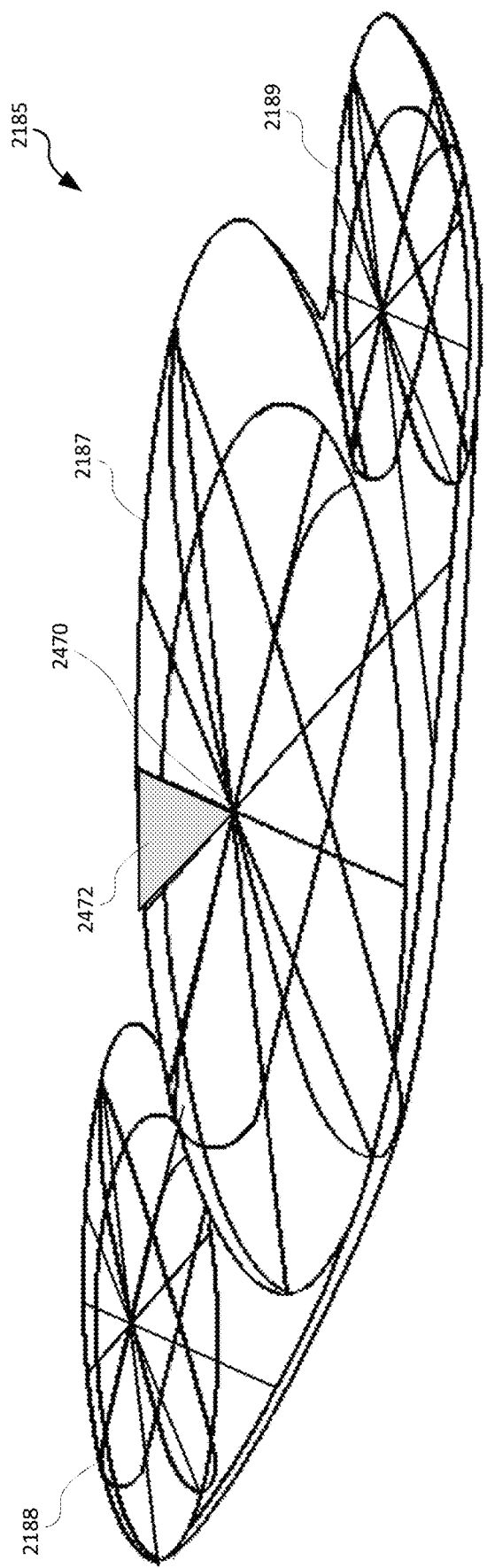

A central axis and/or modular construction may be applied to any of the aircraft described here including aircraft fuselage 2185. FIG. 24D shows each oblate spheroid 2187-2189 having a central axis, which may be a location where wedge-shaped modules meet. For example, central oblate spheroid 2187 includes central axis 2470 and shows an example of a wedge-shaped portion 2472 that may be prefabricated and separately transported prior to incorporation into aircraft fuselage 2185.

In some cases, it may be advantageous to couple an aircraft with one or more other aircraft and/or spacecraft. For example, an aircraft may be provided with an air-tight door and suitable coupling hardware to allow it to be coupled with corresponding hardware of another aircraft or other structure (e.g. space station).

Figure 25A:
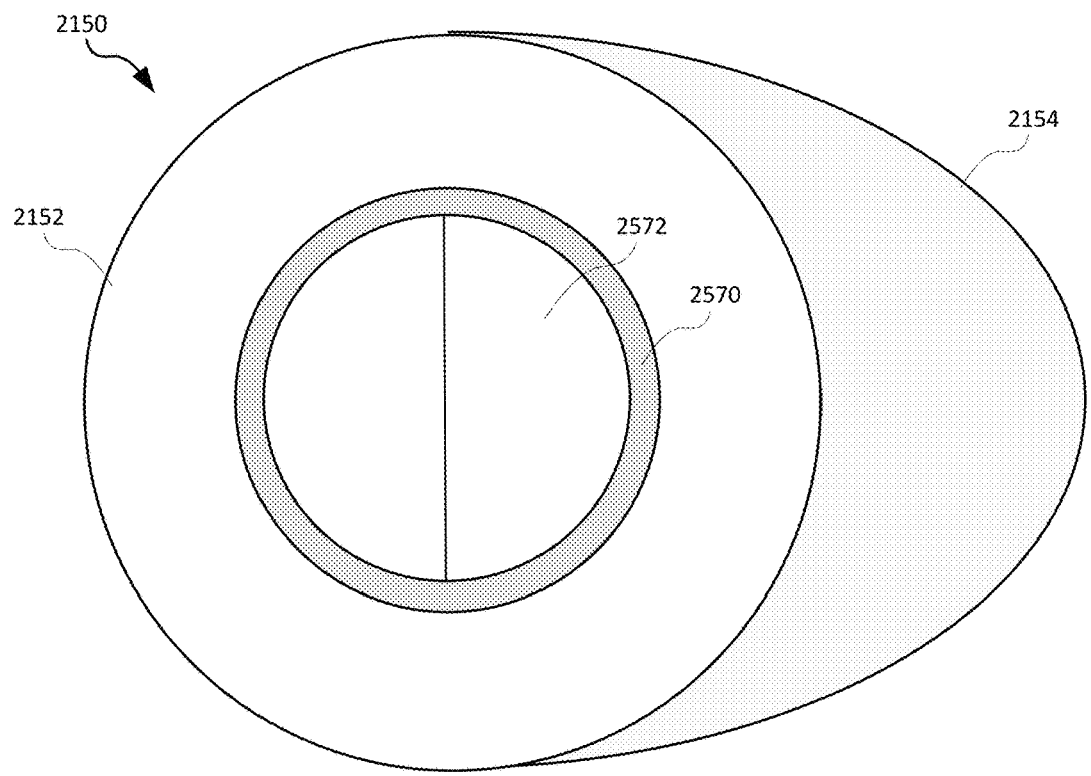
FIGS. 25A-C illustrate an example of aircraft with airtight doors and air-lock flanges.
Figure 25B:
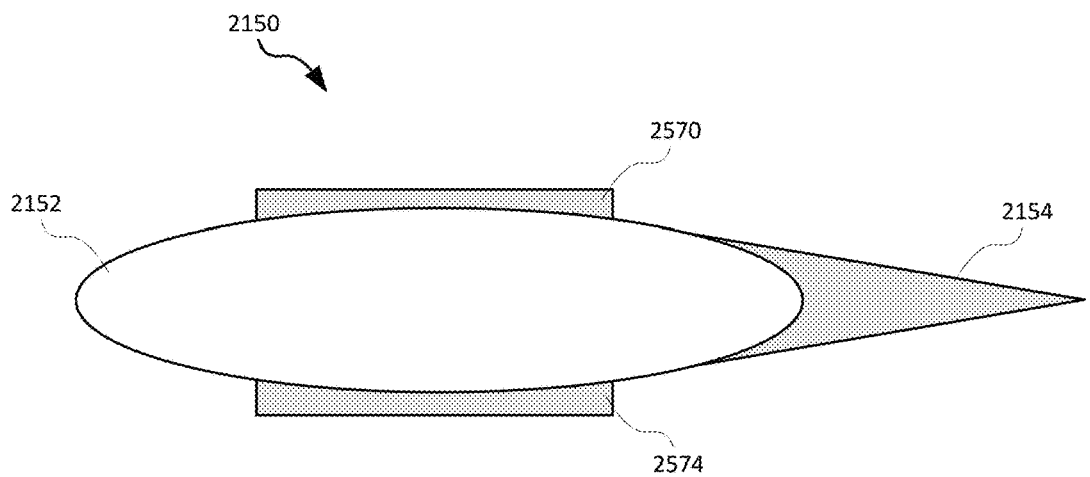

FIGS. 25A-B illustrate an example of aircraft fuselage 2150 configured with air-tight doors and air-lock flanges for coupling with corresponding air-lock flanges of other aircraft or other structures.

FIG. 25A shows a top-down view of aircraft fuselage 2150 including upper air-lock flange 2570, which extends about upper air-tight door 2172. Upper air-lock flange 2570 and air-tight door 2172 are circular and may be aligned with central axis 2154 of oblate spheroid portion 2152. In other examples, these features may be square, rectangular, or have any other shape.

FIG. 25B shows lower air-lock flange 2574, which may be substantially similar to upper air-lock flange 2570 and may extend around a lower air-tight door (not visible in this view) which may be substantially similar to upper air-tight door 2172, with a downward facing orientation instead of the upward facing orientation of upper air-lock flange 2570 and upper air-tight door 2172.

Figure 25C:
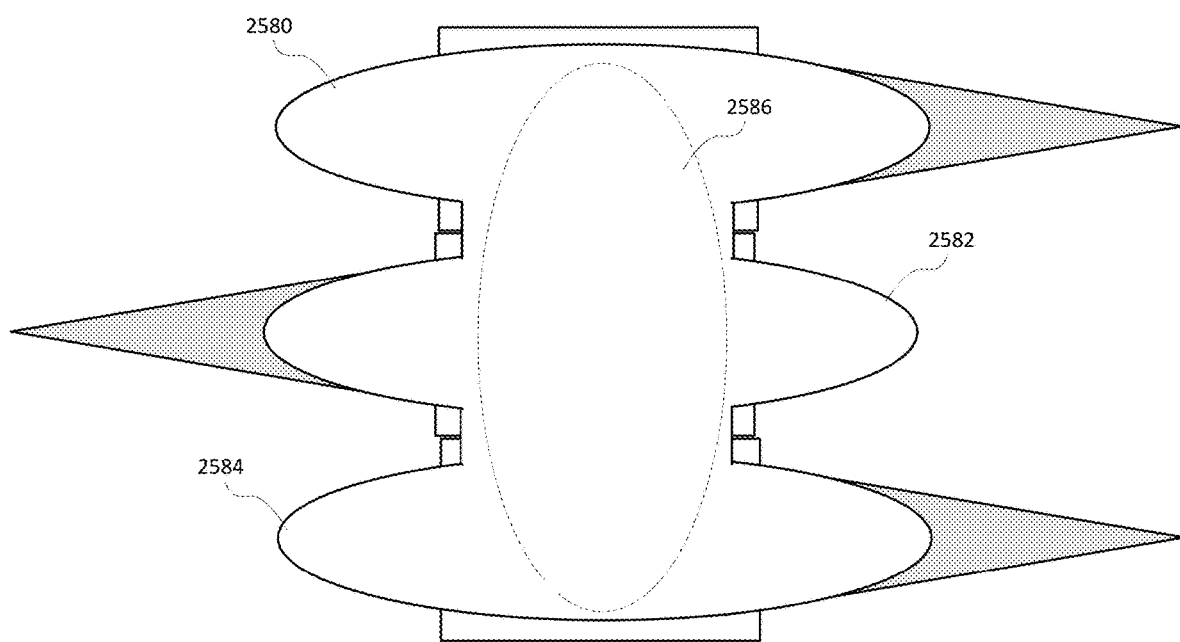

FIG. 25C shows a cross-sectional view of three aircraft 2580, 2582, 2584 coupled together using air-lock flanges and with their air-tight doors open to create a shared volume 2586 that extends through the three aircraft and may allow free movement of personnel and material between aircraft when docked in space. For example, a lower air-lock flange of aircraft 2580 is coupled to upper air-lock flange of aircraft 2582. Lower air-tight door of aircraft 2580 and upper air-tight door of aircraft 2582 are open. An upper air-lock flange of aircraft 2584 is coupled to lower air-lock flange of aircraft 2582. Upper air-tight door of aircraft 2584 and lower air-tight door of aircraft 2582 are open. This connects the interior spaces of the three aircraft to form a single large space and allow rapid transfer of personnel and material.

Figure 26:
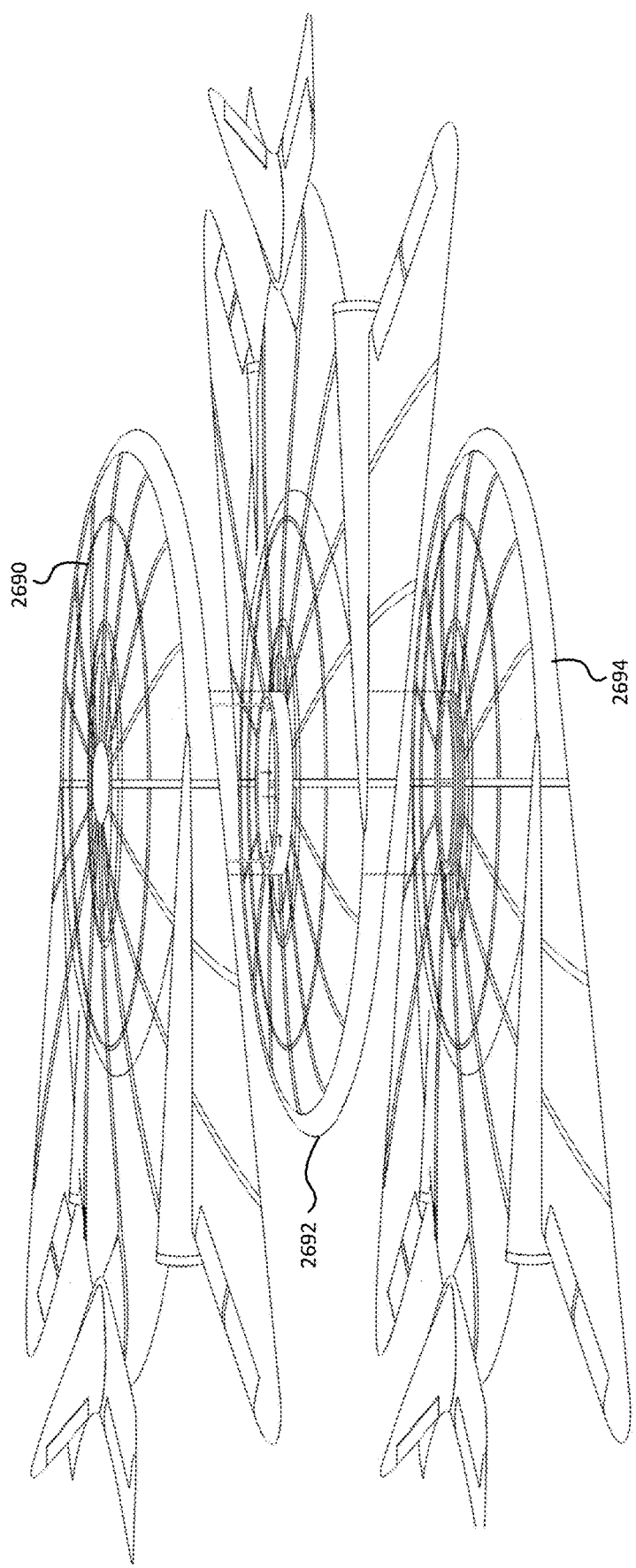
FIG. 26 illustrates another example of aircraft with airtight doors and air-lock flanges.

FIG. 26 illustrates another example of three aircraft 2690, 2692, 2694, each equipped with upper and lower air-tight doors and upper and lower air-lock flanges to allow coupling in space. Aircraft 2690, 2692, 2694 are aligned so that the air-lock flanges align and an air-lock flange may seal against corresponding air-lock flange of an opposing aircraft to allow docking. Once sealed, air-tight doors may be opened and the interior spaces connected. While aircraft 2690, 2692, 2694 each have both upper and lower air-tight doors and corresponding air-lock flanges, in other examples, an aircraft may have only one such air-tight door and corresponding air-lock flange (e.g. only on a top surface or only on a bottom surface).

For purposes of this document, it should be noted that the dimensions of the various features depicted in the FIGS. may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

What is claimed is:

1. An aircraft comprising:
    a fuselage that includes;
        an oblate spheroid portion that is symmetric about a central axis; and
        a lift profile assembly extending laterally from a section of the oblate spheroid portion along a plane that is perpendicular to the central axis, the combination of the oblate spheroid portion and the lift profile assembly having a combined upper surface and a combined lower surface that define an asymmetric airfoil shape in cross-section along a vertical plane such that horizontal movement of the fuselage through air produces a lift force in a vertical direction; and
    a plurality of modules attached to the fuselage, each module including an upper engine having an outlet above the combined upper surface and an opposed lower engine having an outlet below the combined lower surface.

2. The aircraft of claim 1 wherein the fuselage is circularly symmetric about a central axis.

3. The aircraft of claim 1 wherein each module is separately rotatable about a vertical axis that extends parallel to the central axis to generate thrust on upper or lower planes parallel the aircraft's trajectory.

4. The aircraft of claim 1 further comprising two or more wings extending from the fuselage.

5. The aircraft of claim 1 wherein the lift profile assembly is rotatable about the central axis.

6. The aircraft of claim 1 wherein the lift profile assembly is at least partially separable from the oblate spheroid portion by lateral separation of the lift profile assembly and the oblate spheroid portion to reconfigure the aircraft from a lift-generating configuration to a high-drag configuration.

7. The aircraft of claim 1 wherein the fuselage includes a frame formed by frame members extending radially from the central axis.

8. The aircraft of claim 1 wherein the fuselage is formed of prefabricated wedge-shaped sections that are joined along the central axis.

9. The aircraft of claim 1 wherein upper engines and lower jet engines of the plurality of modules are configured to generate a combined thrust vector and a central controller is configured to control thrust generated by individual ones of the upper engines and lower engines to change the combined thrust vector and thereby change orientation of the aircraft.

10. The aircraft of claim 9 wherein the upper engines and lower engines are fixed with respect to the fuselage and the central controller is configured to change direction and magnitude of the combined thrust vector by changing magnitudes of thrust generated by individual ones of the upper engines and lower engines.

11. The aircraft of claim 1 further comprising at least on air-tight door and an air-lock flange extending about the air-tight door in a surface of the fuselage.

12. An aircraft comprising:
a fuselage having an oval shape in cross-section along a horizontal plane and having an airfoil shape in cross-section along a vertical plane perpendicular to a primary axis of the oval shape, wherein the fuselage includes an oblate spheroid portion that is symmetric about a central axis and further includes a lift profile assembly extending laterally from a section of the oblate spheroid portion along the horizontal plane; and
a plurality of pairs of engines, each pair of engines including an upper engine mounted above an upper surface of the aircraft and a lower engine mounted below a lower surface of the aircraft, the upper engine and the lower engine controlled by a central controller.

13. The aircraft of claim 12 wherein the lift profile assembly is rotatable about the central axis.

14. The aircraft of claim 12 wherein the lift profile assembly is at least partially separable from the oblate spheroid portion from a lift-generating configuration to a high-drag configuration.

15. The aircraft of claim 12 wherein the fuselage includes a frame formed by frame members extending radially from the central axis.

16. The aircraft of claim 12 wherein upper engines and lower engines of the plurality of modules are configured to generate a combined thrust vector and a central controller is configured to control thrust generated by individual ones of the upper engines and lower engines to change the combined thrust vector to thereby change a flightpath of the aircraft.

17. The aircraft of claim 1 wherein each upper engine has an intake above the upper surface of the fuselage and each lower engine has an intake below the lower surface of the fuselage.

18. The aircraft of claim 1 wherein each upper engine has an intake below lower surface of the fuselage and each lower engine has an intake above the upper surface of the fuselage.

19. The aircraft of claim 1 wherein the lift profile assembly extends from a trailing section of the oblate spheroid portion to from a pointed trailing edge of the fuselage.

20. The aircraft of claim 19 wherein the lift profile assembly extends around the oblate spheroid portion and forms a rounded leading section of the fuselage.

* * * * *

UNITED STATES PATENT AND TRADEMARK OFFICE
CERTIFICATE OF CORRECTION

PATENT NO. : 11,254,450 B2  
APPLICATION NO. : 16/830741  
DATED : February 22, 2022  
INVENTOR(S) : Grigg Page 1 of 1

It is certified that error appears in the above-identified patent and that said Letters Patent is hereby corrected as shown below:

On the Title Page

U.S. Patent Documents, Line 3: please delete "Thornley" and replace with -- Thomley --.

In the Claims

Column 25, Lines 5-6 (Claim 11, Lines 1-2): After "least" and before "air-tight" delete "on" and replace with -- an --.

Column 26, Line 21 (Claim 19, Line 3): After "to" and before "a" delete "from" and replace with -- form --.

Signed and Sealed this  
Thirtieth Day of August, 2022

Katherine Kelly Vidal  
*Director of the United States Patent and Trademark Office*